United States Patent
Kanemoto et al.

(10) Patent No.: US 9,647,246 B2
(45) Date of Patent: May 9, 2017

(54) BATTERY

(71) Applicant: GS Yuasa International Ltd., Kyoto-shi, Kyoto (JP)

(72) Inventors: Manabu Kanemoto, Kyoto (JP); Daisuke Okuda, Kyoto (JP); Mitsuhiro Kodama, Kyoto (JP); Tadashi Kakeya, Kyoto (JP); Hideto Watanabe, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 533 days.

(21) Appl. No.: 13/953,096

(22) Filed: Jul. 29, 2013

(65) Prior Publication Data
US 2014/0038027 A1 Feb. 6, 2014

(30) Foreign Application Priority Data

Jul. 31, 2012 (JP) ................... 2012-170503
Jun. 25, 2013 (JP) ................... 2013-133126
(Continued)

(51) Int. Cl.
*H01M 2/18* (2006.01)
*H01M 2/02* (2006.01)
(Continued)

(52) U.S. Cl.
CPC ........... *H01M 2/022* (2013.01); *H01M 2/023* (2013.01); *H01M 2/0235* (2013.01); *H01M 2/14* (2013.01);
(Continued)

(58) Field of Classification Search
CPC ............ H01M 10/286; H01M 10/345; H01M 10/0422; H01M 10/049; H01M 10/4214; H01M 2/36
See application file for complete search history.

(56) References Cited

U.S. PATENT DOCUMENTS 3,082,285 A 3/1963 Stark, Jr.
4,483,908 A 11/1984 Zimmerman
(Continued)

FOREIGN PATENT DOCUMENTS

CN 2390282 8/2000
CN 1702901 A 11/2005
(Continued)

OTHER PUBLICATIONS

Extended European Search Report dated Dec. 11, 2013 filed in corresponding European patent application No. 13178409.2.
(Continued)

*Primary Examiner* — Ula C Ruddock
*Assistant Examiner* — Thomas Parsons
(74) *Attorney, Agent, or Firm* — Rankin, Hill & Clark LLP

(57) ABSTRACT

A battery includes: a cylindrical battery case; and an electrode body disposed in the battery case, and including a positive plate, a negative plate, and a separator disposed between the positive plate and the negative plate. A spacer formed of a dense body and an electrolyte storage space storing an electrolyte are provided between the electrode body and the battery case on one end or both ends of the battery case in an axial direction of the electrode body.

8 Claims, 49 Drawing Sheets

(30) Foreign Application Priority Data

Jun. 25, 2013 (JP) ................................ 2013-133159
Jun. 25, 2013 (JP) ................................ 2013-133160
Jun. 25, 2013 (JP) ................................ 2013-133161
Jun. 25, 2013 (JP) ................................ 2013-133166
Jun. 25, 2013 (JP) ................................ 2013-133167

(51) Int. Cl.
*H01M 2/14* (2006.01)
*H01M 10/04* (2006.01)
*H01M 10/34* (2006.01)

(52) U.S. Cl.
CPC ......... *H01M 2/18* (2013.01); *H01M 10/0422* (2013.01); *H01M 10/0431* (2013.01); *H01M 10/0468* (2013.01); *H01M 10/345* (2013.01)

(56) References Cited

U.S. PATENT DOCUMENTS

| | | | |
|---|---|---|---|
| 4,663,252 A | 5/1987 | Chenebault et al. | |
| 6,958,200 B2 * | 10/2005 | Kato et al. | 429/223 |
| 7,758,997 B2 * | 7/2010 | Matsumoto | H01M 2/22 |
| | | | 429/131 |
| 8,268,478 B2 | 9/2012 | Kim et al. | |
| 2002/0150815 A1 | 10/2002 | Ehara | |

FOREIGN PATENT DOCUMENTS

| | | |
|---|---|---|
| CN | 2798319 | 7/2006 |
| CN | 101542817 A | 9/2009 |
| CN | 201408808 | 2/2010 |
| CN | 101904031 A | 12/2010 |
| DE | 20016231 | 12/2000 |
| EP | 0193869 | 9/1986 |
| JP | 48-060029 | 11/1971 |
| JP | 48-102524 | 3/1972 |
| JP | 56-050063 | 9/1979 |
| JP | 58-044759 | 9/1981 |
| JP | 58-082772 | 6/1983 |
| JP | 59-005568 | 1/1984 |
| JP | 60-022756 | 2/1985 |
| JP | 04-296467 | 10/1992 |
| JP | 05-021074 | 1/1993 |
| JP | 05-217600 | 8/1993 |
| JP | 08-287953 | 11/1996 |
| JP | 09-161837 | 6/1997 |
| JP | 10-021952 | 1/1998 |
| JP | 10-214637 | 8/1998 |
| JP | 11-213983 | 8/1999 |
| JP | 11-224689 | 8/1999 |
| JP | 2000-090903 | 3/2000 |
| JP | 2000-149960 | 5/2000 |
| JP | 2000-323165 | 11/2000 |
| JP | 2001-500314 | 1/2001 |
| JP | 2001500314 * | 1/2001 |
| JP | 2002-008710 | 1/2002 |
| JP | 2003-257494 | 9/2003 |
| JP | 2003-282144 | 10/2003 |
| JP | 2004-111105 | 4/2004 |
| JP | 2004111105 * | 4/2004 |
| JP | 2006-012801 | 1/2006 |
| JP | 2006-079942 | 3/2006 |
| JP | 2006-173102 | 6/2006 |
| JP | 2006-302736 | 11/2006 |
| JP | 2011-40381 | 2/2011 |

OTHER PUBLICATIONS

Japanese Office action issued on Oct. 18, 2016 for the corresponding Japanese Patent Application No. 2013-133126.
Japanese Office action issued on Oct. 20, 2016 for the corresponding Japanese Patent Application No. 2013-133159.
Japanese Office action issued on Oct. 20, 2016 for the corresponding Japanese Patent Application No. 2013-133160.
Japanese Office action issued on Oct. 20, 2016 for the corresponding Japanese Patent Application No. 2013-133161.
Japanese Office action issued on Nov. 22, 2016 for the corresponding Japanese Patent Application No. 2013-133166.
Japanese Office action issued on Nov. 22, 2016 for the corresponding Japanese Patent Application No. 2013-133167.

* cited by examiner

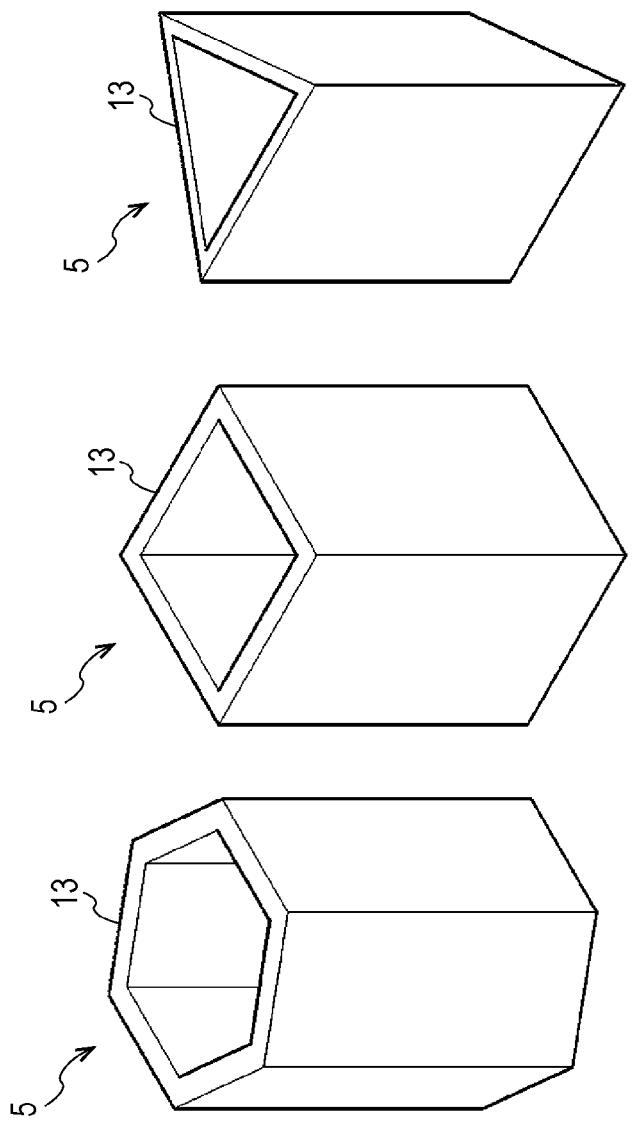

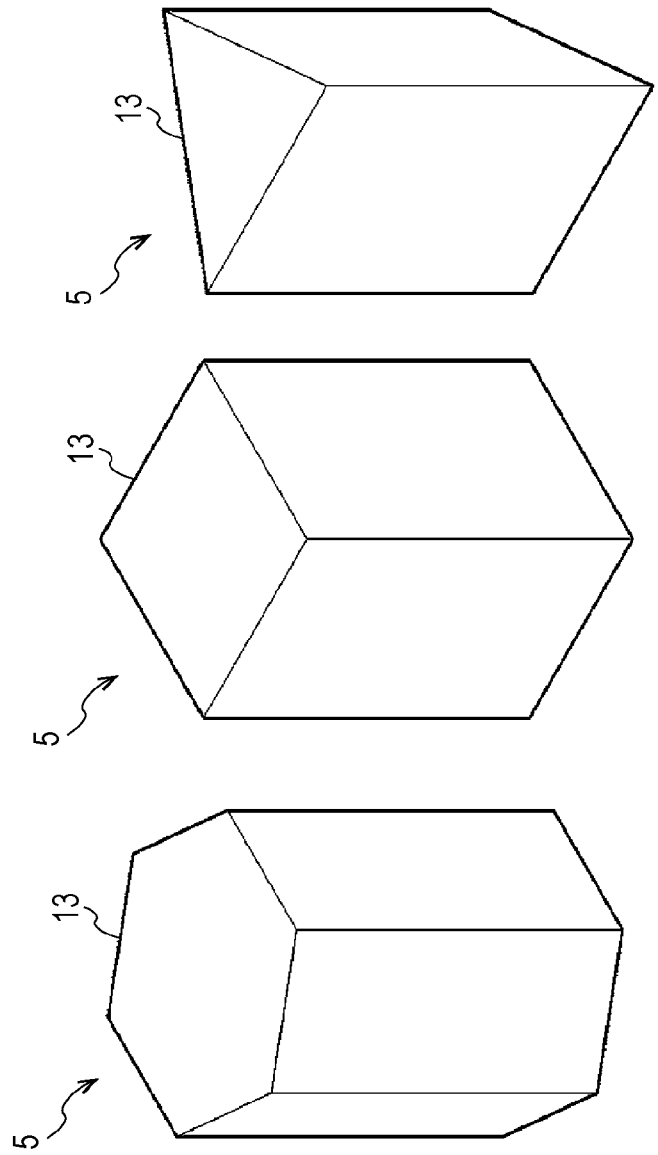

BATTERY

CROSS-REFERENCE TO RELATED APPLICATIONS

This application claims the benefit of Japanese patent application Nos. 2012-170503 filed on Jul. 31, 2012, and 2013-133126, 2013-133159, 2013-133160, 2013-133161, 2013-133166, and 2013-133167 respectively filed on Jun. 25, 2013, which are incorporated by reference.

FIELD

The present invention relates to a technique of the internal structure of a battery.

BACKGROUND

In these years, the need of a battery at low cost is increasing. Therefore, for example, such a battery is developed in which the battery includes an electrode group formed of a positive plate, a negative plate, and a separator impregnated with an electrolyte in a battery case, and the length of an electrode group is shortened in the axial direction of the battery case and a filler is included in the remaining space in the battery case. Thus, the amount of electrodes used is decreased, battery costs are decreased, and the unsteadiness of the electrode group in the battery case is suppressed because of the filler as compared with the case where an electrode group is formed across the overall length of a battery in the axial direction (see DE 200 16 231 U1).

In the existing technique, the length of the electrode group is shortened in the axial direction of the battery case, and the filler is included in the remaining space in the battery case. However, it is demanded that the amount of electrodes used is decreased using a configuration different from the configuration of the existing technique.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Disclosed herein is a technique that can decrease the amount of electrodes used with respect to an accommodation space in a case such as a battery case while suppressing the unsteadiness of an electrode group in the case.

A battery according to one aspect of the present invention includes: a case having an accommodation space in a tubular interior; and an electrode body disposed in the accommodation space in the case, and including a positive plate, a negative plate, and a separator disposed between the positive plate and the negative plate. A spacer formed of a dense body and an electrolyte storage space in which an electrolyte is stored are provided between the electrode body and the case on one end or both ends of the case in an axial direction of the electrode body.

A battery according to another aspect of the present invention includes: a case having an accommodation space in the case; and an electrode body disposed in the accommodation space in the case, and including a plurality of electrode plates having an active material layer including an active material and a substrate, and separator. At least one of the electrode plates has an active material layer forming portion in which the active material layer is formed on the substrate and a non-active material layer forming portion in which the active material layer is not formed. At least the non-active material layer forming portion contacts an inner wall of the case.

A battery according to still another aspect of the present invention includes: a tubular case; and an electrode body having a positive plate and a negative plate wound with a separator interposed therebetween. The electrode body is accommodated in the case, and includes a spacer on both ends of the electrode body in a winding axial direction. At least a part of an outer circumferential portion of the spacer contacts an inner wall surface of the case.

A battery according to yet another aspect of the present invention includes: a battery case including a tubular portion having an accommodation space in the tubular portion; an electrode body accommodated in the accommodation space, including a positive plate, a negative plate, and a separator disposed between the positive plate and the negative plate, the positive plate, the negative plate, and the separator being disposed as contacting an inner face of the tubular portion along the inner face of the tubular portion, the electrode body including a tubular hollow portion; and a spacer accommodated in the hollow portion and contacting an inner circumferential face of the electrode body.

A battery according to yet another aspect of the present invention includes: a conductive battery case; a cylindrical electrode body accommodated in the battery case and including a positive plate, a negative plate, and a separator disposed between the positive plate and the negative plate, the cylindrical electrode body including a diameter reducing portion whose outer diameter is smaller than an inner diameter of the battery case; and a conductive spacer disposed between an outer circumferential face of the diameter reducing portion and an inner face of the battery case to electrically connect the cylindrical electrode body to the battery case.

A battery according to yet another aspect of the present invention includes: a battery case including a tubular portion; a cylindrical electrode body including a positive plate, a negative plate, and a separator disposed between the positive plate and the negative plate, the cylindrical electrode body including a diameter reducing portion whose outer diameter is smaller than an inner diameter of the tubular portion; and a spacer disposed between the tubular portion and the cylindrical electrode body, the spacer contacting an inner face of the tubular portion and an outer face of the cylindrical electrode body. The cylindrical electrode body in the tubular portion is disposed at a position at which an axis of the cylindrical electrode body is different from an axis of the tubular portion.

A battery according to yet another aspect of the present invention includes: a case having an accommodation space in the case; and an electrode body disposed in the accommodation space in the case and including a plurality of electrode plates having an active material layer including an active material and a substrate, and separator. At least one of the plurality of electrode plates or the separator includes a wide width portion and a narrow width portion whose widths are different from each other in a direction vertical to a longitudinal direction of the electrode body or the separator.

The battery is capable of decreasing the amount of electrodes used with respect to an accommodation space in a case such as a battery case while suppressing the unsteadiness of an electrode body in the case.

BRIEF DESCRIPTION OF DRAWINGS

The foregoing and other features of the invention will become apparent from the following description and drawings of an illustrative embodiment of the invention in which:

FIGS. 8A to 8C show perspective views of another exemplary spacer according to the present invention;

FIGS. 10A to 10C show perspective views of yet another exemplary spacer according to the present invention;

DESCRIPTION OF EMBODIMENTS

Figure 1:
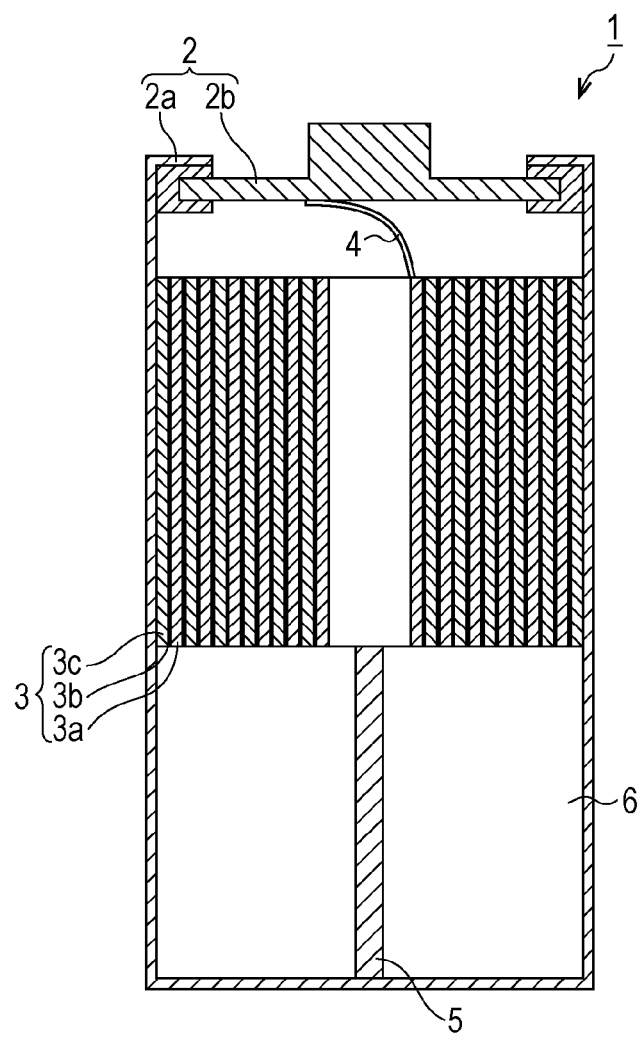
FIG. 1 shows a cross sectional view of a battery according to a first embodiment in a first aspect of the present invention.

Preferred embodiments of the present invention will be described hereinafter.

Outline of Embodiments

According to an aspect of the present invention, there is provided a battery including: a case having an accommodation space in a tubular interior; and an electrode body disposed in the accommodation space in the case, and including a positive plate, a negative plate, and a separator disposed between the positive plate and the negative plate. A spacer formed of a dense body and an electrolyte storage space in which an electrolyte is stored are provided between the electrode body and the case on one end or both ends of the case in an axial direction of the electrode body.

With this configuration, an electrode group shorten in the axial direction of the battery case is used, so that a battery at low costs can be provided. Moreover, even though the separator is excessively impregnated with an electrolyte in order to prolong a battery life and the electrolyte overflows from the electrode group, the electrolyte can be stored in the electrolyte storage space. Furthermore, an internal pressure increase in the battery can be relaxed because the electrolyte storage space is provided, and a battery of high energy density and a long life can be provided.

In addition, in the case where the battery is laterally disposed, when the electrolyte included in the separator is decreased, the overflown electrolyte stored in the electrolyte storage space is again absorbed in the separator because of a capillary action or the like, so that an internal resistance increase in the battery due to the drying up of the solution in the separator can be prevented, and a battery of a longer life can be provided. Moreover, a dense body is used for the spacer to provide a spacer of high strength. The spacer supports the electrolyte storage space, so that it can be prevented that the space is deformed due to an external force or the like.

In the battery according to this aspect, the electrode body may be disposed close to a positive electrode terminal formed on one end face of the battery case; and the electrolyte storage space may be formed on an opposite side of the positive electrode terminal side of the electrode body.

Thus, a distance between the positive electrode terminal and the electrode group provided on the battery case can be shortened, and an electrical resistance increase and a discharge efficiency decrease can be prevented in connecting the positive electrode terminal to the electrode group.

In the battery according to this aspect, the spacer may be disposed in the electrolyte storage space with a gap; one end of the spacer may contact a part of one end face of the electrode body in an axial direction; and other end of the spacer may contact one end face of the battery case to fix the electrode body so that the electrode body is not moved in the axial direction.

Thus, it can be prevented that the electrode group enters the electrolyte storage space, and the occurrence of a short circuit can be prevented, which is caused by the movement of the electrode group in the axial direction to electrically disconnect the positive electrode terminal. Moreover, a gap is provided between the battery case and the electrode group even though the spacer is disposed, so that the electrolyte overflowing from the electrode group can be stored in the electrolyte storage space without being obstructed by the spacer.

In the battery according to this aspect, the spacer may be formed of a plurality of plate members disposed as erected in an axial direction of the battery case.

Thus, in the case where the electrode group has a wound structure in which the positive plate, the negative plate, and the separator are wound in a coiled shape, the winding displacement of the electrode group can be prevented by contacting one end face of the electrode group with one ends of the plurality of plate members. Moreover, the plate members are disposed in the battery case as erected, so that it can be prevented that the electrolyte storage space is greatly narrowed because the spacer is disposed.

In the battery according to this aspect, the spacer may be formed of a columnar member.

Thus, the spacer can be easily manufactured by cutting a columnar rod member having a certain length in the axial direction at a desired position. Moreover, when a hollow space is provided in the columnar member, the region of the electrolyte storage space can be provided much wider than in a solid member.

In the battery according to this aspect, the spacer may have elasticity in the axial direction of the battery case, and dimensions in the axial direction may be deformable.

Thus, even though the battery is vibrated in the axial direction in order to again impregnate the separator with the electrolyte stored in the electrolyte storage space, the occurrence of a short circuit caused by the movement of the electrode group and the displacement of the electrode group caused by vibrations can be prevented because the spacer serves as a spring.

According to another aspect of the present invention, there is provided a battery including: a case having an accommodation space in the case; and an electrode body disposed in the accommodation space in the case, and including a plurality of electrode plates having an active material layer including an active material and a substrate, and separator. At least one of the electrode plates has an active material layer forming portion in which the active material layer is formed on the substrate and a non-active material layer forming portion in which the active material layer is not formed. At least the non-active material layer forming portion contacts an inner wall of the case.

With the battery according to this aspect, at least one of the plurality of electrode plates is configured to include the active material layer forming portion and the non-active material layer forming portion, so that the amount of the active material coated, that is, the amount of electrodes used can be decreased as compared with a configuration in which the non-active material layer forming portion is not provided. Moreover, the unsteadiness of the electrode body in the case can be suppressed as compared with a configuration in which the electrode plate is formed while the substrate is made shorter.

In the battery according to this aspect, the electrode body may have a pair of the non-active material layer forming portions on both ends of the electrode body; and the active material layer forming portion may be provided between the pair of the non-active material layer forming portions.

With the battery according to this aspect, the width of the active material layer forming portion in one direction, that is, fabrication errors in the width of the region functioning as an electrode can be suppressed as compared with a configuration in which the active material layer forming portion is provided on both ends of the electrode body.

In the battery according to this aspect, the plurality of electrode plates may be configured by a positive plate and a negative plate; the separator may be disposed between the positive plate and the negative plate; and both of the positive plate and the negative plate may include the active material layer forming portion and the non-active material layer forming portion.

With the battery according to this aspect, the configuration is provided in which the non-active material layer forming portion is formed on both of the positive plate and the negative plate, so that the amount of the active material coated can be further decreased as compared with a configuration in which the non-active material layer forming portion is not formed.

In the battery according to this aspect, the substrate may be a porous body.

With the battery according to this aspect, a porous body is used for the substrate, so that a weight reduction in the battery can be achieved while suppressing the unsteadiness of the electrode body as compared with a configuration in which a non-porous metal plate is used for the substrate.

According to still another aspect of the present invention, there is provided a battery including: a tubular case; and an electrode body having a positive plate and a negative plate wound with a separator interposed therebetween. The electrode body is accommodated in the case, and includes a spacer on both ends of the electrode body in a winding axial direction. At least a part of an outer circumferential portion of the spacer contacts an inner wall surface of the case.

With the battery according to this aspect, the amount of electrodes used with respect to the accommodation space in the case can be decreased as compared with a configuration in which the electrode body is formed across the overall length of the accommodation space in the case.

In the battery according to this aspect, the outer circumferential portion of the spacer may contact the inner wall surface in a direction along a direction in which a pair of closing portions are opposite to each other in the case in a half of a length of a circumference of the inner wall surface or more.

With the battery according to this aspect, the distortion of the case can be suppressed while suppressing the unsteadiness of the electrode body.

In the battery according to this aspect, at least one of the spacers may continuously contact a half of the inner wall surface of the case or more.

With the battery according to this aspect, the distortion of the case can be further suppressed as compared with a configuration in which the spacer intermittently contacts a half or more of the inner wall surface of the case.

In the battery according to this aspect, at least one of the spacers may have a ring shape and may contact all around the inner wall surface in the length of the circumference in a circumferential direction.

With the battery according to this aspect, a reduction in the spacer strength can be suppressed while suppressing the amounts of the materials to form the spacer as compared with a configuration in which at least one of the spacers is a solid body with no hollow portion, for example.

According to yet another aspect of the present invention, there is provided a battery including: a battery case including a tubular portion having an accommodation space in the tubular portion; an electrode body accommodated in the accommodation space, including a positive plate, a negative plate, and a separator disposed between the positive plate and the negative plate, the positive plate, the negative plate, and the separator being disposed as contacting an inner face of the tubular portion along the inner face of the tubular portion, the electrode body including a tubular hollow portion; and a spacer accommodated in the hollow portion and contacting an inner circumferential face of the electrode body.

With this configuration, the electrode body is wound around the hollow portion, so that the amount of electrodes used can be decreased as compared with the case where the electrode body is wound with no hollow portion.

Moreover, the spacer is accommodated in the hollow portion to contact the inner circumferential face of the electrode body, and the outer circumferential face on the opposite side of the inner circumferential face on the hollow portion side of the electrode body contacts the inner face of the tubular portion, so that the electrode body can be supported by the spacer from the inner side, and can be externally supported by the tubular portion. Thus, the unsteadiness of the electrode body in the battery case can be suppressed. Accordingly, the amount of electrodes used can be decreased while suppressing the unsteadiness of the electrode body in the battery case.

In the battery according to this aspect, the spacer may press the electrode body to the tubular portion side.

With this configuration, force to support the electrode body by the spacer in the tubular portion can be improved. Moreover, a distance between the electrodes can be decreased, so that the input/output resistance of the battery can be decreased.

In the battery according to this aspect, the spacer may be formed of an elastic body.

With this configuration, the electrode body can be positioned by pressing the electrode body to the inner face side of the tubular portion using the elastic force of the spacer.

In the battery according to this aspect, the spacer may contact all around the inner circumferential face of the electrode body.

With this configuration, the unsteadiness of the electrode body in the battery case can be further suppressed.

In the battery according to this aspect, the battery case may be of conductivity; the negative plate may be disposed on at least a part of an outer face of the electrode body; and the negative plate of the outer face may contact the inner face of the tubular portion.

With this configuration, the negative plate of the electrode body can be electrically connected to the battery case.

According to yet another aspect of the present invention, there is provided a battery including: a conductive battery case; a cylindrical electrode body accommodated in the battery case and including a positive plate, a negative plate, and a separator disposed between the positive plate and the negative plate, the cylindrical electrode body including a diameter reducing portion whose outer diameter is smaller than an inner diameter of the battery case; and a conductive spacer disposed between an outer circumferential face of the diameter reducing portion and an inner face of the battery case to electrically connect the cylindrical electrode body to the battery case.

With this configuration, the amount of electrodes used can be decreased as compared with the case where the cylindrical electrode body does not include the diameter reducing portion whose outer diameter is smaller than the inner diameter of the battery case. Moreover, the spacer is disposed between the outer circumferential face of the diameter reducing portion and the inner face of the battery case, so that the unsteadiness of the cylindrical electrode body in the battery case can be suppressed.

Accordingly, the amount of electrodes used can be decreased while suppressing the unsteadiness of the electrode body in the battery case.

Furthermore, the spacer electrically connects the cylindrical electrode body to the battery case, so that the spacer for preventing the unsteadiness of the cylindrical electrode body can be used for electrical connection between the cylindrical electrode body and the battery case.

In the battery according to this aspect, an outer circumferential face of the cylindrical electrode body may be electrically connected to the inner face of the battery case only through the spacer.

In the battery according to this aspect, the spacer may be disposed on a middle portion of the cylindrical electrode body in an axial direction.

With this configuration, the deformation of the middle portion of the cylindrical electrode body in the axial direction can be prevented. The middle portion is relatively prone to be deformed.

In the battery according to this aspect, the negative plate may be disposed at least on an outer face of the cylindrical electrode body; and the negative plate of the outer face of the cylindrical electrode body may contact the spacer.

With this configuration, the configuration can be simplified as compared with a configuration in which for example, the lead wire is used to electrically connect the negative plate to the spacer.

The spacer may be made of a metal braided in a mesh form.

With this configuration, the shape of the spacer can be deformed, so that the accommodation of the spacer into the battery case can be facilitated.

The spacer may be made of a wire material in a coil form.

With this configuration, manufacturing costs can be decreased as compared with the case where a mold or the like is used to shape the shape of the spacer.

The spacer may entirely surround an outer circumferential portion of the diameter reducing portion.

With this configuration, the deformation of the cylindrical electrode body caused by locally and externally applying force from the spacer to the cylindrical electrode body can be suppressed, and the contact area between the cylindrical electrode body and the spacer can be increased, so that electrical resistance between the cylindrical electrode body and the battery case can be decreased.

In the battery according to this aspect, an electrolyte storage space may be provided between the outer face of the cylindrical electrode body and the inner face of the battery case.

With this configuration, even though the separator is excessively impregnated with an electrolyte in order to prolong a battery life and the electrolyte overflows from the electrode body, the electrolyte can be stored in the electrolyte storage space. Moreover, an internal pressure increase in the battery can be relaxed because the electrolyte storage space is provided, and a battery of high energy density and a long life can be provided.

Furthermore, when the battery is tilted and the electrolyte included in the separator is decreased, the overflown electrolyte stored in the electrolyte storage space is again absorbed in the separator because of a capillary action or the like, so that an internal resistance increase in the battery due to the liquid shortage of the separator can be prevented, and a battery of a longer life can be provided.

According to yet another aspect of the present invention, there is provided a battery including: a battery case including a tubular portion; a cylindrical electrode body including a positive plate, a negative plate, and a separator disposed between the positive plate and the negative plate, the cylindrical electrode body including a diameter reducing portion whose outer diameter is smaller than an inner diameter of the tubular portion; and a spacer disposed between the tubular portion and the cylindrical electrode body, the spacer contacting an inner face of the tubular portion and an outer face of the cylindrical electrode body. The cylindrical electrode body in the tubular portion is disposed at a position at which an axis of the cylindrical electrode body is different from an axis of the tubular portion.

With this configuration, the outer diameter of the cylindrical electrode body is smaller than the inner diameter of the battery case, so that the amount of electrodes used can be decreased as compared with the case where the cylindrical electrode body having the same size as the inner diameter of the battery case is used, for example. Moreover, the spacer contacts the outer face of the cylindrical electrode body and the inner face of the battery case, so that the unsteadiness of the cylindrical electrode body in the battery case can be suppressed.

Accordingly, the amount of electrodes used can be decreased while suppressing the unsteadiness of the electrode body in the battery case.

Furthermore, the cylindrical electrode body in the tubular portion is disposed at a position at which the axis of the cylindrical electrode body is different from the axis of the tubular portion, so that the spacer can be disposed closer to the axis of the tubular portion in the battery case, and the degree of freedom of the disposition of the spacer can be improved.

In the battery according to this aspect, the outer face of the cylindrical electrode body may contact the inner face of the tubular portion.

With this configuration, at least one side of the cylindrical electrode body can be supported by the tubular portion, so that the unsteadiness of the cylindrical electrode body in the battery case can be suppressed.

In the battery according to this aspect, the battery case may be of conductivity; the negative plate may be disposed at least on a part of an outer face of the cylindrical electrode body; and the negative plate of the outer face may contact the inner face of the tubular portion.

With this configuration, the negative plate of the cylindrical electrode body can be electrically connected to the battery case.

In the battery according to this aspect, a length of the cylindrical electrode body in an axial direction may be a length across an overall length of the accommodation space in a direction along the axial direction; and the spacer may have a length across an overall length of the cylindrical electrode body in an axial direction.

With this configuration, the unsteadiness of the electrode body in the battery case can be more reliably prevented.

According to yet another aspect of the present invention, there is provided a battery including: a case having an accommodation space in the case; and an electrode body disposed in the accommodation space in the case and including a plurality of electrode plates having an active material layer including an active material and a substrate, and separator. At least one of the plurality of electrode plates or the separator includes a wide width portion and a narrow width portion whose widths are different from each other in a direction vertical to a longitudinal direction of the electrode body or the separator.

With the battery according to this aspect, the amount of electrodes used with respect to the accommodation space in the case can be decreased while suppressing the unsteadiness of the electrode body in the case, or the amounts of materials to form the electrode body can be suppressed as compared with a configuration in which the widths of the electrode plate and the separator are uniform. Moreover, the amounts of materials to form the electrode body can be decreased, so that the weight of the battery can be reduced.

In the battery according to this aspect, any of the plurality of electrode plates may include the wide width portion and the narrow width portion whose widths are different from each other.

With the battery according to this aspect, the amount of electrodes used can be decreased while holding the electrolyte in the separator as compared with a configuration in which only one of the plurality of electrode plates includes the wide width portion and the narrow width portion whose widths are different from each other, and the strength can be further provided on locations to contact.

In the battery according to this aspect, the plurality of electrode plates may be configured by a positive plate and a negative plate; the electrode body may be configured such that the positive plate, the negative plate, and the separator are wound as an axis along the longitudinal direction is in a center; in the electrode body, a center portion wound at a position close to the axis may be the wide width portion; and in the electrode body, a peripheral portion wound around the center portion may be the narrow width portion.

With the battery according to this aspect, the used amount of the metal plate can be suppressed as compared with a configuration in which the center portion is the narrow width portion and the peripheral portion is the wide width portion.

In the battery according to this aspect, the separator may include the wide width portion and the narrow width portion; and in the longitudinal direction, the width of the narrow width portion of the plurality of electrode plates and at least a part of the width of the narrow width portion of the separator may have same lengths.

With the battery according to this aspect, the position can be adjusted in the narrow width portion in the state in which the electrode plate is opposite to the separator, and the electrode plate can be more easily manufactured.

In the battery according to this aspect, the active material may be coated on the narrow width portion; and the active material may not be coated on the wide width portion.

With the battery according to this aspect, the amount of electrodes used can be further decreased as compared with a configuration in which the active material is coated on both of the narrow width portion and the wide width portion.

It is noted that preferably, the battery according to the present invention is a nickel-metal hydride rechargeable cell in which the positive plate has nickel hydroxide as a positive active material; and the negative plate has a hydrogen storage alloy as a negative active material.

First Aspect

First Embodiment

A first embodiment in a first aspect of the present invention will be described below with reference to FIGS. 1 to 5. A battery 1 according to this embodiment is an alkaline secondary battery such as a nickel-metal hydride rechargeable cell. Specifically, the battery 1 is a low capacity type such as an AA battery having a capacity of 1800 mAh or less and an AAA battery having a capacity of 650 mAh or less, for example.

The battery 1 according to this embodiment is configured by a metal battery case 2 having a nickel-plated surface and an electrode group 3 disposed in the battery case 2.

As shown in FIG. 1, the battery case 2 is configured by a battery case main body 2a having a cylindrical shape with a bottom in which one end is opened and the other end is closed and a cover 2b that closes the opening of the battery case main body 2a through an insulator. The battery case main body 2a becomes a negative electrode terminal of the battery 1 by contacting a negative plate 3c, described later. Moreover, the cover 2b becomes the positive electrode terminal of the battery 1 by contacting a positive plate 3a, described later, through an elastic connecting terminal 4.

The electrode group 3 is disposed in such a way that the electrode group 3 is adjacent to the cover 2b in the battery case main body 2a, and includes the positive plate 3a, the negative plate 3c, and a separator 3b disposed between them and including an electrolyte. It is noted that in this embodiment, the electrode group 3 has a cylindrical shape in which the positive plate 3a, the negative plate 3c, and the separator 3b are wound in a coiled shape. Alternatively, the electrode group 3 may have a rectangular shape in which the positive plate 3a, the negative plate 3c, and the separator 3b are stacked on each other.

The positive plate 3a is a plate that a mixture of a nickel hydroxide active material and a conductive cobalt compound is filled in hollow spaces of a positive electrode substrate made of nickel foam. It is noted that the nickel hydroxide active material is nickel hydroxide, for example, in the case of a nickel-cadmium rechargeable cell, whereas the nickel hydroxide active material is nickel hydroxide added with calcium hydroxide, for example, in the case of a nickel-metal hydride rechargeable cell.

The negative plate 3c includes a negative current collector formed of a flat, nickel-plated steel sheet with punched holes, for example, and a negative active material coated on the negative current collector. It is noted that the negative active material is a mixture of cadmium oxide powder and metal cadmium powder, for example, in the case of a nickel-cadmium rechargeable cell, whereas the negative active material is hydrogen storage alloy powder mainly of AB5 type (rare earth-Ni), AB3.0-3.8 type (rare earth-Mg—Ni), or AB2 type (Laves phase), for example, in the case of a nickel-metal hydride rechargeable cell.

The separator 3b is made of polyolefin nonwoven fabric, for example, and the separator 3b is impregnated with an electrolyte containing primarily potassium hydroxide or sodium hydroxide.

As shown in FIG. 1, the battery 1 according to this embodiment is configured such that the length of the electrode group 3 is shortened in the axial direction of the battery case 2 (hereinafter, noted as the axial direction), an electrolyte storage space 6 is provided on the opposite side of the positive electrode terminal side of the battery 1 for storing an electrolyte, and a spacer 5 is disposed in the electrolyte storage space 6.

The spacer 5 is a dense body, and made of a resin that does not react with an electrolyte such as an acrylic resin, a polypropylene resin, and a nylon resin, or a material such as stainless steel, and the spacer 5 is disposed in such a way that one end contacts a part of one end face closed of the battery case main body 2a and the other end contacts a part of one end face of the electrode group 3. Thus, since the connecting terminal 4 is disposed on the positive electrode terminal side and the spacer 5 is disposed on the opposite side of the positive electrode terminal side, the electrode group 3 is fixed to the battery case 2 as the both ends of the electrode group 3 are sandwiched in the axial direction. It is noted herein that the dense body may be a dense body whose porosity is 0 to 10% in a frame shape. Since a frame-shaped dense body can secure spacer strength when a member configuring the frame is a dense body, the dense body makes a spacer formed of the dense body.

Figure 2:
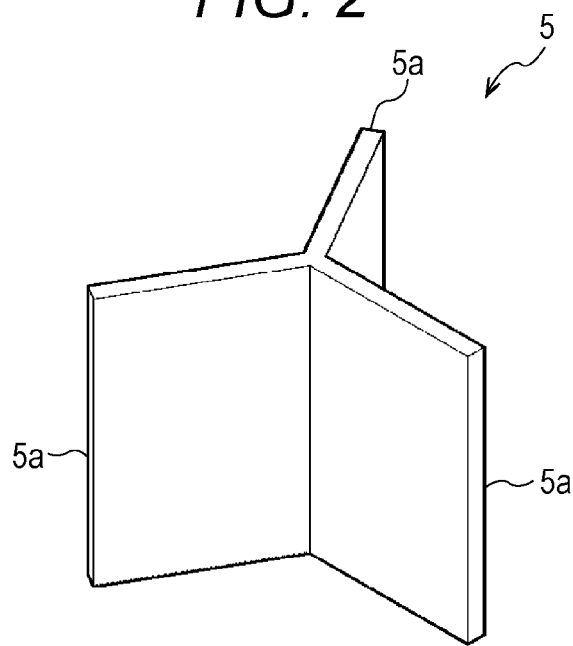
FIG. 2 shows a perspective view of an exemplary spacer according to the first embodiment in the first aspect of the present invention.

Moreover, as shown in FIG. 2, the spacer 5 is configured such that three plate members 5a are disposed as erected at equal angles (120°) with each other as the axis of the battery case 2 is in the center, one ends of the plate members 5a are joined in the center, and the plate members 5a are integrally shaped. The length of the spacer 5 in the axial direction is formed in the same length as the distance from one end face of the battery case main body 2a to one end face of the electrode group 3.

Figure 3:
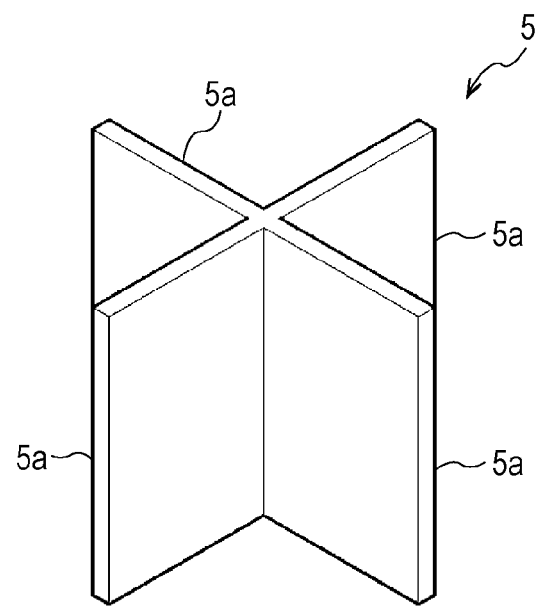
FIG. 3 shows a perspective view of an exemplary spacer according to the first embodiment in the first aspect of the present invention.

It is noted that as shown in FIG. 3, the spacer 5 may be configured by four plate members 5a deposed as erected at equal angles (90°) with each other as the axis of the battery case 2 is in the center.

Figure 4:
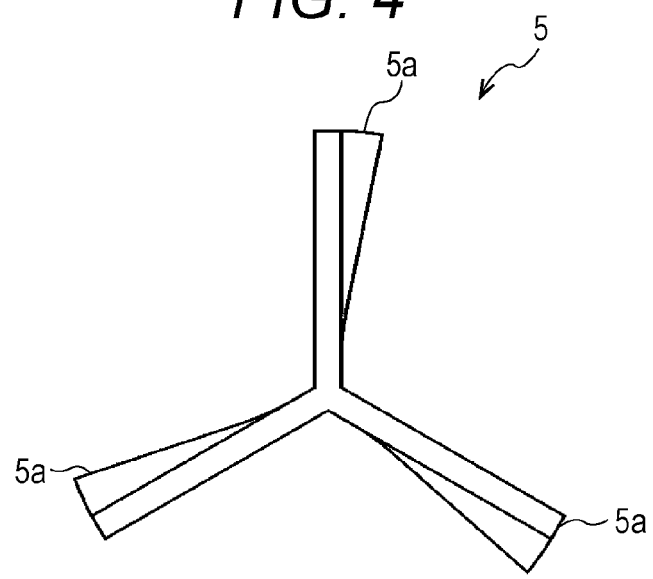
FIG. 4 shows a plan view of an exemplary spacer according to the first embodiment in the first aspect of the present invention.
Figure 5:
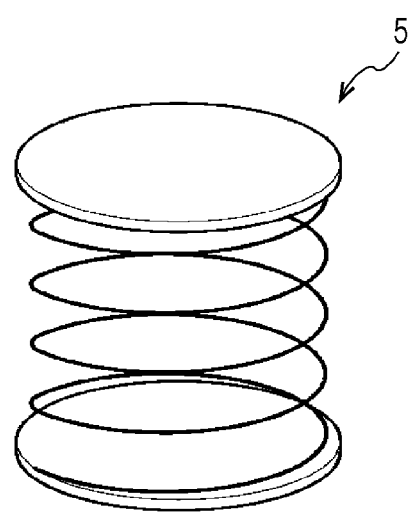
FIG. 5 shows a perspective view of an exemplary spacer according to the first embodiment in the first aspect of the present invention.

Alternatively, the spacer 5 may be configured such that the spacer 5 has elasticity in the axial direction and dimensions are changeable in the axial direction. For example, the spacer 5 may be configured such that one end of the plate member 5a contacting the electrode group 3 is helically positioned to the other end of the plate member 5a contacting the battery case 2 as shown in FIG. 4, or may be configured such that the spacer 5 is formed in a spring shape as shown in FIG. 5.

The electrolyte storage space 6 is a space provided between the electrode group 3 and the battery case main body 2a, and the spacer 5 is disposed in a part of the space. Since the spacer 5 contacts only a part of the electrode group 3, an electrolyte overflowing from the electrode group 3 is guided to and stored in the space without being obstructed by the spacer 5.

In the battery 1 according to this embodiment, the electrode group 3 whose length is shortened in the axial direction of the battery case 2 is used, so that a battery at low costs can be provided. Moreover, even though the separator 3b is excessively impregnated with an electrolyte in order to increase energy density and to prolong a battery life, the electrolyte overflowing from the electrode group 3 can be stored in the electrolyte storage space 6. Furthermore, an internal pressure increase in the battery 1 can be relaxed because the electrolyte storage space 6 is provided, and the battery 1 of high energy density and a long life can be provided.

In addition, in the case where the battery 1 according to this embodiment is laterally disposed, the overflown electrolyte stored in the electrolyte storage space 6 is again absorbed in the separator 3b because of a capillary action or the like when the electrolyte included in the separator 3b is decreased, so that an internal resistance increase in the battery 1 due to the drying up of the solution in the separator 3b can be prevented, and the battery 1 of a longer life can be provided.

Moreover, in the battery 1 according to this embodiment, the electrode group 3 is disposed close to the cover 2b (the positive electrode terminal), and the electrolyte storage space 6 is formed between the electrode group 3 and the battery case main body 2a and provided on the opposite side of the positive electrode terminal side, so that a distance between the positive electrode terminal and the electrode group 3 provided in the battery case 2 can be shortened, and an electrical resistance increase and a discharge efficiency decrease can be prevented in connecting the positive electrode terminal to the electrode group 3.

The battery 1 according to this embodiment includes the spacer 5 disposed in the electrolyte storage space 6 with a gap, one end contacts a part of one end face of the electrode group 3 in the axial direction, the other end contacts one end face of the battery case 2, and the spacer 5 fixes the electrode group 3 in no movement in the axial direction. Thus, it can be prevented that the electrode group 3 enters the electrolyte storage space 6, and the occurrence of a short circuit can be prevented, which is caused by the movement of the electrode group 3 in the axial direction to electrically disconnect the positive electrode terminal. Moreover, a gap is provided between the battery case 2 and the electrode group 3 even though the spacer 5 is disposed, so that an electrolyte overflowing from the electrode group 3 can be stored in the electrolyte storage space 6 without being obstructed by the spacer 5.

Furthermore, the spacer 5 is disposed as erected in the axial direction. In the case where the electrode group 3 has a wound structure in which the positive plate 3a, the negative plate 3c, and the separator 3b are wound in a coiled shape, winding displacement in the electrode group 3 can be prevented by contacting one end face of the electrode group 3 with one ends of a plurality of the plate members 5a. In addition, the plate members 5a are disposed in the battery case 2 as the plate members 5a are erected, so that it can be prevented that the electrolyte storage space 6 is greatly narrowed by disposing the spacer 5.

Alternatively, the spacer 5 may be configured such that the spacer 5 has elasticity in the axial direction and dimensions are changeable in the axial direction. With this configuration, even though the battery 1 is vibrated in the axial direction in order to again impregnate the separator 3b with the electrolyte stored in the electrolyte storage space 6, the occurrence of a short circuit due to the movement of the electrode group 3 and displacement in the electrode group 3 caused by vibrations, for example, can be prevented because the spacer 5 is bent to deform dimensions for serving as a spring.

Second Embodiment

Figure 6:
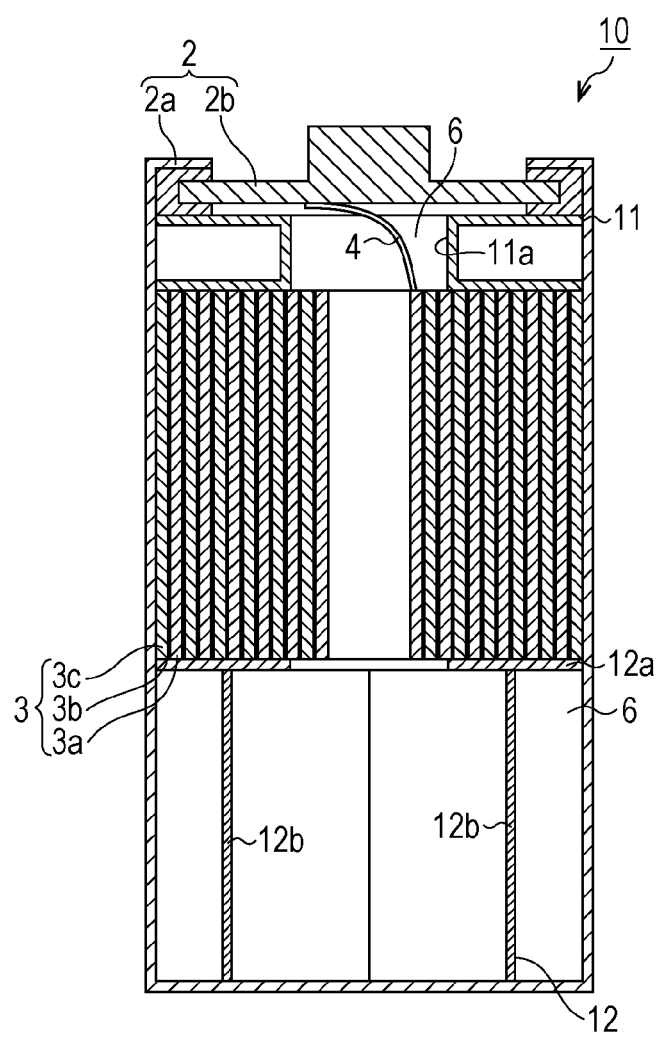
FIG. 6 shows a cross sectional view of a battery according to a second embodiment in the first aspect of the present invention.

Next, a second embodiment in the first aspect of the present invention will be described with reference to FIGS. 6 and 7. The battery 10 according to this embodiment is different in the configuration of a spacer from the first embodiment. Since the other configurations are similar to the first embodiment, the description is omitted.

In this embodiment, in a battery case 2, a first spacer 11 is disposed on the positive electrode terminal side of an electrode group 3, and a second spacer 12 is disposed on the opposite side of the positive electrode terminal side of the electrode group 3.

Figure 7:
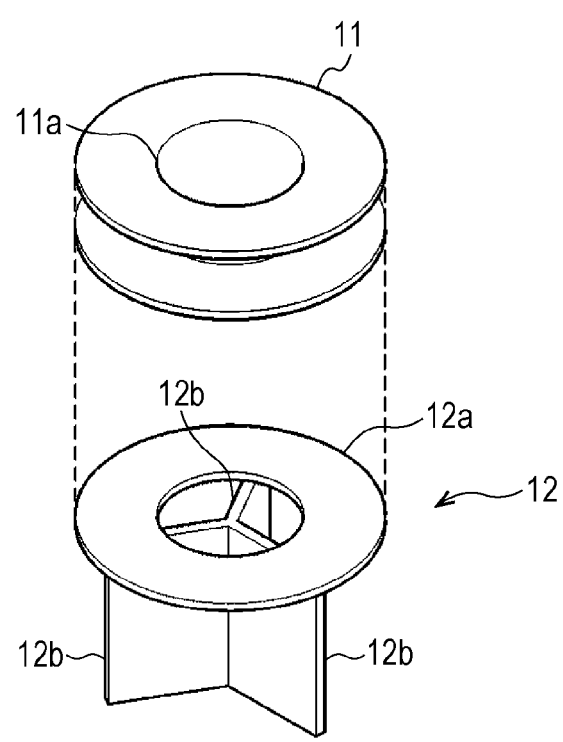
FIG. 7 shows a perspective view of an exemplary spacer according to the second embodiment in the first aspect of the present invention.

As shown in FIG. 7, the first spacer 11 has a disk shape in which a hole 11a is formed in the center part to dispose a connecting terminal 4. As shown in FIG. 6, the first spacer 11 is disposed in such a way that one end face contacts a battery case main body 2a and the other end face contacts the electrode group 3. It is noted that a plurality of holes may be formed on the first spacer 11 other than the hole 11a to dispose the connecting terminal 4.

As shown in FIG. 7, the second spacer 12 is configured by a disk 12a formed with a hole in the center part and a plurality of plate members 12b integrally provided on one face of the disk 12a and disposed as erected at equal angles as the axis of the battery case 2 is in the center. One face of the disk 12a on which the plate members 12b is not provided contacts the electrode group 3, and the end face of the plate member 12*b* is disposed so as to contact the battery case main body 2*a*.

Both of the first spacer 11 and the second spacer 12 are made of a resin such as an acrylic resin, a polypropylene resin, and a nylon resin, or a material with rigidity such as stainless steel as similar to the first embodiment. The electrode group 3 is fixed to the battery case 2 as the both ends of the electrode group 3 are sandwiched in the axial direction because the first spacer 11 is disposed on the positive electrode terminal side and the second spacer 12 is disposed on the opposite side of the positive electrode terminal side.

An electrolyte storage space 6 is a space provided between the electrode group 3 and the battery case main body 2*a*, and the first spacer 11 and the second spacer 12 are disposed in a part of the space. Since the first spacer 11 and the second spacer 12 contact only a part of the electrode group 3, an electrolyte overflowing from the electrode group 3 is guided to and stored in the space without being obstructed by the first spacer 11 and the second spacer 12.

In the battery 10 according to this embodiment, the electrode group 3 is fixed as both end portions of the electrode group 3 in the axial direction are sandwiched between the first spacer 11 and the second spacer 12, so that the electrode group 3 is reliably fixed to the battery case 2, and the occurrence of a short circuit caused by the movement of the electrode group 3 can be reliably prevented.

It is noted that the present invention is not limited to the first and the second embodiments. The present invention is also applicable to a secondary battery such as a lithium ion secondary cell in addition to an alkaline secondary battery, for example, or may be applied to a primary battery.

Moreover, the spacer 5 according to the first and the second embodiments may be configured by columnar members 13 as shown in FIGS. 8A to 8C, FIGS. 9A to 9C, and FIGS. 10A to 10C. In these configurations, for the columnar shape, as shown in FIGS. 8A to 8C, FIGS. 9A to 9C, and FIGS. 10A to 10C, the spacer 5 may be configured in a prism shape such as a triangular prism, a square prism, and a hexagonal prism, or the spacer 5 may be configured in a cylindrical prism, not shown. Thus, the spacer 5 can be easily manufactured by cutting the rod member having a columnar shape with a certain length in the axial direction at a desired position.

Figure 9C:
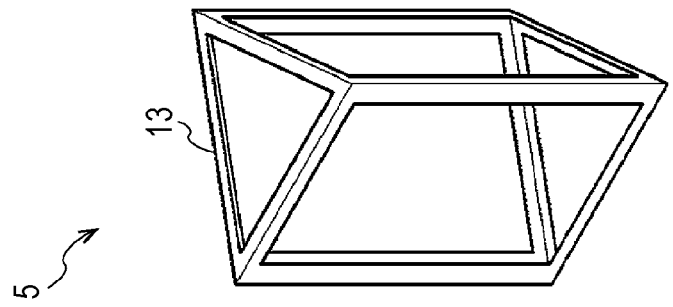
FIGS. 9A to 9C show perspective views of still another exemplary spacer according to the present invention.
Figure 9B:
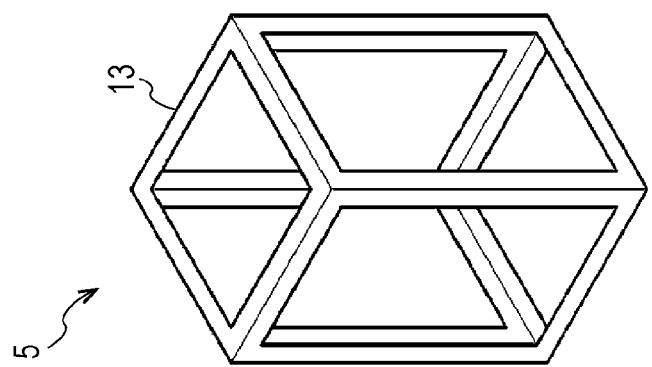
Figure 9A:
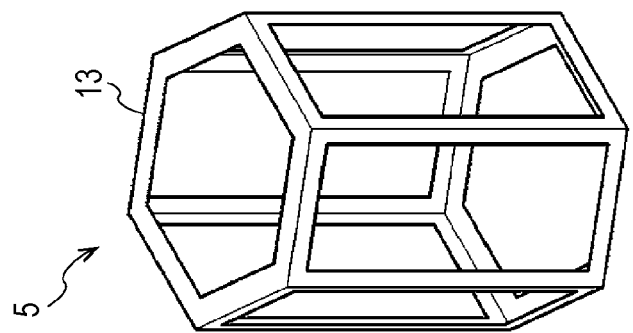

It is noted that, the columnar member 13 may have a hollow portion in the columnar member 13 as shown in FIGS. 8A to 8C, or may be configured by only a frame of the columnar member 13 as shown in FIGS. 9A to 9C. With this configuration, the area of the electrolyte storage space 6 can be provided much wider than in a solid member. Moreover, the contact area between the spacer 5 and a separator 3*b* is made smaller than the contact area of a solid member, so that in the case where the battery 1 is laterally disposed, the overflown electrolyte stored in the electrolyte storage space 6 can be easily and quickly absorbed in the separator 3*b*.

The present invention can be variously modified without departing from the scope of thereof.

Example 1

In the following, tests were conducted by comparing the battery 1 according to the first embodiment with other batteries. The results are shown in Table 1.

<Test Materials>

Batteries of Samples 1 to 4 shown in Table 1 will be described below. Samples 1 to 4 are a nickel-metal hydride rechargeable cell. More specifically, a cylindrical metal case has internal dimensions with a height of 42 mm and a diameter of 13.42 mm. An electrode group wound in a coil shape is accommodated in the metal case, 1.3 g (1.00 cc) of an electrolyte containing a mixture of 4M potassium hydroxide, 3M sodium hydroxide, and 0.8M lithium hydroxide is filled in the metal case, and then the metal case is closed with a metal cover provided with a safety valve. Here, since the size and disposition manner of the electrode group are different in Samples 1 to 4, the different points will be described below.

(Sample 1)

Sample 1 is the battery 1 according to the first embodiment, in which the spacer 5 is disposed on the bottom of a case, the spacer 5 is made of a resin such as polypropylene, acrylic, polyethylene, and nylon or a metal such as stainless steel with a height of 21 mm and a thickness of 0.5 mm, and the electrode group 3 with a height of 21 mm and a space inner diameter of 3 mm is disposed on the spacer 5, as shown in FIGS. 1 and 2. The electrolyte storage space 6 is provided in a region in which the spacer 5 is disposed. One end of the electrode group 3 is electrically connected to the positive electrode terminal provided on the metal cover through the connecting terminal 4.

(Sample 2)

Figure 11:
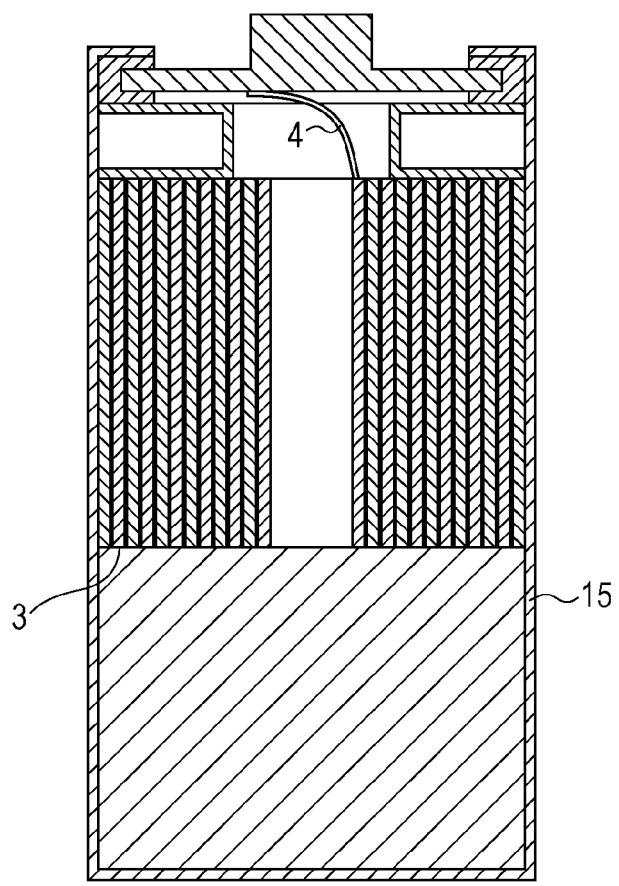
FIG. 11 shows a cross sectional view of Sample 2 in Example 1.

As shown in FIG. 11, in Sample 2, a filler 15 is disposed on the bottom of a case, the filler 15 has a circular cylindrical shape with a height of 21 mm and a diameter of 13.42 mm and made of a resin such as epoxy, acrylic, polyethylene, and nylon or a metal such as stainless steel, and an electrode group 3 with a height of 21 mm and a space inner diameter of 3 mm is disposed on the filler 15.

(Sample 3)

Figure 12:
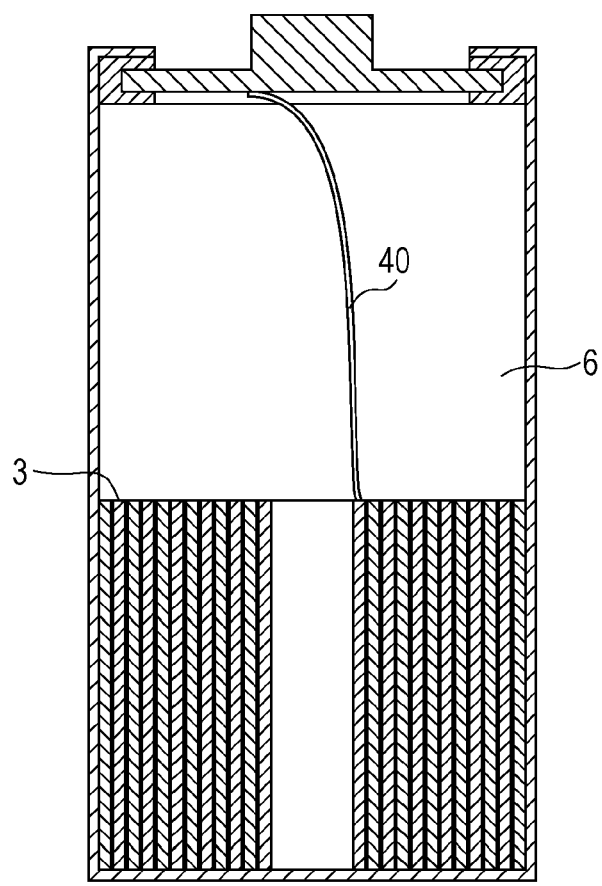
FIG. 12 shows a cross sectional view of Sample 3 in Example 1.

Sample 3 is an embodiment of the present invention. As shown in FIG. 12, an electrode group 3 with a height of 21 mm and a space inner diameter of 3 mm is disposed on the bottom of a case. One end of the electrode group 3 is electrically connected to a positive electrode terminal provided on the metal cover through a connecting terminal 40. An electrolyte storage space 6 is provided between the electrode group 3 and the positive electrode terminal.

(Sample 4)

Figure 13:
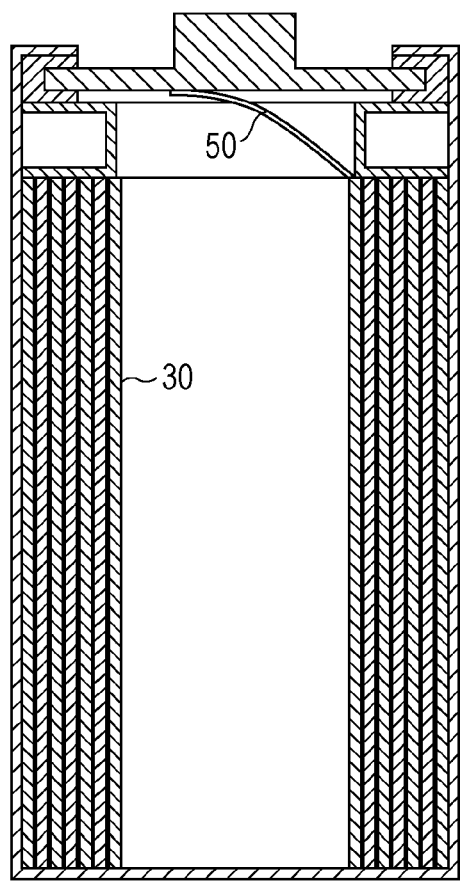
FIG. 13 shows a cross sectional view of Sample 4 in Example 1.

As shown in FIG. 13, in Sample 4, an electrode group 30 with a height of 42 mm and a space inner diameter 7.62 mm is disposed in a case. As compared with the electrode group 3 in Samples 1 to 3, the electrode group 30 has a higher height, the number of turns of a positive plate, a negative plate, and a separator is decreased, and the space inner diameter is larger.

(Method of Preparing Electrode Group)

It is noted that the electrode groups of Samples 1 to 4 were manufactured by methods below.

(Method of Preparing Positive Plate)

For the active material of the positive plate, such an active material was used, in which 7 mass % of cobalt hydroxide was covered on the surface of nickel hydroxide containing 3 mass % of zinc and 0.6 mass % of cobalt in a solid solution state. The positive electrode active material was mixed with an aqueous solution dissolved with a thickener (carboxymethyl cellulose) and 2 mass % of ytterbium oxide to prepare a paste. The paste was filled in nickel foam having a substrate areal density of 320 g/m$^2$ and dried, and the paste-filled nickel foam was pressed to have a porosity of 20%. The pressed nickel foam was cut into a predetermined size, so that a positive plate having a positive electrode capacity of 1 Ah was prepared.

(Method of Preparing Negative Plate)

Hydrogen storage alloy powder (100 parts by mass) in the composition of $La_{0.64}Pr_{0.20}Mg_{0.16}Ni_{3.45}Al_{0.15}$ ground in an average grain size of D50=50 μm was added with an aqueous solution dissolved with a thickener (methylcellulose). A paste was formed by adding 1 part by mass of a binder (styrenebutadiene rubber), and the paste was applied on both sides of a bored steel sheet (an aperture ratio of 50%) having a thickness of 35 μm and dried. The sheet was pressed to have a porosity of 18%, and then cut into a predetermined size, so that a negative plate having a negative electrode capacity of 1.3 Ah was prepared. The positive plate and the negative plate prepared by the methods were wound in a coil shape with a separator that is subjected to sulfonation interposed therebetween, and an electrode group was prepared.

(Initial Formation)

It is noted that prior to conducting the tests, Samples 1 to 4 were subjected to initial formation in accordance with the following procedures. First, Samples 1 to 4 were charged under an environment at a temperature of 20° C. at 0.1 ItA for 12 hours. Subsequently, Samples 1 to 4 were discharged to reach a voltage of 1V at 0.2 ItA, and this process was repeated for two cycles. Samples 1 to 4 were allowed to stand under an environment at a temperature of 40° C. for 48 hours. Samples 1 to 4 were charged under an environment at a temperature of 20° C. at 0.1 ItA for 16 hours. The charging was stopped for one hour, and Samples 1 to 4 were discharged to reach a voltage of 1V at 0.2 ItA. This process was repeated for three cycles, and then the formation was finished.

<Test Results>

TABLE 1

| | Liquid Amount/g | Liquid Amount/cc | Internal Resistance/mΩ | 0.2ItA Discharge Capacity/mAh | 3ItA Discharge Capacity/mAh | Discharge Capacity Ratio (3ItA Discharge Capacity/0.2ItA Discharge Capacity × 100)/% | Internal Pressure/MPa |
|---|---|---|---|---|---|---|---|
| Sample 1 | 1.3 | 1.00 | 40 | 1000 | 813 | 81.3 | 0.5 |
| Sample 2 | 1.3 | 1.00 | 40 | 1000 | 803 | 80.3 | 0.8 |
| Sample 3 | 1.3 | 1.00 | 51 | 995 | 801 | 80.5 | 0.6 |
| Sample 4 | 1.3 | 1.00 | 2000 | 0 | 0 | 0 | Test was not conducted |

<Test Method>

The internal resistance values, the discharge capacity ratios, and the internal pressure values of Samples 1 to 4 were measured by the following method.

(Internal Resistance Value)

Terminals were contacted with the top cover and the bottom of the case of Samples 1 to 4, and internal resistance values were measured using 3560 High Tester made of Hioki E.E. Corporation.

(Discharge Capacity Ratio)

First, Samples 1 to 4 were placed under a measurement environment at a temperature of 20° C., and were charged at 0.1 ItA (100 mA) for 16 hours. The charging was stopped for one hour, Samples 1 to 4 were discharged to reach a voltage of 1 V at 0.2 ItA (200 mA), and a discharge capacity of 0.2 ItA in the discharging (hereinafter, also referred to as a low rate capacity) was measured. Subsequently, Samples 1 to 4 were placed under a measurement environment at a temperature of 20° C., and were charged at 0.1 ItA (100 mA) for 16 hours. The charging was stopped for one hour, Samples 1 to 4 were discharged to reach a voltage of 1 V at 3 ItA (3000 mA), and a discharge capacity of 3 ItA in the discharging (hereinafter, also referred to as a high rate capacity) was measured. Calculation of 3 ItA discharge capacity/0.2 ItA discharge capacity×100 was performed using the results, and a discharge capacity ratio of a high rate capacity to a low rate capacity was calculated.

(Internal Pressure Value)

A hole was bored in Samples 1 to 4, and a jig for internal pressure measurement was mound on the hole. Samples 1 to 4 were placed under a measurement environment at a temperature of 20° C., and charged at 1 ItA (1000 mA) for 1.5 hours, and a maximum internal pressure in the charging was measured.

Here, since it is difficult to conduct a test for the internal pressure in Sample 4 and it is difficult to compare the internal pressure with other samples, in the following, Sample 1, Sample 2, and Sample 3 will be compared with each other.

In the comparison of Sample 1 and Sample 3 with Sample 2, Samples 1 and 3 have a greater discharge capacity ratio and have a smaller internal pressure value than in Sample 2. This can be considered that an increase in the internal pressure in the battery was suppressed and the discharge capacity ratio was increased because Samples 1 to 3 are provided with the electrolyte storage space. Thus, the battery provided with the electrolyte storage space can prevent an increase in the internal pressure and is of high capacity as compared with a battery with no electrolyte storage space.

Moreover, in the comparison of Sample 1 with Sample 3, Sample 1 has a smaller internal resistance value and a greater discharge capacity ratio than in Sample 3. This can be considered that an electrical resistance increase and a discharge efficiency decrease were suppressed to decrease the internal resistance value and the discharge capacity ratio was increased because Sample 1 has a shorter distance between the electrode group and the positive electrode terminal than in Sample 3. Thus, a shorter distance between the electrode group and the positive electrode terminal is preferable to obtain a battery that can prevent an internal resistance increase and is of high capacity.

Example 2

Next, tests were conducted to change the amount of an electrolyte with which the separator 3b is impregnated using the battery 1 according to the first embodiment. The results are shown in Table 2.

<Test Materials>

Sample 1 and Samples 5 to 8 are the nickel-metal hydride rechargeable cell 1 according to the first embodiment. More specifically, as shown in FIGS. 1 and 2, the spacer 5 is disposed on the bottom of the cylindrical metal case and the electrode group 3 is disposed on the spacer 5. An electrolyte containing a mixture of 4M potassium hydroxide, 3M sodium hydroxide, and 0.8 M lithium hydroxide is filled in the case in a predetermined amount shown in Table 2 for every sample, and then the metal case is closed with a metal cover provided with a safety valve. Here, since the amount per unit positive electrode capacity of an electrolyte contained in the separator of a typical battery ranges from 0.8 to 1 cc/Ah, Samples 6 to 8 include an excessive electrolyte more than usual. It is noted that since Sample 1 is the same as Sample 1 in Table 1, and the internal dimensions of the case of Sample 1 and Samples 5 to 8 and the materials of the spacer 5, the electrode group and the like of Sample 1 and Samples 5 to 8 are the same as the test materials of Example 1, the description is omitted here.

<Test Method>

The discharge capacity ratios and internal pressure values of Sample 1 and Samples 5 to 8 were measured. It is noted that since the test method or the method of initial formation are the same as the test method in Example 1, the description is omitted here.

<Test Results>

TABLE 2

| | Liquid Amount/ cc | Positive Electrode Capacity/ Ah | cc/Ah | 0.2ItA Discharge Capacity/ mAh | 3ItA Discharge Capacity/ mAh | Discharge Capacity Ratio (3ItA Discharge Capacity/0.2ItA Discharge Capacity × 100)/% | Internal Pressure/ MPa |
|---|---|---|---|---|---|---|---|
| Sample 5 | 0.77 | 1 | 0.77 | 970 | 146 | 15 | 0.4 |
| Sample 1 | 1 | 1 | 1 | 1000 | 813 | 81.3 | 0.5 |
| Sample 6 | 1.53 | 1 | 1.53 | 990 | 876 | 88.5 | 2 |
| Sample 7 | 2.15 | 1 | 2.15 | 985 | 877 | 89 | 2.5 |
| Sample 8 | 2.3 | 1 | 2.3 | 985 | 882 | 89.5 | 3.0 or more |

As shown in Table 2, the discharge capacity ratio is increased as the liquid amount of the electrolyte included in the separator 3b is increased, and the internal pressure value is increased as well. Here, preferably, the battery has a lower internal pressure value. More specifically, an internal pressure value of 2.5 MPa or less is preferable. However, in the battery 1 according to the first embodiment, the internal pressure value of the battery can be suppressed at an internal pressure value of 2.5 MPa or less even though the amount of the electrolyte included in the separator 3b is increased more or less. Thus, in the battery provided with the electrolyte storage space, the leaked electrolyte can be stored in the electrolyte storage space even though the separator 3b is excessively impregnated with an electrolyte in order to prolong a battery life, so that an internal pressure increase can be prevented, and a battery of high energy density and a long life can be obtained.

Second Aspect

A battery 10 according to one embodiment in a second aspect of the present invention will be described with reference to FIGS. 14 to 19. The battery 10 is an alkaline secondary battery such as a nickel-metal hydride rechargeable cell. For example, the battery 10 is a low capacity type such as an AA battery ("R6" in the IEC (International Electrotechnical Commission), and "AA" in the United States) having a capacity of 1800 mAh or less, or an AAA battery ("R03" in the IEC, and "AAA" in the United States) having a capacity of 650 mAh or less. In the description below, the near side in FIG. 14 is the front side of the battery 10, the right side of FIG. 14 is the right side of the battery 10, and the upper side of FIG. 14 is the upper side of the battery 10.

Figure 14:
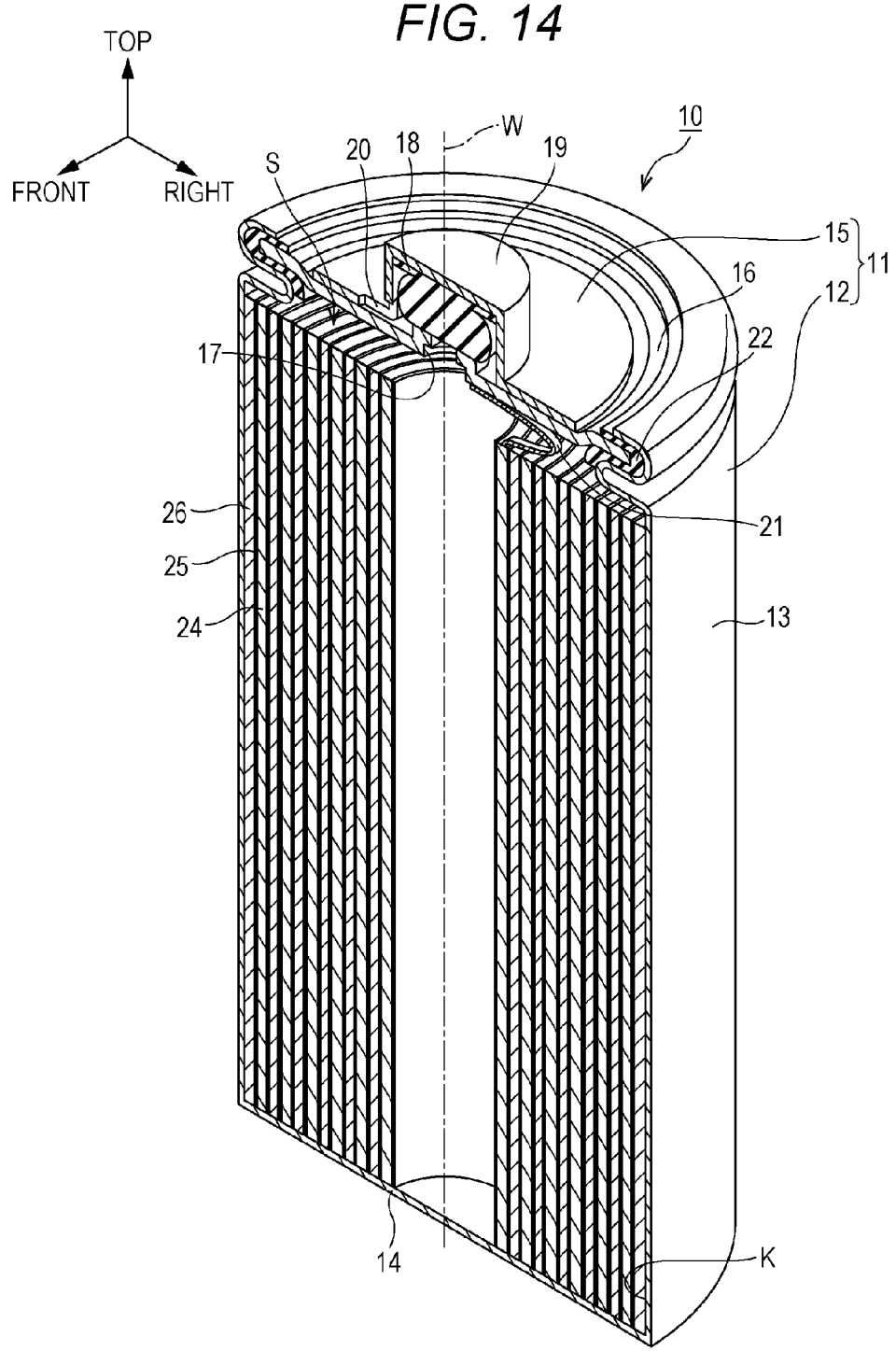
FIG. 14 shows a perspective view of a longitudinal section of a battery according to an embodiment in a second aspect of the present invention.

As shown in FIG. 14, the battery 10 is configured by a battery case 11 and an electrode body 23. The battery case 11 is made of a metal and has a shape elongated in one direction. The battery case 11 is an example of the case, and configured by a battery case main body 12 and a cover 15, including an accommodation space S in the inside. It is noted that one direction is a vertical direction in FIG. 14, the longitudinal direction of the battery case 11, and a direction opposite to the cover 15 and a closing portion 14, described later.

The battery case main body 12 has a nickel-plated surface, and becomes a negative electrode terminal of the battery 10 by electrically connecting a negative plate 26, described later. The battery case main body 12 has a shape in which one end is opened and the other end is closed in the vertical direction. More specifically, the battery case main body 12 includes a tubular portion 13 and the closing portion 14.

The tubular portion 13 has a cylindrical shape elongated in the vertical direction, and the shape of the inner circumferential face seen from the vertical direction is in a perfect circle in which an inner diameter R passing through a center axis W along the vertical direction is constant. The inside of the tubular portion 13 is the accommodation space S in which an electrode body 23, described later, can be accommodated.

At one end of the tubular portion 13 in one direction, that is, at the top end in FIG. 14, an opening 12A is formed to communicate with the inside of the tubular portion 13. The other end of the tubular portion 13 in one direction, that is, the top end in FIG. 14 is closed with the closing portion 14. The closing portion 14 is a circular plate member, and integrally formed with the tubular portion 13.

The cover 15 is electrically connected to a positive plate 24, described later, through an elastic connecting terminal 21, and becomes a positive electrode terminal of the battery 10. The cover 15 includes a cover main body 16, an elastic body 18, and a terminal plate 19. The cover main body 16 is a circular flat plate, made of a conductive material such as a nickel-plated iron material, for example, and electrically connected to the positive plate 24 through the connecting terminal 21. A through hole 17 is formed in the center part of the cover main body 16.

The elastic body 18 is disposed on the top face of the cover main body 16, that is, on the other side of the face opposite to the closing portion 14 in such a way that the elastic body 18 blocks the through hole 17. The elastic body 18 is made of a material such as rubber, for example, and elastically deformed by an external force. The terminal plate 19 is a conductive plate covering the elastic body 18.

More specifically, the terminal plate 19 is electrically connected to the cover main body 16 in the state in which the terminal plate 19 presses the elastic body 18 downward, that is, the terminal plate 19 presses the elastic body 18 against the cover main body 16. The terminal plate 19 is provided with a discharge hole 20 to emit a gas in the battery case 11. For example, when the internal pressure of the battery case 11 is increased and a pressure of a predetermined value or more is applied to the elastic body 18 through the through hole 17, the elastic body 18 is elastically deformed to communicate the inside of the battery case 11 with the discharge hole 20, and a gas in the battery case 11 is discharged to the outside of the battery 10 through the discharge hole 20.

An elastically deformable insulator 22 is sandwiched between the opening 12A of the battery case main body 12 and the cover 15 for sealing. The insulator 22 insulates the battery case main body 12 from the cover 15.

The electrode body 23 is accommodated in the accommodation space S in the battery case 11. The electrode body 23 includes the positive plate 24, the negative plate 26, and a separator 25 disposed between them and having an electrolyte, which are wound in a coiled shape as a winding axis along the vertical direction is in the center. It is noted that the winding axis may be matched with the center axis W or not. However, in the following, for convenience of explanation, the winding axis is matched with the center axis W.

Figure 15:
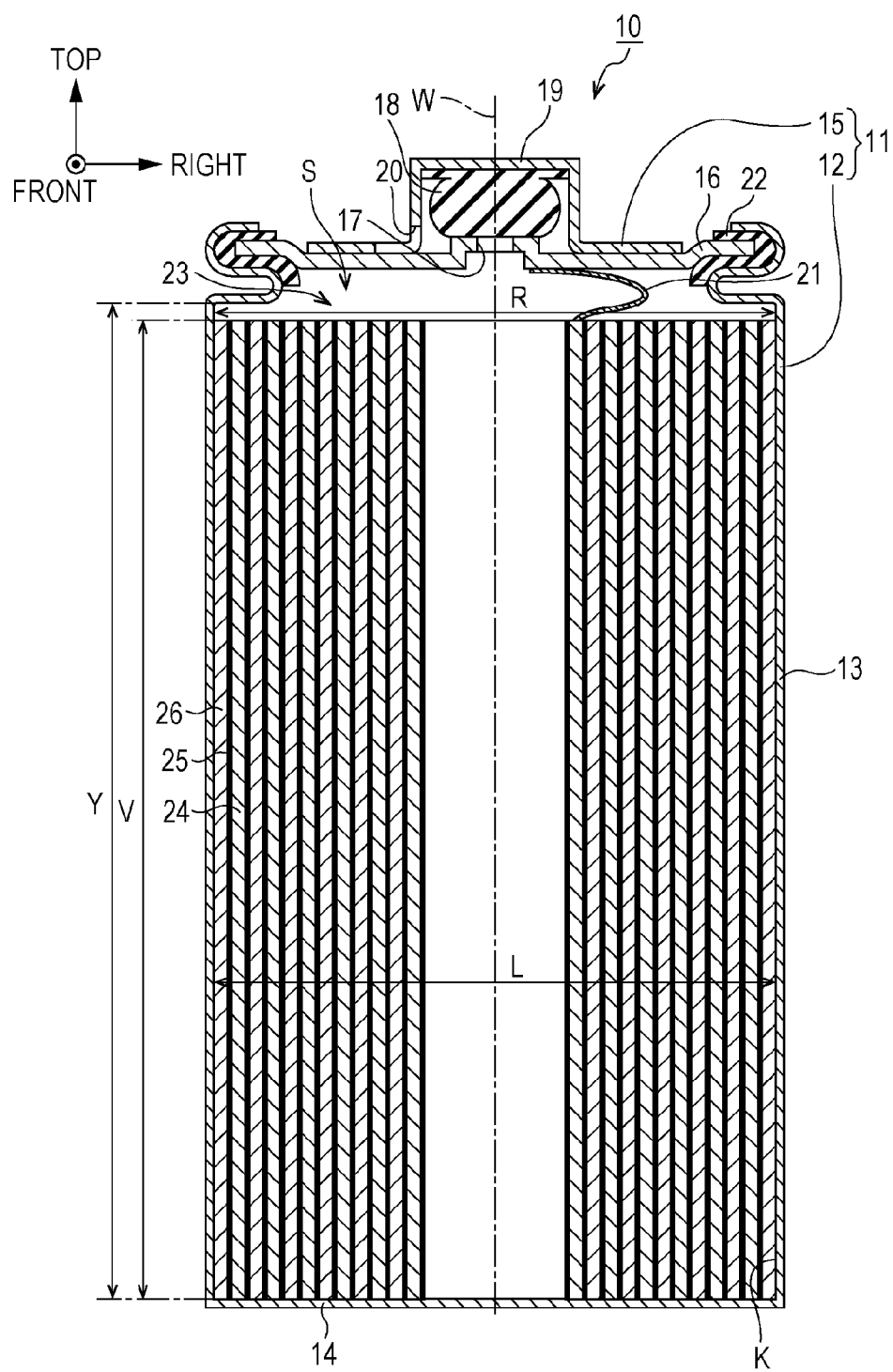
FIG. 15 shows a vertical cross sectional view of the battery.

It is noted that the inner diameter R of the tubular portion 13 is substantially equal to an outer diameter L of the electrode body 23 (the outer diameter dimension in the lateral direction shown in FIG. 15). Thus, the electrode body 23 contacts an inner side face K (an example of an inner wall) of the tubular portion 13. The inner side face K of the tubular portion 13 is a face along the vertical direction in the inner face of the battery case 11.

The separator 25 is made of polyolefin nonwoven fabric, for example. The separator 25 is impregnated with an electrolyte containing primarily potassium hydroxide or sodium hydrate. The separator 25 is not disposed on a face opposite to the inner side face K of the tubular portion 13 in the electrode body 23, and the negative plate 26, described later, is disposed on the face opposite to the inner side face K of the tubular portion 13.

The positive plate 24 (an example of one electrode plate) is formed of a positive metal plate 24A (an example of the substrate) coated with a positive active material 24B (an example of the active material). The positive metal plate 24A is a porous body such as a perforated metal and a mesh body, and is made of nickel foam, for example. A porous body is used for the positive metal plate 24A, so that the weight of the positive plate 24 can be decreased as compared with a configuration in which the porous body is not used. The positive active material 24B is a mixture of a positive nickel hydroxide active material and a conductive cobalt compound. The positive plate 24 is formed in which the positive active material 24B is coated in hollow spaces in the positive metal plate 24A.

It is noted that in the case where the battery 10 is a nickel-cadmium rechargeable cell, the positive active material 24B is made of nickel hydroxide, for example, and in the case where the battery 10 is a nickel-metal hydride rechargeable cell, the positive active material 24B is made of nickel hydroxide added with calcium hydroxide, for example.

The negative plate 26 (one of the other electrode plate) is formed of the negative metal plate 26A (an example of the substrate) coated with the negative active material 26B (an example of the active material). The negative metal plate 26A is a porous body such as a perforated metal, a mesh body, a nickel-plated, and a flat bored steel sheet, for example. A porous body is used for the negative metal plate 26A, so that the weight of the negative plate 26 can be decreased as compared with a configuration in which the porous body is not used. The negative active material 26B is powder such as cadmium powder and hydrogen storage alloy powder, for example. The negative plate 26 is formed of the negative metal plate 26A coated with the negative active material 26B.

It is noted that the negative active material 26B is a mixture of cadmium oxide powder and metal cadmium powder, for example, in the case of a nickel-cadmium rechargeable cell, whereas the negative active material 26B is hydrogen storage alloy powder mainly of AB5 type (rare earth-Ni), AB3.0-3.8 type (rare earth-Mg—Ni), or AB2 type (Laves phase), for example, in the case of a nickel-metal hydride rechargeable cell.

Figure 16:
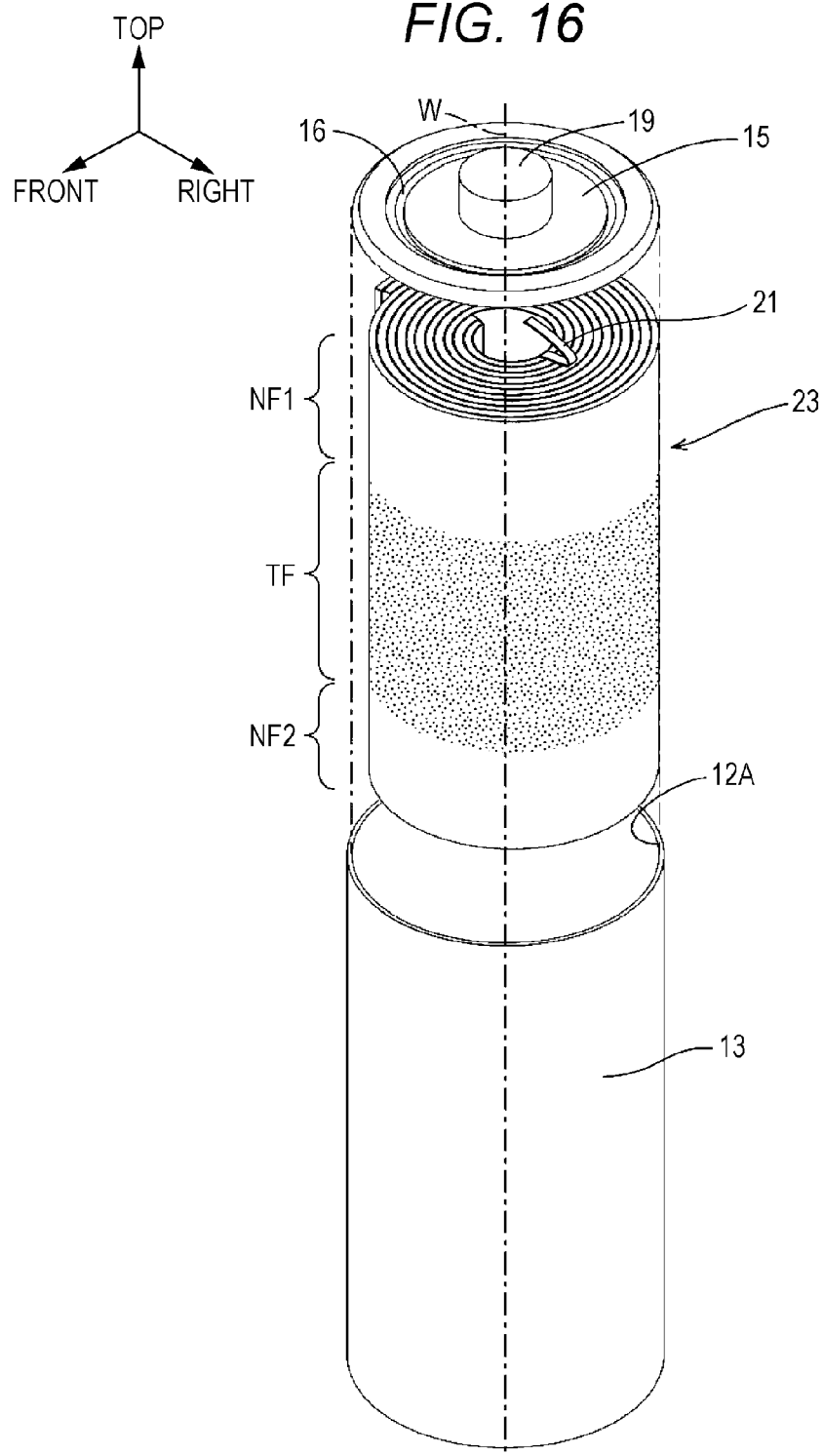
FIG. 16 shows an exploded perspective view of the battery.

Moreover, as shown in FIG. 16, in the upper part of the electrode body 23 in the vertical direction, there is a region NF1 (an example of a non-active material layer forming portion) in which either the positive active material 24B or the negative active material 26B is not coated across the overall length in the winding direction of the electrode body 23. Furthermore, in the lower part of the electrode body 23 in the vertical direction, there is a region NF2 (an example of a non-active material layer forming portion) in which either the positive active material 24B or the negative active material 26B is not coated across the overall length in the winding direction of the electrode body 23. It is noted that the region NF1 and the region NF2 have the same lengths in the vertical direction.

In the center part of the electrode body 23 in the vertical direction, that is, in a portion sandwiched between the region NF1 and the region NF2, there is a region TF (an example of an active material layer forming portion) of an active material layer coated with the negative active material 26B. It is noted that as described in detail in FIG. 19, there is a region TS (an example of an active material layer forming portion) of a combined martial coated with the positive active material 24B across the overall length in the winding direction of the electrode body 23 as opposite to the region TF.

Figure 17:
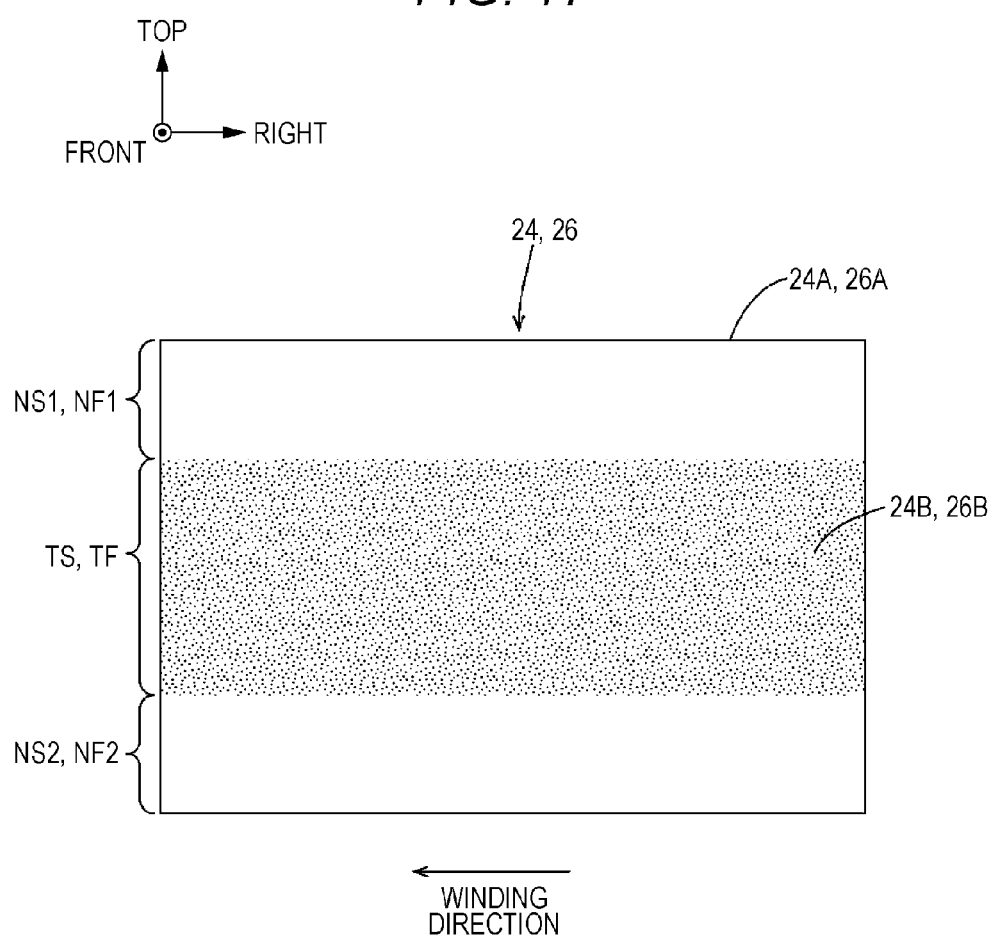
FIG. 17 shows a plan view of a metal plate on which an active material is coated.

FIG. 17 is a development view of the electrode body 23 unfolded. It is noted that the vertical direction in FIG. 17 is the same as the vertical direction in FIG. 16, and the lateral direction in FIG. 17 is the same as the lateral direction in FIG. 16. In other words, FIG. 17 is a view that the electrode body 23 is unfolded and developed in the lateral direction in FIG. 16.

As shown in FIG. 17, in the upper part of the positive metal plate 24A in the vertical direction, there is a region NS1 (an example of a non-active material layer forming portion) in which the positive active material 24B is not coated in the lateral direction of the positive metal plate 24A, that is, across the overall length in the winding direction of the positive metal plate 24A. In the lower part of the positive metal plate 24A in the vertical direction, there is a region NS2 (an example of a non-active material layer forming portion) in which the positive active material 24B is not coated in the lateral direction of the positive metal plate 24A. It is noted that the region NS1 and the region NS2 have the same lengths in the vertical direction.

In the center part of the positive metal plate 24A in the vertical direction, that is, in a portion sandwiched between the region NS1 and the region NS2, there is the region TS in which the positive active material 24B is coated in the lateral direction of the positive metal plate 24A. It is noted that as described above, there is the region TF in which the negative active material 26B is coated across the overall length in the winding direction of the positive metal plate 24A as opposite to the region TS.

Figure 18:
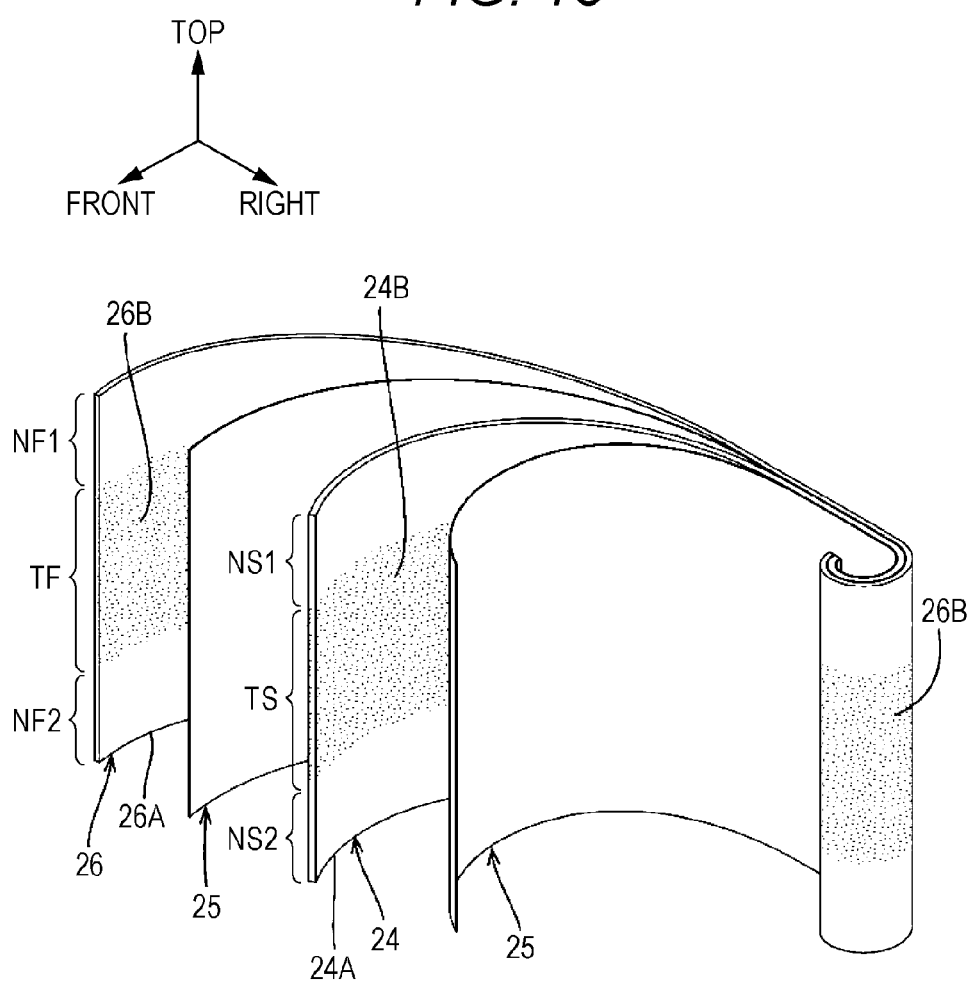
FIG. 18 shows a perspective view of a metal plate on which an active material is coated.

As shown in FIG. 18, in the case where the electrode body 23 is manufactured, the positive metal plate 24A and the negative metal plate 26A are wound in such a way that the region TS in which the positive active material 24B is coated on the positive metal plate 24A is disposed opposite to the region TF in which the negative active material 26B is coated on the negative metal plate 26A. Since the region TS in which the positive active material 24B is coated is disposed opposite to the region TF in which the negative active material 26B is coated, a current is produced across the region TS and the region TF due to a chemical reaction.

Since the region NS1 and the region NS2 in which the positive active material 24B is not coated are in the conductive positive metal plate 24A, the current produced in the region TS is passed through the positive metal plate 24A. Similarly, since the region NF1 and the region NF2 in which the negative active material 26B is not coated are in the conductive negative metal plate 26A, the current produced in the region TF is passed through the negative metal plate 26A.

Accordingly, the amount of electrodes used can be suppressed as compared with a configuration in which the active material is coated throughout the metal plate.

Effects of the Embodiment

According to this embodiment, the positive metal plate 24A has the region TS in which the positive active material 24B is coated and the region NS1 and the region NS2 in which the positive active material 24B is not coated.

Moreover, the negative metal plate 26A has the region TF in which the negative active material 26B is coated and the region NF1 and the region NF2 in which the negative active material 26B is not coated.

In the electrode body 23, the positive metal plate 24A and the negative metal plate 26A are wound in such a way that the region TS in which the positive active material 24B is coated on the positive metal plate 24A is disposed opposite to the region TF in which the negative active material 26B is coated on the negative metal plate 26A. Therefore, the amount of electrodes used can be suppressed as compared with a configuration in which the positive active material 24B is coated throughout the positive metal plate 24A and the negative active material 26B is coated throughout the negative metal plate 26A.

Furthermore, the configuration is provided in which the positive active material 24B is partially coated on the positive metal plate 24A and the negative active material 26B is partially coated on the negative metal plate 26A. Therefore, the unsteadiness of the electrode body 23 in the battery case 11 can be suppressed as compared with a configuration in which the length of the positive metal plate 24A or the length of the negative metal plate 26A in the vertical direction is shortened.

Other Embodiments

The techniques disclosed herein are not limited to the embodiment described with reference to the drawings, and various forms below are also included, for example.

In the embodiment above, an example is taken in which the electrode body 23 has a cylindrical shape in which the positive plate 24, the negative plate 26, and the separator 25 are wound counterclockwise as the center axis W is in the center. However, the embodiment is not limited thereto. Such a configuration may be possible in which the electrode body 23 is formed in a square shape in which a flat positive plate 24, a flat negative plate 26, and a flat separator 25 are laid on each other to form a square shape as a whole, for example.

In the embodiment above, an example is taken in which the positive active material 24B is coated across the lateral direction of the positive metal plate 24A and on the center part of the positive metal plate 24A in the vertical direction. However, the embodiment is not limited thereto. The positive active material 24B may be partially coated in the lateral direction of the positive metal plate 24A. Moreover, the positive active material 24B may be coated only on the upper side of the positive metal plate 24A, or coated only on the lower side, or coated on both of the upper side and the lower side, not on the center part of the positive metal plate 24A in the vertical direction. It is noted that as similar to the negative active material 26B, the negative active material 26B may be coated only on the upper side of the negative metal plate 26A, or coated only on the lower side, or coated on both of the upper side and the lower side, not on the center part of the negative metal plate 26A in the vertical direction.

In the embodiment above, the configuration is taken as an example in which the positive metal plate 24A has the region TS in which the positive active material 24B is coated and the region NS1 and the region NS2 in which the positive active material 24B is not coated, whereas the negative metal plate 26A has the region TF in which the negative active material 26B is coated and the region NF1 and the region NF2 in which the negative active material 26B is not coated. However, the embodiment is not limited thereto. For example, such a configuration may be possible in which the positive metal plate 24A has the region TS in which the positive active material 24B is coated and the region NS1 and the region NS2 in which the positive active material 24B is not coated, whereas the negative metal plate 26A only has the region TF in which the negative active material 26B is coated or vice versa.

Figure 19:
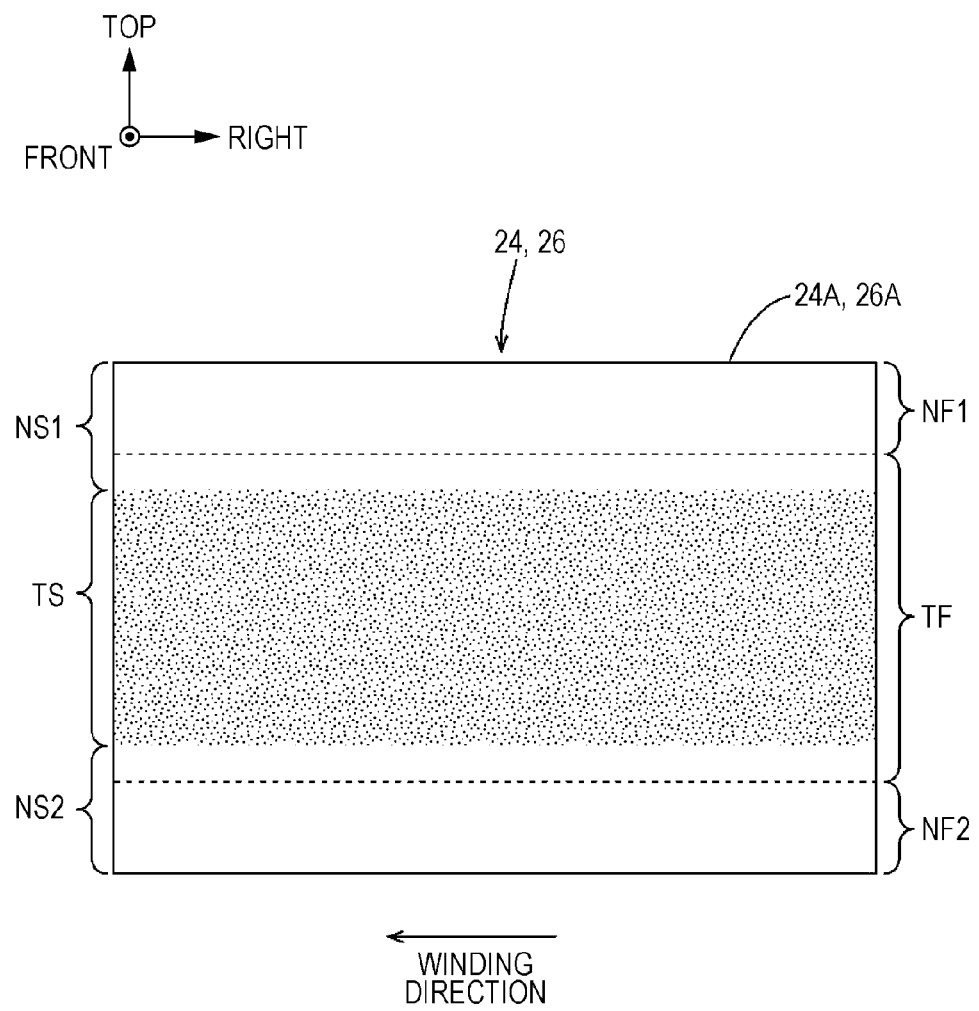
FIG. 19 shows a plan view of a metal plate on which an active material is coated in accordance with another embodiment in the second aspect of the present invention.

Furthermore, such a configuration may be possible in which as shown in FIG. 19, the region NF1 is narrow in the vertical direction with respect to the region NS1, the region NF2 is narrow in the vertical direction with respect to the region NS2, and the region TF is wide in the vertical direction with respect to the region TS, or vice versa. In configuration in which the coated portion such as the region TS and the region TF is provided at the end in one direction, when the metal plate is relatively displaced with respect to the position at which the active material is coated in the manufacturing steps of the battery 10, the width of the coated portion is increased or decreased in the direction of the winding axis. Therefore, the capacity of the battery 10 is increased or decreased. Accordingly, the configurations above are provided, so that fabrication errors in the width of the region functioning as an electrode can be suppressed.

In the embodiment above, an example is taken in which the tubular portion 13 has a cylindrical shape. However, the embodiment is not limited thereto. The tubular portion 13 may have a square shape.

In the embodiment above, the configuration is taken as an example in which the region NF1 and the region NF2 have the same lengths in the vertical direction. However, the embodiment is not limited thereto. The length of the region NF1 and the length of the region NF2 may be different in the vertical direction. Moreover, in the embodiment above, the region NS1 and the region NS2 have the same lengths in the vertical direction. However, the embodiment is not limited thereto. The length of the region NS1 and the length of the region NS2 may be different in the vertical direction.

In the embodiment above, an example is taken in which the positive metal plate 24A and the negative metal plate 26A are a porous body such as a perforated metal and a mesh body. However, the embodiment is not limited thereto. The positive metal plate 24A and the negative metal plate 26A may be a metal plate, not a porous body.

Third Aspect

A battery 10 according to one embodiment in a third aspect of the present invention will be described with reference to FIGS. 20 to 24. The battery 10 is an alkaline secondary battery such as a nickel-metal hydride rechargeable cell. For example, the battery 10 is a low capacity type such as an AA battery ("R6" in the IEC (International Electrotechnical Commission), and "AA" in the United States) having a capacity of 1800 mAh or less, or an AAA battery ("R03" in the IEC, and "AAA" in the United States) having a capacity of 650 mAh or less. In the description below, the near side in FIG. 20 is the front side of the battery 10, the right side is the right side of the battery 10, and the upper side is the upper side of the battery 10.

Figure 20:
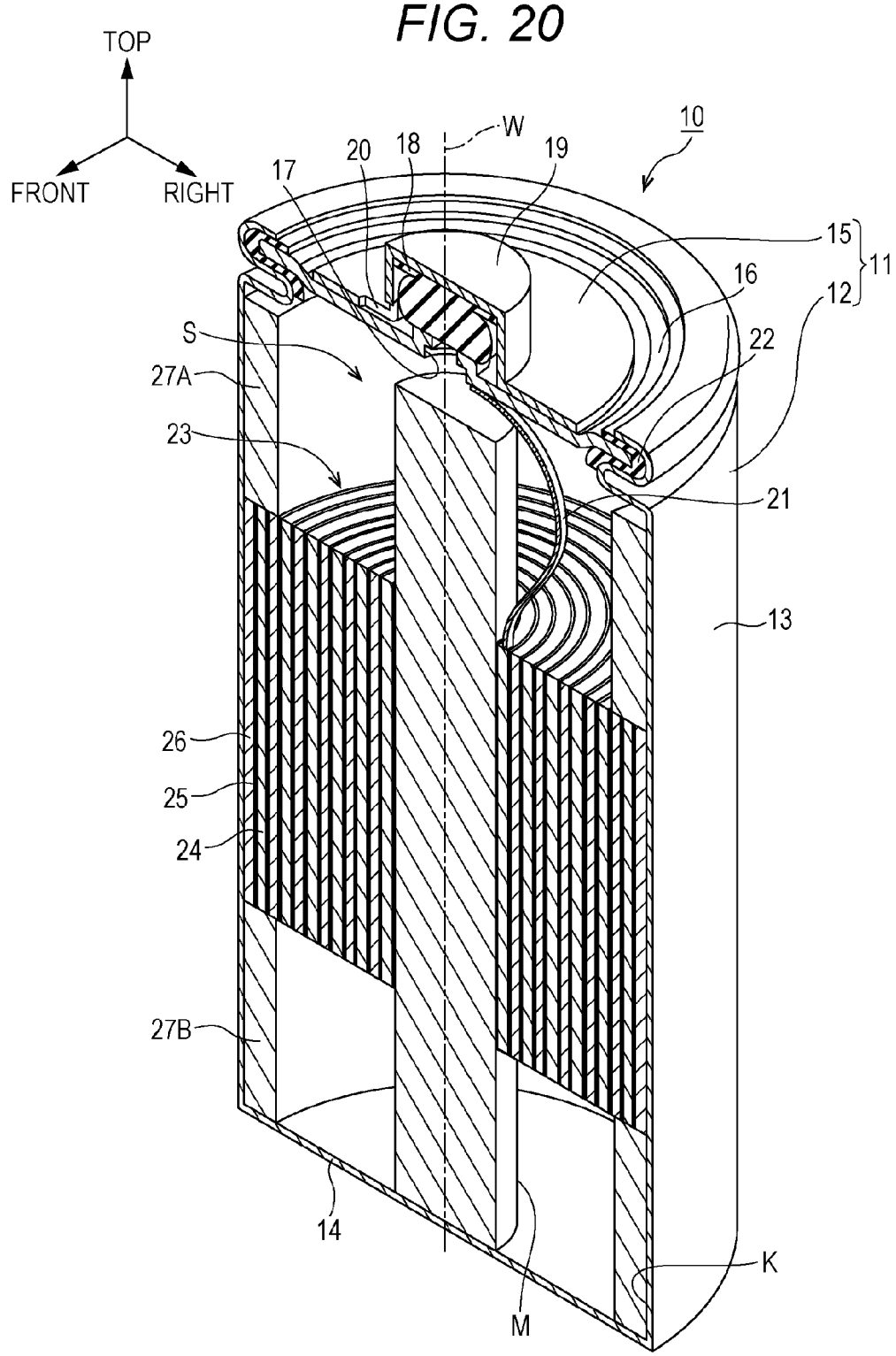
FIG. 20 shows a perspective view of a longitudinal section of a battery according to a first embodiment in a third aspect of the present invention.

As shown in FIG. 20, the battery 10 is configured by a battery case 11 and an electrode body 23. The battery case 11 is made of a metal and has a shape elongated in one direction. The battery case 11 is an example of the case, and configured by a battery case main body 12 and a cover 15 (an example of a cover), including an accommodation space S in the inside. It is noted that one direction is a vertical direction in FIG. 20, the longitudinal direction of the battery case 11, and a direction opposite to the cover 15 and a closing portion 14, described later.

The battery case main body 12 has a nickel-plated surface, and becomes a negative electrode terminal of the battery 10 by electrically connecting a negative plate 26, described later. The battery case main body 12 has a shape in which one end is opened and the other end is closed in the vertical direction. More specifically, the battery case main body 12 includes a tubular portion 13 and the closing portion 14.

The tubular portion 13 has a cylindrical shape elongated in the vertical direction, and the shape of the inner circumferential face seen from the vertical direction is in a perfect circle in which an inner diameter R from a center axis W along the vertical direction is constant. The inside of the tubular portion 13 is the accommodation space S in which an electrode body 23, described later, can be accommodated.

At one end of the tubular portion 13 in one direction, that is, at the top end in FIG. 20, an opening 12A is formed to communicate with the inside of the tubular portion 13. The other end of the tubular portion 13 in one direction, that is, the top end in FIG. 20 is closed with the closing portion 14.

The closing portion 14 is a circular plate member, and integrally formed with the tubular portion 13.

The cover 15 is electrically connected to a positive plate 24, described later, through an elastic connecting terminal 21, and becomes a positive electrode terminal of the battery 10. The cover 15 includes a cover main body 16, an elastic body 18, and a terminal plate 19. The cover main body 16 is a circular flat plate, made of a conductive material such as a nickel-plated iron material, for example, and electrically connected to the positive plate 24 through the connecting terminal 21. A through hole 17 is formed in the center part of the cover main body 16.

The elastic body 18 is disposed on the top face of the cover main body 16, that is, on the other side of the face opposite to the closing portion 14 in such a way that the elastic body 18 blocks the through hole 17. The elastic body 18 is made of a material such as rubber, for example, and elastically deformed by an external force. The terminal plate 19 is a conductive plate covering the elastic body 18.

More specifically, the terminal plate 19 is electrically connected to the cover main body 16 in the state in which the terminal plate 19 presses the elastic body 18 downward, that is, presses the elastic body 18 against the cover main body 16. The terminal plate 19 is provided with a discharge hole 20 to emit a gas in the battery case 11. For example, when the internal pressure of the battery case 11 is increased and a pressure of a predetermined value or more is applied to the elastic body 18 through the through hole 17, the elastic body 18 is elastically deformed to communicate the inside of the battery case 11 with the discharge hole 20, and a gas in the battery case 11 is discharged to the outside of the battery 10 through the discharge hole 20.

An elastically deformable insulator 22 is sandwiched between the opening 12A of the battery case main body 12 and the cover 15 for sealing. The insulator 22 insulates the battery case main body 12 from the cover 15.

The electrode body 23 is accommodated in the accommodation space S in the battery case 11. The electrode body 23 includes the positive plate 24, the negative plate 26, and a separator 25 disposed between them and having an electrolyte, which are wound in a coiled shape as a shaft M is in the center along the vertical direction. It is noted that the shaft M may be matched with the center axis W or not. However, in the following, for convenience of explanation, the shaft M is matched with the center axis W. An inner side face K of the tubular portion 13 is a face along the vertical direction in the inner face of the battery case 11. It is noted that the electrode body 23 may be accommodated in the accommodation space S in the state in which the shaft M is pulled out.

The electrode body 23 has a length V in the vertical direction, and the length V is shorter than a length Y in the vertical direction of the accommodation space S. A first spacer 27A and a second spacer 27B, described later, are disposed on the upper part and the lower part of the electrode body 23, respectively.

Figure 21:
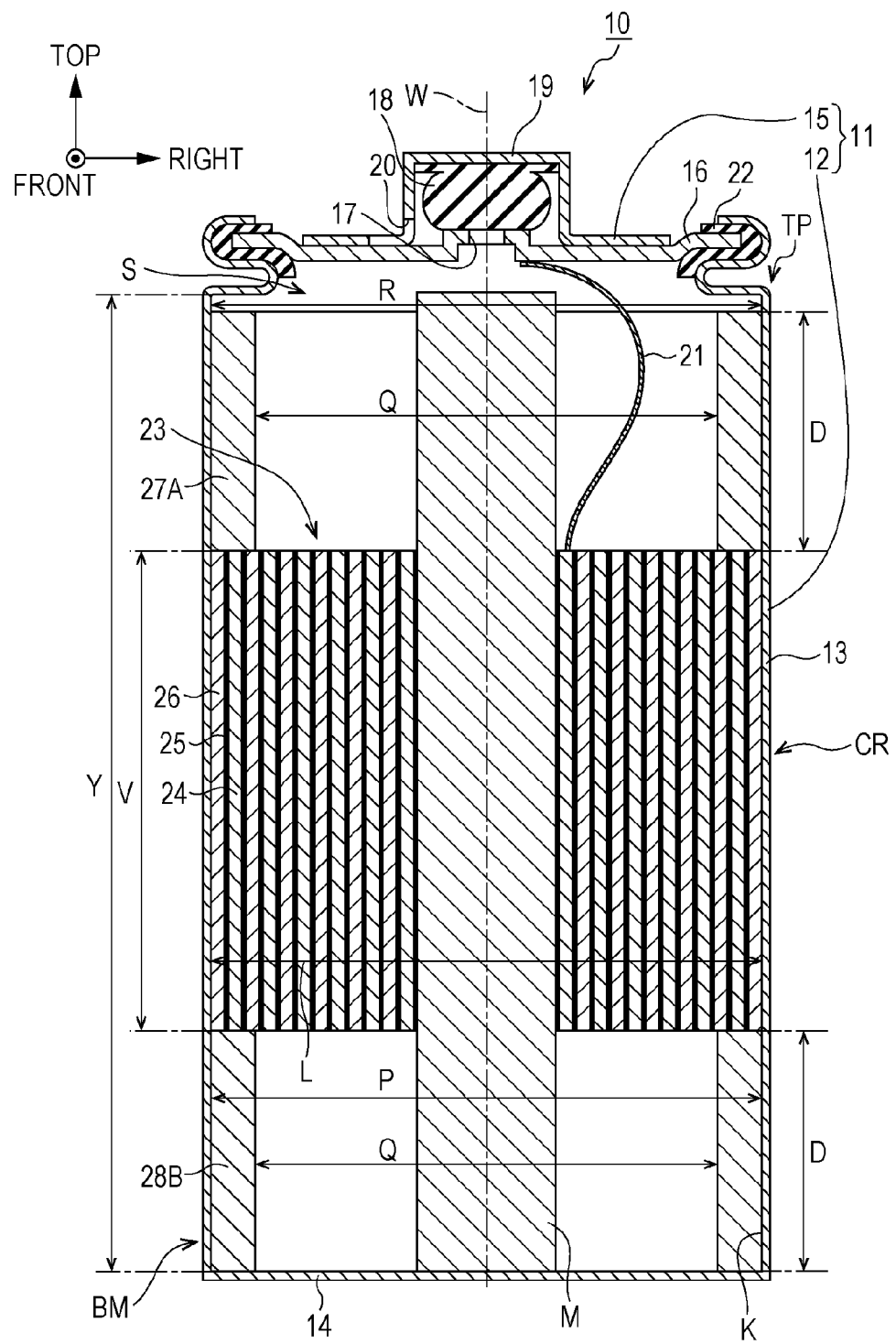
FIG. 21 shows a vertical cross sectional view of the battery.

It is noted that the inner diameter R of the tubular portion 13 (an inner diameter dimension in the lateral direction in FIG. 21) is substantially equal to an outer diameter L of the electrode body 23 (an outer diameter dimension in the lateral direction in FIG. 21).

The separator 25 is made of polyolefin nonwoven fabric, for example. The separator 25 is impregnated with an electrolyte containing primarily potassium hydroxide and sodium hydrate. The separator 25 is not disposed on a face opposite to the inner side face K of the tubular portion 13 in the electrode body 23, and the negative plate 26, described later, is disposed on the face opposite to the inner side face K of the tubular portion 13.

The positive plate 24 is formed of the positive metal plate 24A (an example of one metal plate) coated with the positive active material 24B (an example of an active material of one polarity). The positive metal plate 24A is made of nickel foam, for example. The positive active material 24B is a mixture of a positive nickel hydroxide active material and a conductive cobalt compound. The positive plate 24 is formed in which the positive active material 24B is coated in hollow spaces in the positive metal plate 24A.

It is noted that in the case where the battery 10 is a nickel-cadmium rechargeable cell, the positive active material 24B is made of nickel hydroxide, for example, and in the case where the battery 10 is a nickel-metal hydride rechargeable cell, the nickel hydroxide active material is nickel hydroxide added with calcium hydroxide, for example.

The negative plate 26 is formed of the negative metal plate 26A (an example of the other electrode metal plate) coated with the negative active material 26B (an example of an active material of the other polarity). The negative metal plate 26A is a flat, nickel-plated bored steel sheet, for example. The negative active material 26B is powder such as cadmium powder and hydrogen storage alloy powder (an example of an active material of one polarity), for example. The negative plate 26 is formed of the negative metal plate 26A coated with the negative active material 26B.

It is noted that the negative active material 26B is a mixture of cadmium oxide powder and metal cadmium powder, for example, in the case of a nickel-cadmium rechargeable cell, whereas the negative active material is hydrogen storage alloy powder mainly of AB5 type (rare earth-Ni), AB3.0-3.8 type (rare earth-Mg—Ni), or AB2 type (Laves phase), for example, in the case of a nickel-metal hydride rechargeable cell.

The first spacer 27A is disposed between the electrode body 23 and the cover 15. The first spacer 27A is a member that fixes the position of the tubular portion 13 of the electrode body 23 in the vertical direction, or suppresses the deformation of the tubular portion 13 in the longitudinal direction and the lateral direction.

Figure 22:
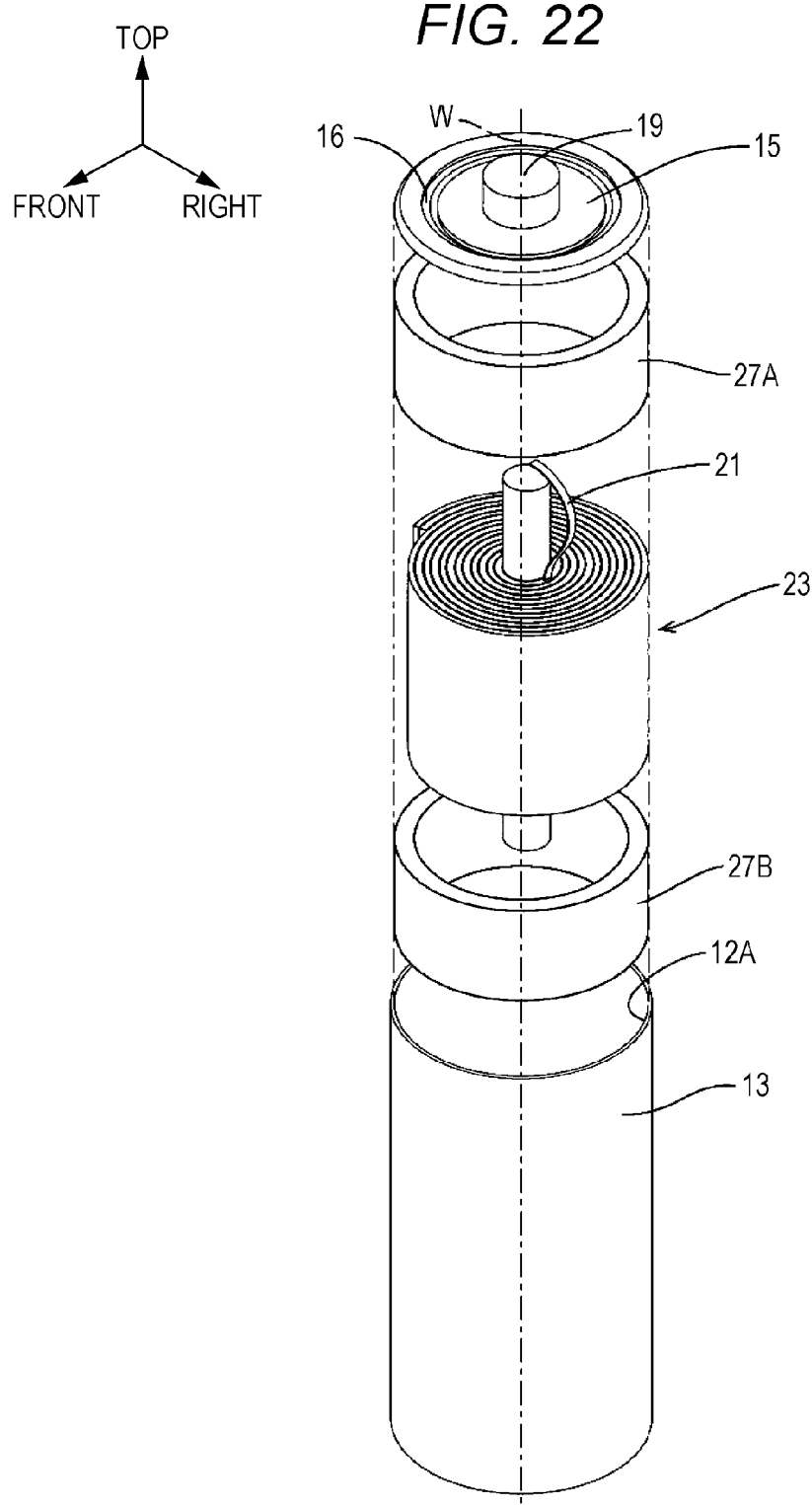
FIG. 22 shows an exploded perspective view of the battery.

The first spacer 27A is formed of a resin that does not react with an electrolyte such as an acrylic resin, a polypropylene resin, and a nylon resin, or a material such as stainless steel. As shown in FIG. 22, the first spacer 27A is a ring-shaped member.

More specifically, the first spacer 27A has a length D in the vertical direction, and has a cylindrical shape as a whole. An outer diameter P of the first spacer 27A, that is, a long diameter in the diameter having the center axis W as the center is substantially equal to the inner diameter R of the tubular portion 13. Therefore, the first spacer 27A is inserted into the tubular portion 13 with almost no gap. Since the first spacer 27A has a ring shape, the first spacer 27A continuously contacts all around the inner side face K in the circumferential direction as the center axis W is in the center.

Moreover, an inner diameter Q of the first spacer 27A, that is, a short diameter in the diameter having the center axis W as the center is shorter than the outer diameter L of the electrode body 23. Therefore, the first spacer 27A contacts the electrode body 23 on the under surface.

It is noted that the first spacer 27A and the second spacer 27B may have the same functions, the same material, and the same shape. The second spacer 27B is disposed between the electrode body 23 and the closing portion 14, and contacts the electrode body 23 on the top face.

Figure 23:
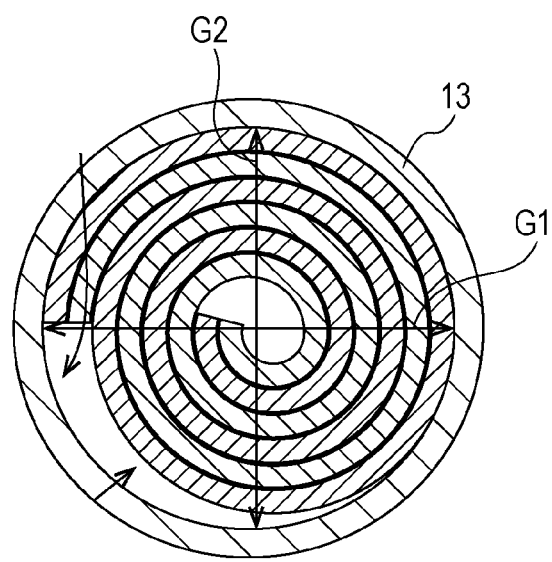
FIG. 23 shows a horizontal cross sectional view of an electrode body.

As shown in FIG. 23, the diameter of the electrode body 23 has a diameter G1 passing through the end portion of the winding and a diameter G2 orthogonal to the diameter G1. Since the diameter G1 is longer than the diameter G2, the electrode body has an elliptical cross section in the longitudinal direction and the lateral direction. When the electrode body 23 is accommodated in the tubular portion 13 of the battery 10 having a perfect circular shape while contacting the inner side face K, it is likely that the tubular portion 13 is deformed in an ellipse as following the shape of the electrode body 23. Moreover, in the case where the electrode body 23 repeatedly expands and contracts due to the charging and discharging of the battery 10, it is likely that the deformation becomes noticeable.

The strength of the tubular portion 13 in the longitudinal direction and the lateral direction is decreased from a portion BM near the closing portion 14 and a portion TP near the cover 15 toward a center part CR in the vertical direction. Therefore, the portion BM near the closing portion 14 and the portion TP near the cover 15 in the tubular portion 13 do not tend to be deformed even in the case where stress is applied externally and internally to the tubular portion 13. On the other hand, the portion near the center part CR is prone to be deformed in the tubular portion 13.

Figure 24A:
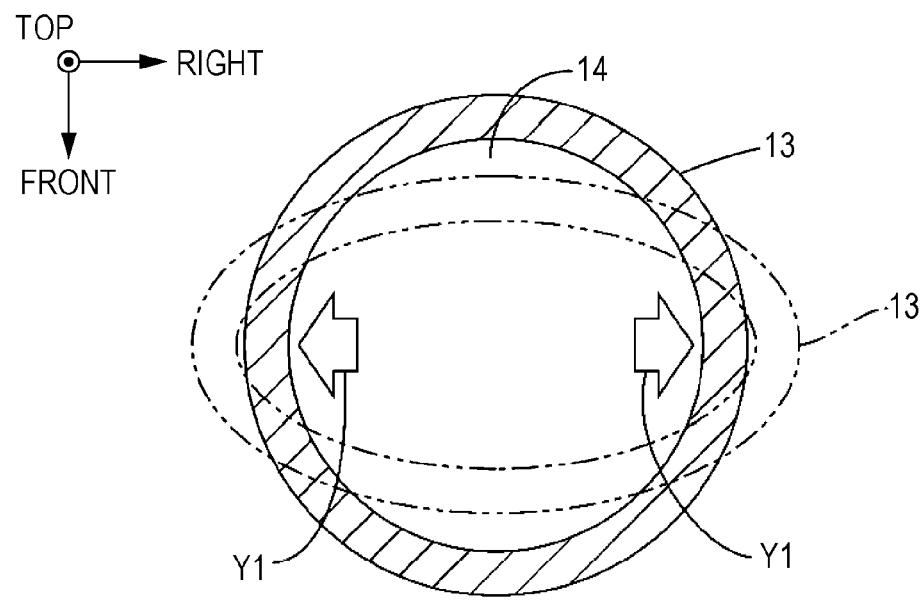
FIG. 24A shows a horizontal cross sectional view of a battery in the case where no spacer is provided.

Therefore, in the case of the configuration in which the first spacer 27A or the second spacer 27B is not provided, when stress is applied due to the shape of the electrode body 23, for example, the tubular portion 13 does not tend to be deformed at the portion BM near the closing portion 14 and the portion TP near the cover 15 in the tubular portion 13 as indicated by solid lines in FIG. 24A, even though force acts in the directions of arrows Y1. However, as indicated by dashed double-dotted lines in FIG. 24A, the electrode body 23, for example, is deformed at the portion near the center part CR in the tubular portion 13, and the tubular portion 13 is deformed in an ellipse, for example, when force acts in the directions of arrows Y1.

On the other hand, the configuration in which the first spacer 27A is provided is a configuration in which the first spacer 27A contacts the inner side face K of the tubular portion 13 by the length D from the portion TP near the cover 15 in the vertical direction. Therefore, for the inner side face K of the tubular portion 13 also contacting the first spacer 27A, a reduction in the strength in the longitudinal direction and the lateral direction is suppressed through the first spacer 27A, and the strength almost the same as the strength in the portion TP near the cover 15 is maintained.

Figure 24B:
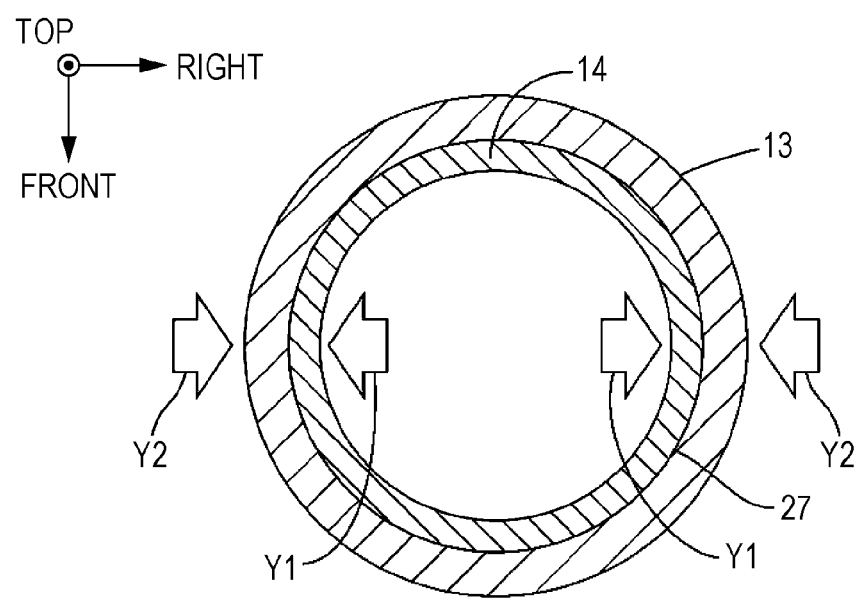
FIG. 24B shows a horizontal cross sectional view of a battery in the case where a spacer is provided.

As a result, as shown in FIG. 24B, even though force acts in the directions of arrows Y1 because the electrode body 23 is to be deformed, the first spacer 27A causes force to act in the directions of arrows Y2 in the directions opposite to the directions of the arrows Y1. With this configuration, the deformation of the tubular portion 13 is suppressed also at the portion near the center part CR in the tubular portion 13.

On the other hand, the configuration in which the second spacer 27B is provided is a configuration in which the second spacer 27B contacts the inner side face K of the tubular portion 13 by the length D from the portion BM near the closing portion 14 in the vertical direction. Therefore, for the inner side face K of for the tubular portion 13 also contacting the second spacer 27B, a reduction in strength in the longitudinal direction and the lateral direction is suppressed through the second spacer 27B, and the strength the same as the strength of the portion BM near the closing portion 14 is maintained.

As a result, as shown in FIG. 24B, even though force acts in the directions of arrows Y1 because the electrode body 23 is to be deformed, the second spacer 27B causes force to act in the directions of arrows Y2 in the directions opposite to the directions of the arrows Y1. With this configuration, the deformation of the tubular portion 13 is suppressed also at the portion near the center part CR in the tubular portion 13.

In other words, both of the first spacer 27A and the second spacer 27B are provided, so that the deformation of the tubular portion 13 is further suppressed at the portion near the center part CR in the tubular portion 13.

Effects of the Embodiment

According to this embodiment, the electrode body 23 has the length V in the vertical direction, and the length V is shorter than the length Y in the vertical direction of the accommodation space S. Therefore, the amount of electrodes used with respect to the accommodation space S in the battery case 11 can be decreased as compared with a configuration in which the electrode body 23 is formed across the overall length of the accommodation space S in the battery case 11 in the vertical direction.

The specification of the battery 10 is defined as described above, and the specification of the length of the battery case 11 in the vertical direction (the overall length of the accommodation space S) is also defined. In this embodiment, the length of the electrode body 23 in the vertical direction is made shorter than the overall length of the accommodation space S while maintaining the overall length of the accommodation space S, which is not enabled to be changed, so that the amount of electrodes used can be decreased as the specification of an electric power quantity is maintained.

Moreover, the first spacer 27A is disposed between the electrode body 23 and the cover 15, and contacts the electrode body 23 on the under surface, and the second spacer 27B is disposed between the electrode body 23 and the closing portion 14, and contacts the electrode body 23 on the top face. With this configuration, the unsteadiness of the electrode body 23 in the battery case 11 can be suppressed as compared with a configuration in which the first spacer 27A and the second spacer 27B are not provided in the battery case 11.

Furthermore, the configuration in which the first spacer 27A is provided is a configuration in which the first spacer 27A contacts the inner side face K of the tubular portion 13 by the length D from the portion TP near the cover 15 in the vertical direction. Therefore, for the inner side face K of the tubular portion 13 also contacting the first spacer 27A, a reduction in the strength in the longitudinal direction and the lateral direction is suppressed through the first spacer 27A, and the strength almost the same as the strength in the portion TP near the cover 15 is maintained.

The configuration in which the second spacer 27B is provided is a configuration in which the second spacer 27B contacts the inner side face K of the tubular portion 13 by a length D from the portion BM near the closing portion 14 in the vertical direction. Therefore, for the inner side face K of for the tubular portion 13 also contacting the second spacer 27B, a reduction in strength in the longitudinal direction and the lateral direction is suppressed through the second spacer 27B, and the strength the same as the strength of the portion BM near the closing portion 14 is maintained. Accordingly, the distortion of the battery case 11 can be suppressed.

Other Embodiments

The techniques disclosed herein are not limited to the embodiment described with reference to the drawings, and various forms below are also included, for example.

In the embodiment above, an example is taken in which the electrode body 23 has a cylindrical shape in which the positive plate 24, the negative plate 26, and the separator 25 are wound counterclockwise. However, the embodiment is not limited thereto. Such a configuration may be possible in which the electrode body 23 has a square shape as a whole in which a flat positive plate 24, a flat negative plate 26, and a flat separator 25 are stacked on each other, for example.

Figure 25:
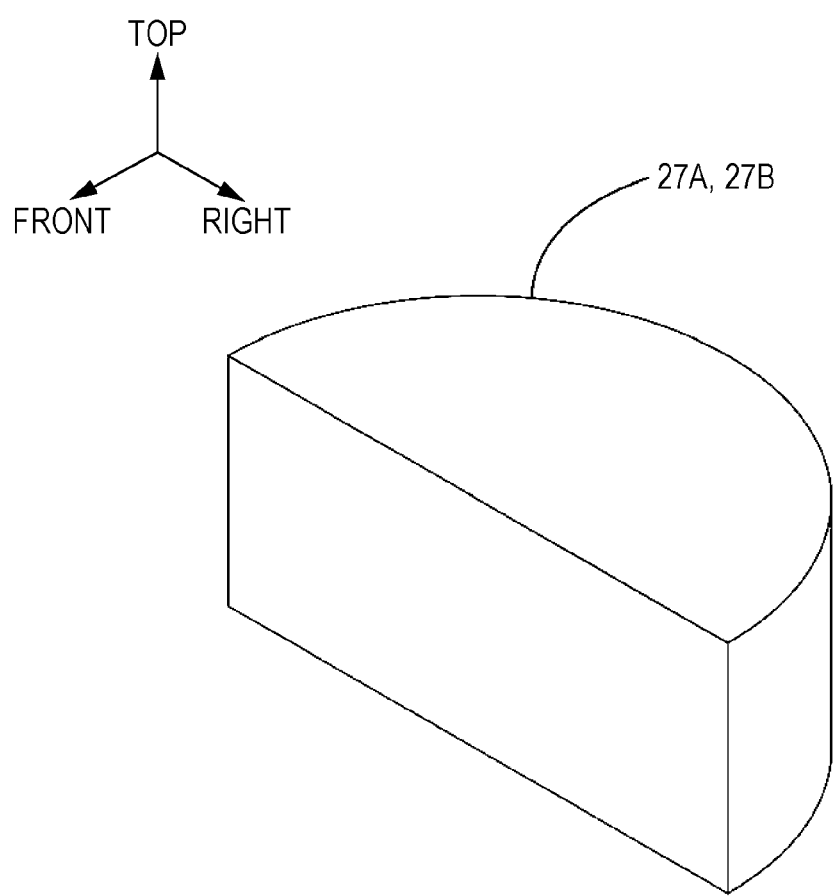
FIG. 25 shows a perspective view of a spacer.

In the embodiment above, an example is taken in which the first spacer 27A and the second spacer 27B have a ring shape. However, the embodiment is not limited thereto. As shown in FIG. 25, the first spacer 27A and the second spacer 27B may be a filled solid body. Moreover, the first spacer 27A and the second spacer 27B may not have a perfect circular shape, or may have a semicircle or a two-thirds circle. Furthermore, such a configuration may be possible in which the first spacer 27A and the second spacer 27B are in a form in which a plurality of plates radially extends from the center in a cross section in the longitudinal direction and the lateral direction and a contacting portion between the plate and the inner side face K of the tubular portion 13 occupies a half or more in the circumferential direction in which the center axis W is in the center. In short, the first spacer 27A and the second spacer 27B may continuously contact or may intermittently contact the inner side face K of the tubular portion 13 when the first spacer 27A and the second spacer 27B contact a half or more of the inner side face K in the circumferential direction in which the center axis W is in the center.

In the embodiment above, an example is taken in which the first spacer 27A and the second spacer 27B have the same functions, the same material, and the same shape. However, the embodiment is not limited thereto. The first spacer 27A and the second spacer 27B may be different in all of the shape, the material, and the height, or may be different in any one of them.

In the embodiment above, an example is taken in which the first spacer 27A and the second spacer 27B are separate spacers. However, the embodiment is not limited thereto. The first spacer 27A and the second spacer 27B may be integrally formed with each other. For example, the first spacer 27A and the second spacer 27B may be integrally formed with each other through the hole (not shown) into which the shaft M is inserted.

In the embodiment above, an example is taken in which the tubular portion 13 has a cylindrical shape. However, the embodiment is not limited thereto. The tubular portion 13 may have a square shape.

Fourth Aspect

First Embodiment

A first embodiment in a fourth aspect of the present invention will be described with reference to FIGS. 26 to 29.

A battery 10 according to this embodiment is an alkaline secondary battery such as a nickel-metal hydride rechargeable cell. For example, the battery 10 is a low capacity type such as an AA battery ("R6" in the IEC (International Electrotechnical Commission), and "AA" in the United States) having a capacity of 1800 mAh or less and an AAA battery ("R03" in the IEC, and "AAA" in the United States) having a capacity of 650 mAh or less. Hereinafter, a description will be given for the vertical direction and in the lateral direction with reference to the directions shown in FIG. 27.

Figure 26:
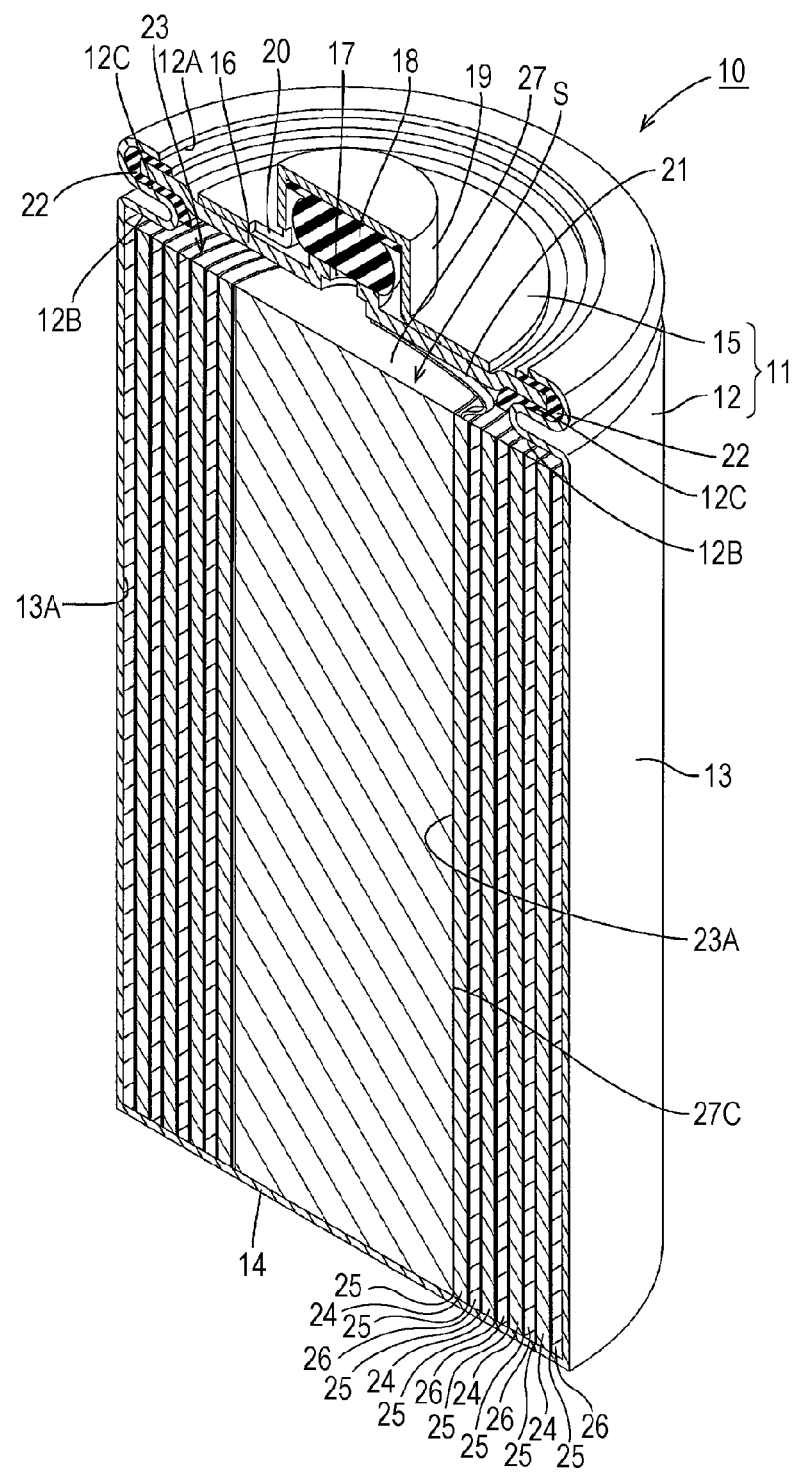
FIG. 26 shows a perspective view of a longitudinal section of a battery according to a first embodiment in a fourth aspect of the present invention.

As shown in FIG. 26, the battery 10 includes a metal battery case 11, an electrode body 23 accommodated in the battery case 11, and a spacer 27 fit into the inner side of the electrode body 23 in the battery case 11. The battery case 11 is defined in the size according to the specification. The battery case 11 has a shape elongated in the vertical direction, has an accommodation space S in the inside, and has a nickel-plated surface. The battery case 11 includes a cylindrical battery case main body 12 with a bottom having an opening 12A opened at one end side and the other end closed, and a cover 15 that closes the opening 12A of the battery case main body 12.

The battery case main body 12 becomes a negative electrode terminal of the battery 10 by contacting the negative plate 26, described later, and includes a tubular portion 13 and a closing portion 14 that closes the lower end of the tubular portion 13.

Figure 27:
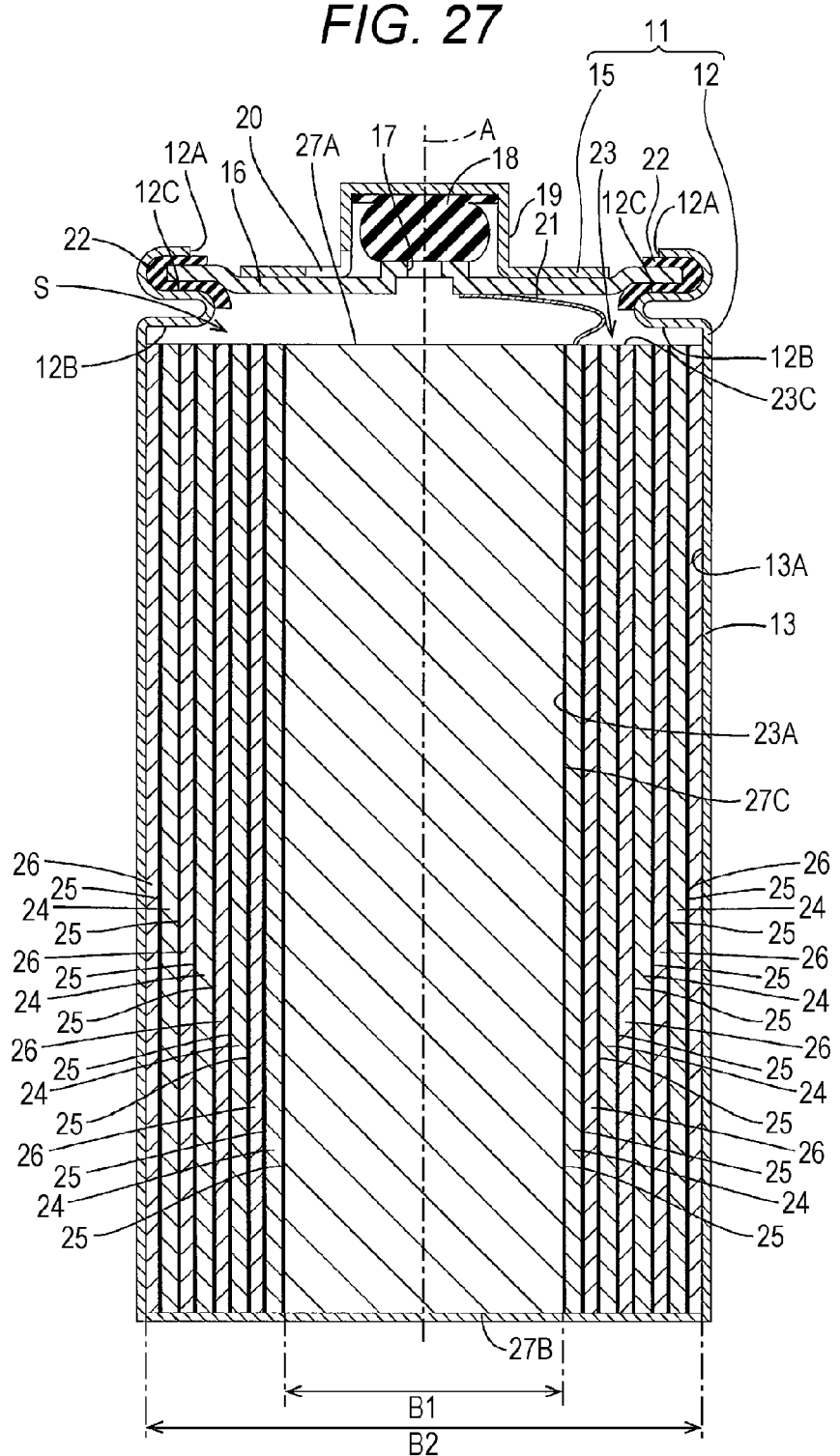
FIG. 27 shows a vertical cross sectional view of the battery.

As shown in FIG. 27, the tubular portion 13 has a cylindrical shape, and the inner circumferential portion and the outer circumferential portion of the tubular portion 13 have a perfect circle in which the diameter from an axis A passing through the center of the tubular portion 13 is constant. The inside of the tubular portion 13 is the accommodation space S in which an electrode body 23, described later, can be accommodated, and an inner diameter B2 of the tubular portion 13 (the diameter of the inner face of the tubular portion 13 in the lateral direction) is almost the same as the outer diameter of the electrode body 23 (the diameter of the outer face of the electrode body 23 in the lateral direction).

To the upper end portion of the tubular portion 13, a diameter reducing portion 12B is connected. The diameter reducing portion 12B projects on the inner side of the tubular portion 13 to reduce the inner diameter. The diameter reducing portion 12B partitions the top end of the accommodation space S. On the diameter reducing portion 12B, a fitting portion 12C is formed into which the peripheral portion of the cover 15 is fit through an insulator 22.

The closing portion 14 is formed of a circular plate member, and integrally formed with the tubular portion 13.

The cover 15 is connected to a positive plate 24, described later, through an elastic connecting terminal 21, and becomes a positive electrode terminal of the battery 10. The cover 15 includes a flat cover main body 16, an exhaust valve 18 placed on the cover main body 16, and a terminal plate 19 laid over the cover main body 16.

The cover main body 16 is made of a conductive material, and connected to the positive plate 24 through the connecting terminal 21. A through hole 17 is formed in the center part of the cover main body 16.

The exhaust valve 18 is in closely contact with the top face of the cover main body 16 so as to block the through hole 17. The exhaust valve 18 is formed of an elastic material such as rubber, for example, and elastically deformed by an external force.

The terminal plate 19 is a conductive plate covering the exhaust valve 18.

More specifically, the terminal plate 19 presses the exhaust valve 18 downward, and is connected to the cover main body 16. The terminal plate 19 is provided with a discharge hole 20 to emit a gas in the battery case 11. The discharge hole 20 emits a gas in the battery case 11 in the case where a pressure in the battery case 11 reaches a predetermined value or more. The exhaust valve 18 is elastically deformed when applied with a certain internal pressure or more through the through hole 17, and discharges a gas from the discharge hole 20 to the outside of the battery 10.

An elastically deformable insulator 22 is sandwiched between the opening 12A of the battery case main body 12 and the cover 15 for sealing. The insulator 22 insulates the battery case main body 12 from the cover 15.

Figure 29:
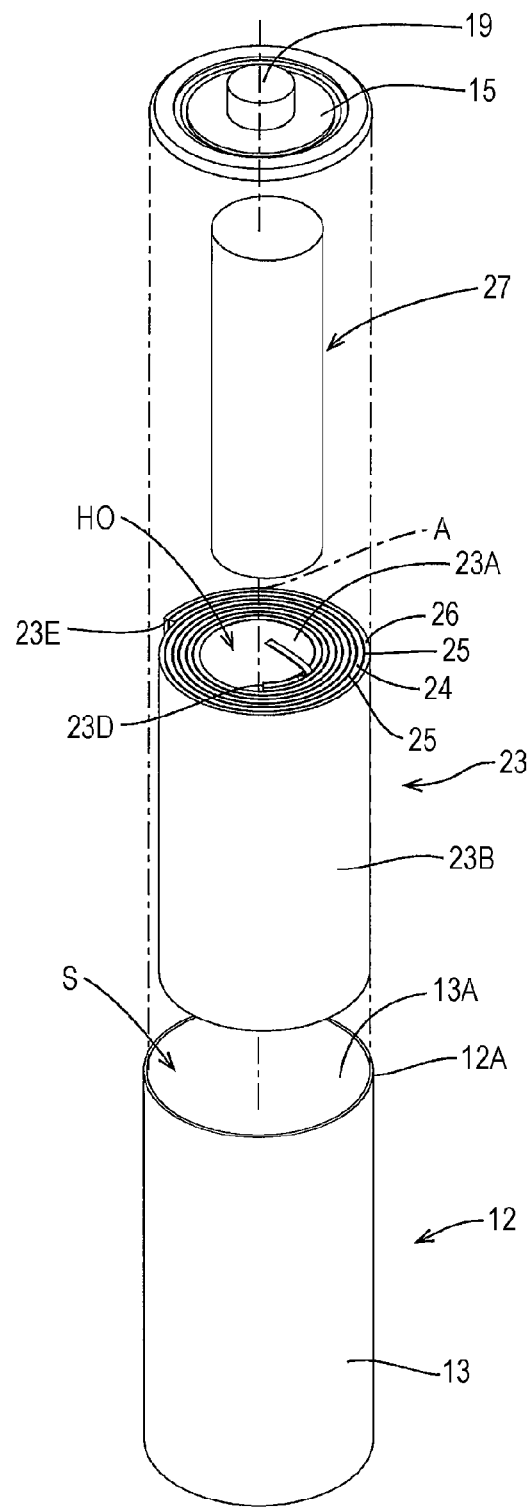
FIG. 29 shows an exploded perspective view of the battery.

As shown in FIG. 29, the electrode body 23 is a cylindrical member accommodated in the accommodation space S of the battery case main body 12, and includes the positive plate 24, the negative plate 26, and the separator 25 disposed between them. The electrode body 23 is wound in a coil shape around a hollow portion HO, which is a hollow space (a cylindrical space) in a range of a predetermined length from the axis A (the axis of the tubular portion 13 and the electrode body 23) in the state in which the positive plate 24, the negative plate 26, and the separator 25 are laid on each other.

The electrode body 23 includes an inner circumferential face 23A on the hollow portion HO side and an outer circumferential face 23B on the opposite side of the inner circumferential face 23A, and the outer circumferential face 23B contacts the inner face 13A of the tubular portion 13. The positive plate 24 is disposed on the inner circumferential face 23A of the electrode body 23, and the negative plate 26 is disposed on the outer circumferential face 23B of the electrode body 23. The electrode body 23 is formed in such a way that the positive plate 24, the negative plate 26, and the separator 25 are laid on each other and wound in a roll shape. A step is produced at a winding end portion 23D of the inner circumferential face 23A of the electrode body 23 and at a winding end portion 23E of the outer circumferential face 23B of the electrode body 23 because of an inner diameter difference in a thickness of one layer of the positive plate 24, the negative plate 26, and the separator 25.

As shown in FIG. 27, the electrode body 23 accommodated in the battery case main body 12 has a gap between the electrode body 23 and the cover 15.

The outer diameter of the electrode body 23 is almost the same as the inner diameter B2 of the tubular portion 13 across the vertical direction.

The length of the electrode body 23 in the vertical direction is the length across almost the overall length of the accommodation space S in the vertical direction. It is noted that a gap is formed between a top end 23C of the electrode body 23 and the diameter reducing portion 12B of the battery case 11, and the lower end of the electrode body 23 contacts the closing portion 14.

The positive plate 24 is a plate in which a mixture of a nickel hydroxide active material and a conductive cobalt compound is filled in hollow spaces of the positive electrode substrate made of nickel foam. It is noted that the nickel hydroxide active material is nickel hydroxide, for example, in the case of a nickel-cadmium rechargeable cell, whereas the nickel hydroxide active material is nickel hydroxide added with calcium hydroxide, for example, in the case of a nickel-metal hydride rechargeable cell.

The negative plate 26 includes a negative current collector formed of a flat, nickel-plated bored steel sheet, for example, and a negative active material coated on the negative current collector. It is noted that the negative active material is a mixture of cadmium oxide powder and metal cadmium powder, for example, in the case of a nickel-cadmium rechargeable cell, whereas the negative active material is hydrogen storage alloy powder mainly of AB5 type (rare earth-Ni), AB3.0-3.8 type (rare earth-Mg—Ni), or AB2 type (Laves phase), for example, in the case of a nickel-metal hydride rechargeable cell.

The separator 25 is made of polyolefin nonwoven fabric, for example, and the separator 25 is impregnated with an electrolyte containing primarily potassium hydroxide or sodium hydrate. The separator 25 is not provided on the outer circumferential face 23B of the electrode body 23.

Figure 28:
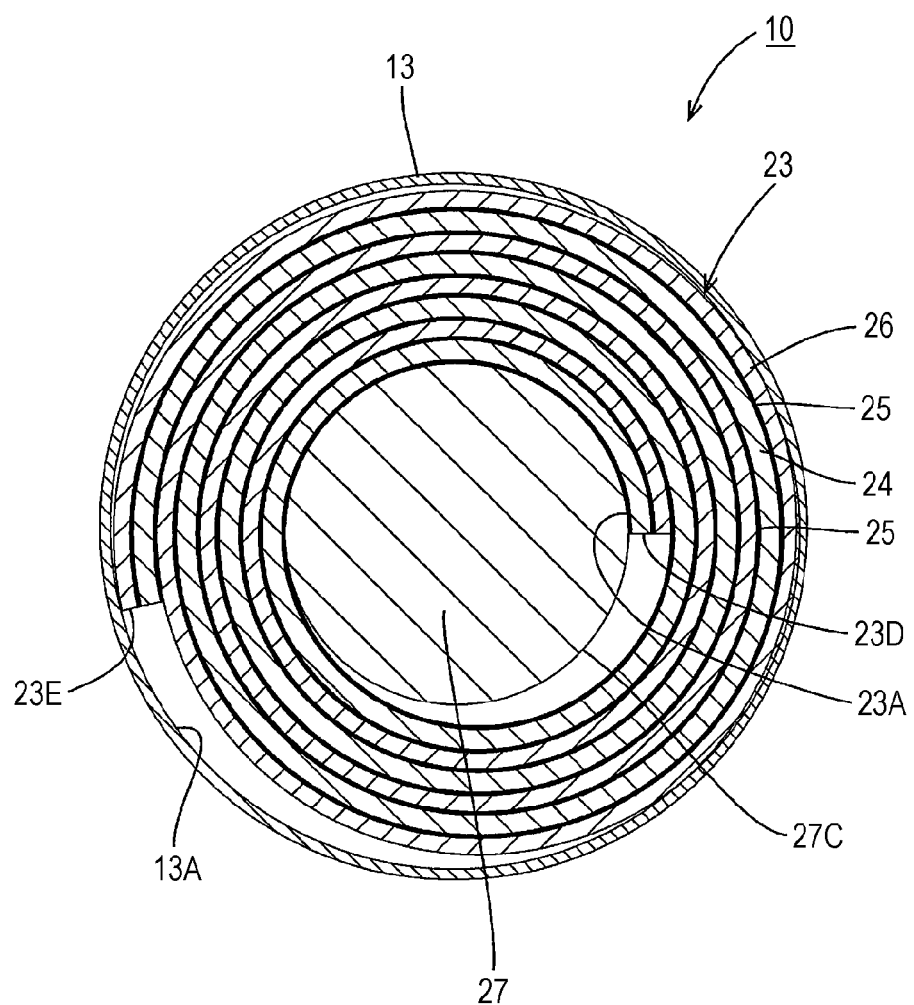
FIG. 28 shows a cross sectional view of the battery.

The spacer 27 is formed of an elastic body, such as rubber, having a circular cylindrical shape in a cross section of a perfect circle. More specifically, for example, for the spacer 27, a material including a resin that does not react with the electrolyte such an acrylic resin, a polypropylene resin, and a nylon resin can be used. Moreover, a material that absorbs an electrolyte for swelling can be preferably used. The spacer 27 is accommodated in the hollow portion HO partitioned by the inner circumferential face 23A of the electrode body 23, and an outer diameter B1 of the spacer 27 (the diameter in the lateral direction) is almost the same as the inner diameter of the electrode body 23 (the diameter in the lateral direction). The spacer 27 is slightly larger than the inner diameter of the electrode body 23 (the diameter in the lateral direction) in the natural state before accommodated in the hollow portion HO (before elastically deformed). Thus, the spacer 27 is formed of an elastic body and accommodated in the hollow portion HO in the elastically contracted state, so that the inner circumferential face 23A of the electrode body 23 can be pressed against almost all around the tubular portion 13 side using elastic repulsion force. It is noted that in this embodiment, as shown in FIG. 28, since the inner diameter of the electrode body 23 is not constant due to the thickness of the end portion 23D of the inner circumferential face 23A of the electrode body 23, a part of the inner circumferential face 23A of the electrode body 23 does not contact a circular outer circumferential face 27C of the spacer 27. Therefore, such a configuration may be possible for another embodiment in which the outer circumferential face shape of the spacer 27 is changed in accordance with the difference in the inner diameter of the electrode body 23 (a projecting portion to enter the recess of the electrode body 23 is provided on the outer circumferential face of the spacer), the outer circumferential face of the spacer 27 contacts the inner circumferential face 23A even in the portion where the inner diameter of the outer circumferential face 27C is different, and the unsteadiness of the electrode body 23 is further suppressed.

As shown in FIG. 27, the length of the spacer 27 in the vertical direction is the length across almost the overall length of the accommodation space S in the vertical direction. Thus, the length of the spacer 27 in the vertical direction is almost the same length as the length of the electrode body 23 in the vertical direction. It is noted that the gap is formed between the top end 27A of the spacer 27 and the diameter reducing portion 12B of the battery case 11, and a lower end 27B of the spacer 27 contacts the closing portion 14.

For the assembly of the battery 10, for example, the battery 10 can be formed in such a way that the electrode body 23 is wound around the spacer 27 in a coiled shape, the outer circumferential face 23B of the electrode body 23 is pressurized using a plurality of pressure rollers to accommodate the spacer 27 and the electrode body 23 in the battery case main body 12 while maintaining the shape of the electrode body 23, and then the cover 15 is put on.

According to this embodiment, the following operation and effect are exerted.

The battery 10 according to this embodiment includes the battery case 11 including the tubular portion 13 having the accommodation space S in the inside, the electrode body 23 accommodated in the accommodation space S, in which the positive plate 24, the negative plate 26, and the separator 25 disposed between them are wound around the hollow portion HO, the outer circumferential face 23B on the opposite side of the inner circumferential face 23A on the hollow portion HO side contacts the inner face 13A of the tubular portion 13, and the spacer 27 accommodated in the hollow portion HO and contacting the inner circumferential face 23A of the electrode body 23.

With this configuration, the electrode body 23 is wound around the hollow portion HO, so that the amount of electrodes used can be decreased as compared with the case where the electrode body 23 is wound with no hollow portion HO.

Moreover, the spacer 27 is accommodated in the hollow portion HO, and contacts the inner circumferential face 23A of the electrode body 23, and the outer circumferential face 23B of the electrode body 23 on the opposite side of the inner circumferential face 23A on the hollow portion HO side contacts the inner face 13A of the tubular portion 13, so that the electrode body 23 can be supported using the spacer 27 from the inner side, and can be supported using the tubular portion 13 from the outer side. Therefore, the unsteadiness of the electrode body 23 in the battery case 11 can be suppressed.

Accordingly, the amount of electrodes used can be decreased while suppressing the unsteadiness of the electrode body 23 in the battery case 11.

Furthermore, the spacer 27 presses the electrode body 23 to the tubular portion 13 side.

With this configuration, force that the spacer 27 supports the electrode body 23 in the tubular portion 13 can be improved.

In addition, the spacer 27 is formed of an elastic body.

With this configuration, it is possible that the electrode body 23 is pressed to the inner face 13A of the tubular portion 13 side using the elastic force of the spacer 27 to position the electrode body 23.

Moreover, the spacer 27 contacts all around the inner circumferential face 23A of the electrode body 23.

With this configuration, the unsteadiness of the electrode body 23 in the battery case 11 can be further suppressed.

Furthermore, the battery case 11 is of conductivity, the negative plate 26 is disposed on at least a part of the outer face of the electrode body 23, and the negative plate 26 of the outer face contacts the inner face 13A of the tubular portion 13.

With this configuration, the negative plate 26 of the electrode body 23 can be electrically connected to the battery case 11.

Second Embodiment

Figure 30:
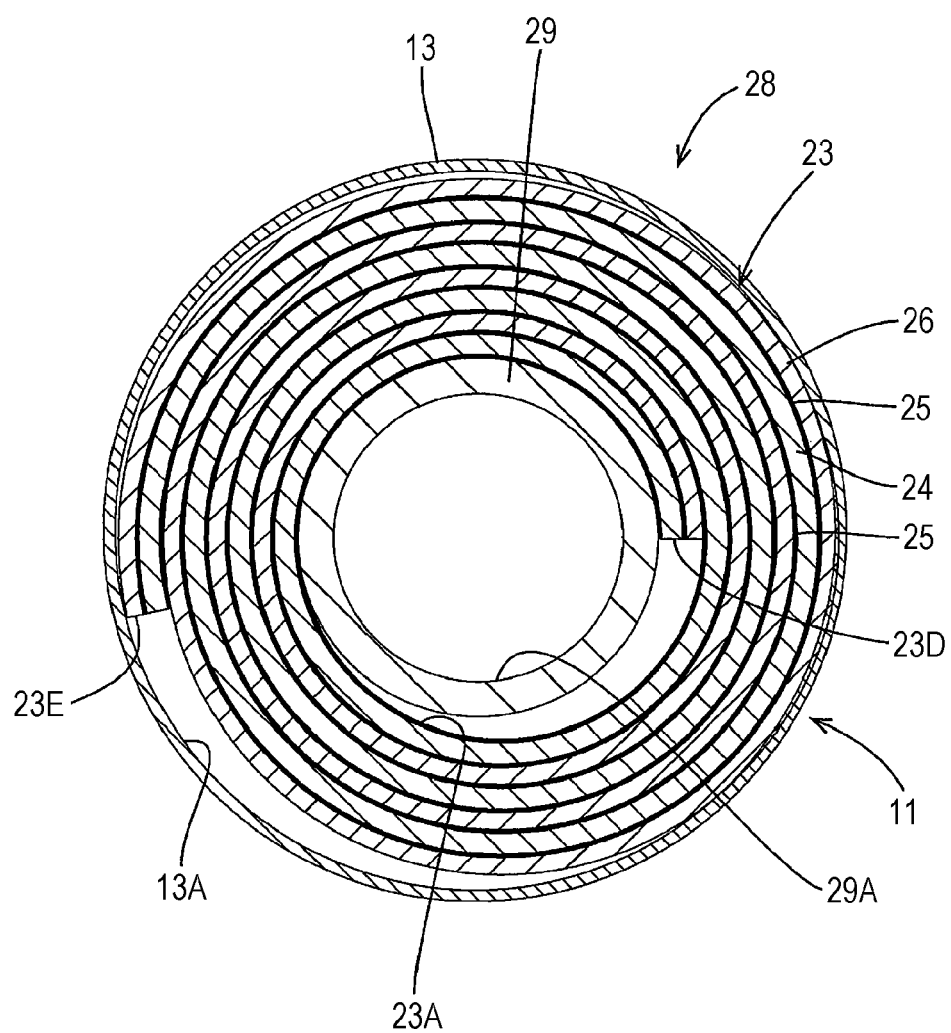
FIG. 30 shows a cross sectional view of a battery according to a second embodiment in the fourth aspect of the present invention.

Next, a second embodiment in the fourth aspect of the present invention will be described with reference to FIG. 30.

A battery 28 according to this embodiment uses a spacer 29 formed in a cylindrical shape in which a lightening hole 29A is penetrated through the cylindrical spacer 27 according to the first embodiment. The other configurations are the same as the first embodiment, the same configurations as those of the first embodiment are designated by the same reference numerals and signs, and the description is omitted.

A battery case 11 and an electrode body 23 are the same as those in the first embodiment.

The spacer 29 is formed with the circular lightening hole 29A penetrating in the vertical direction. It is noted that the length of the spacer 29 in the vertical direction and the outer diameter and the material of the spacer 29 can be made the same as those in the first embodiment.

It is noted that an electrolyte leaking out of a separator 25 can be stored in a space in the lightening hole 29A.

According to this embodiment as described above, the lightening hole 29A is formed in the spacer 29, so that materials for used in the spacer 29 can be decreased.

Third Embodiment

Figure 31:
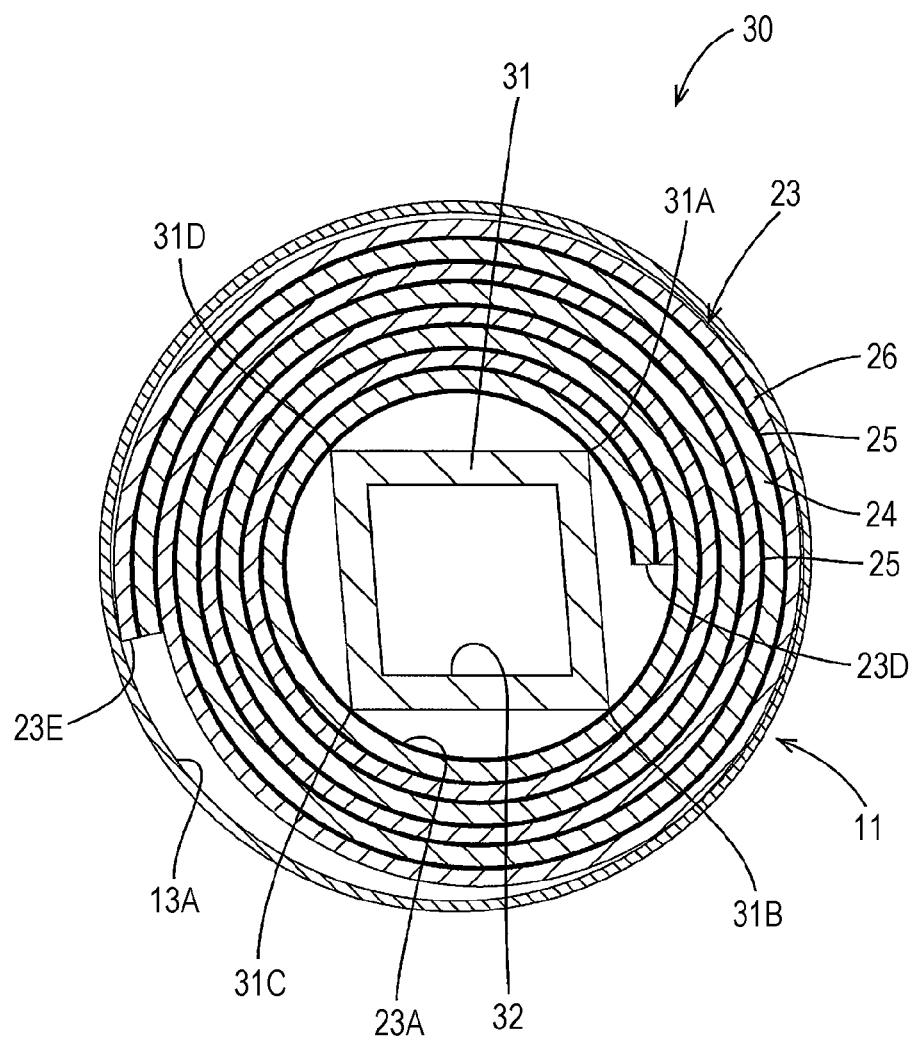
FIG. 31 shows a cross sectional view of a battery according to a third embodiment in the fourth aspect of the present invention.

Next, a third embodiment in the fourth aspect of the present invention will be described with reference to FIG. 31. A battery 30 according to this embodiment uses a rectangular tubular spacer 31. The rectangular tubular spacer 31 partially contacts an inner circumferential face 23A of an electrode body 23. The other configurations are the same as the first embodiment, the same configurations as those of the first embodiment are designated by the same reference numerals and signs, and the description is omitted.

A battery case 11 and an electrode body 23 are the same as those in the embodiments above.

The spacer 31 is in a rectangular tube in which a rectangular lightening hole 32 penetrates in the vertical direction, and the cross section is the same shape across the vertical direction. The length and the material of the spacer 31 in the vertical direction can be made the same as those in the first embodiment. Four corners 31A to 31D of the spacer 31 contact different locations on the inner circumferential face 23A of the electrode body 23. It is noted that all the corners 31A to 31D of the spacer 31 may not contact the inner circumferential face 23A of the electrode body 23. For example, such a configuration may be possible in which one corner or a plurality of the corners of the spacer 31 contacts the inner circumferential face 23A of the electrode body 23 and another corner or a plurality of the other corners does not contact the inner circumferential face 23A of the electrode body 23. Moreover, the spacer 31 is not limited to a rectangular tube. The spacer 31 may be a rectangular tube in other polygons (such as a triangle and a pentagon). Furthermore, the spacer 31 is not limited to one formed with the lightening hole 32. The spacer 31 may have a square shape in which the inside of the spacer is filled.

Fourth Embodiment

Figure 32:
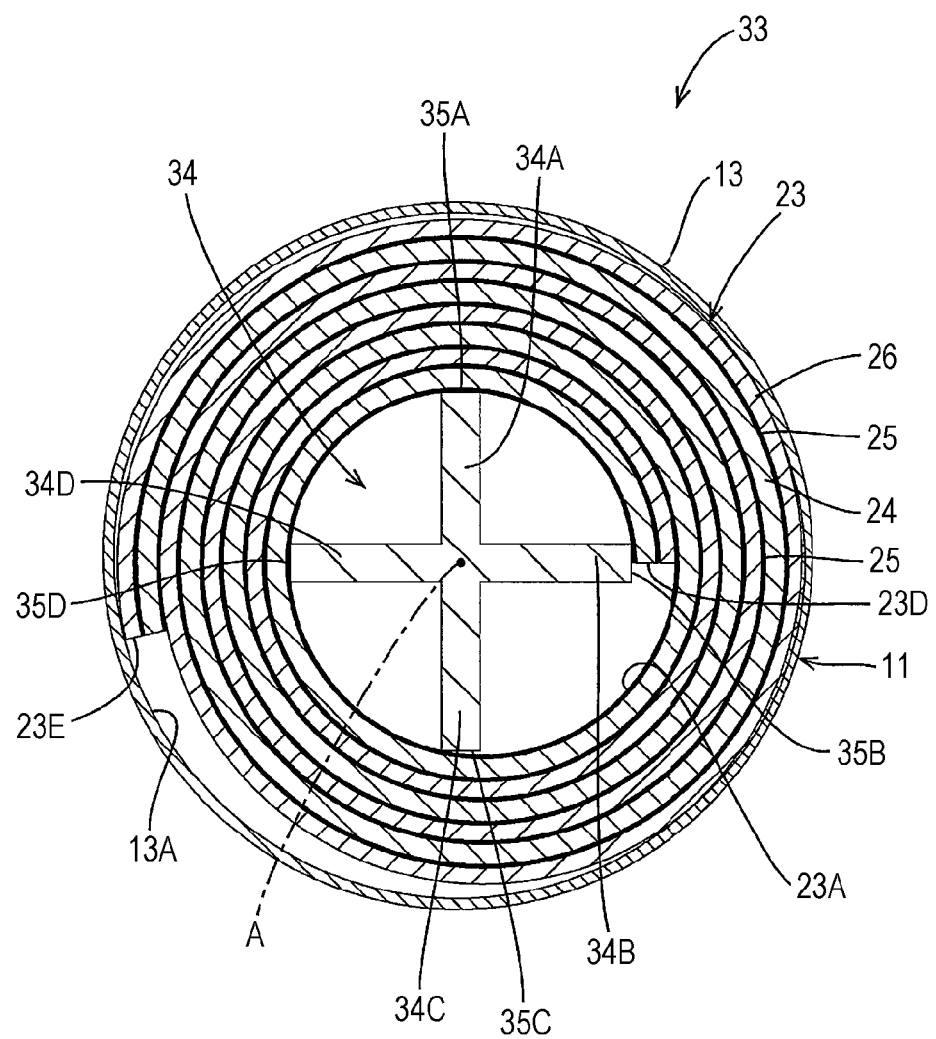
FIG. 32 shows a cross sectional view of a battery according to a fourth embodiment in the fourth aspect of the present invention.

Next, a fourth embodiment in the fourth aspect of the present invention will be described with reference to FIG. 32. In a battery 33 according to this embodiment, a spacer 34 is formed in a cross shape. The other configurations are the same as the first embodiment, the same configurations as those of the first embodiment are designated by the same reference numerals and signs, and the description is omitted.

A battery case 11 and an electrode body 23 are the same as those in the embodiments above.

The length of the spacer 34 in the vertical direction and the outer diameter and the material of the spacer 34 can be made the same as those in the first embodiment. The spacer 34 has a cross shape in which the cross section is the same across the vertical direction. Four plate-shaped projecting portions 34A to 34D are disposed at equal angles (an angle of 90 degrees) as an axis A of a tubular portion 13 is in the center.

Tip end portions 35A to 35D of the plate-shaped projecting portions 34A to 34D contact an inner circumferential face 23A of the electrode body 23. The plate-shaped projecting portions 34A to 34D may have the same projecting dimensions. However, such a configuration may be possible in which the projecting dimensions of the plate-shaped projecting portions 34A to 34D are varied in accordance with the inner diameter difference caused by an end portion 23D of the inner circumferential face 23A of the electrode body 23, and a gap between the spacer 34 and the inner circumferential face 23A of the electrode body 23 is eliminated to further suppress the unsteadiness of the electrode body 23.

It is noted that an electrolyte leaking out of the separator 25 can be stored in a space between the spacer 34 and the electrode body 23.

Other Embodiments

The present invention is not limited to the embodiments described with reference to the drawing. For example, the following embodiments will be included in the technical scope of the present invention.

(1) The materials of the spacers 27, 29, 31, and 34 are not limited to the materials in the embodiments, and various materials can be used. For example, a metal such as stainless steel or a conductive resin can also be used, not limited to an insulating material.

(2) The shapes of the spacers 27, 29, 31, and 34 are not limited to the shapes in the embodiments, and the shapes may be a shape based on the shape of the inner circumferential face of the electrode body 23. For example, in the case where the inner circumferential face of the electrode body is in an ellipse or an oval, the outer circumferential face of the spacer may be formed in an ellipse or an oval. In this case, the spacer may be a spacer having a space in the inside filled, or may be a tubular spacer.

(3) In the embodiment above, the negative plate 26 is disposed on throughout the outer face of the electrode body 23. However, the present invention is not limited thereto. For example, such a configuration may be possible in which the negative plate 26 is disposed on a part of the outer face of the electrode body 23 and the negative plate 26 of the outer face contacts the inner face 13A of the tubular portion 13.

(4) The spacer may be formed of an elastic body other than rubber. For example, the spacer may be made of a spring. More specifically, for example, such a configuration may be possible in which a plate spring is wound to press the inner circumferential face 23A of the electrode body 23 using elastic force.

(5) The spacer is not limited to an elastic body, and may use a plastic body (an inelastic body). In this case, for example, the outer diameter B1 of the spacer (the diameter in the lateral direction) is almost the same as the inner diameter of the electrode body 23 (the diameter in the lateral direction), or slightly larger than the inner diameter of the electrode body 23. Also with this configuration, the outer circumferential face 27C of the spacer 27 contacts the inner circumferential face 23A of the electrode body 23, or presses the inner circumferential face 23A of the electrode body 23 in the state in which the spacer 27 is accommodated in the hollow portion HO.

Fifth Aspect

First Embodiment

A first embodiment in a fifth aspect of the present invention will be described below with reference to FIGS. 33 to 36.

A battery 10 according to this embodiment is an alkaline secondary battery such as a nickel-metal hydride rechargeable cell. For example, the battery 10 is a low capacity type such as an AA battery ("R6" in the IEC (International Electrotechnical Commission), and "AA" in the United States) having a capacity of 1800 mAh or less and an AAA battery ("R03" in the IEC, and "AAA" in the United States) having a capacity of 650 mAh or less. In the following, the vertical direction and in the lateral direction will be described with reference to the directions in FIG. 34.

Figure 33:
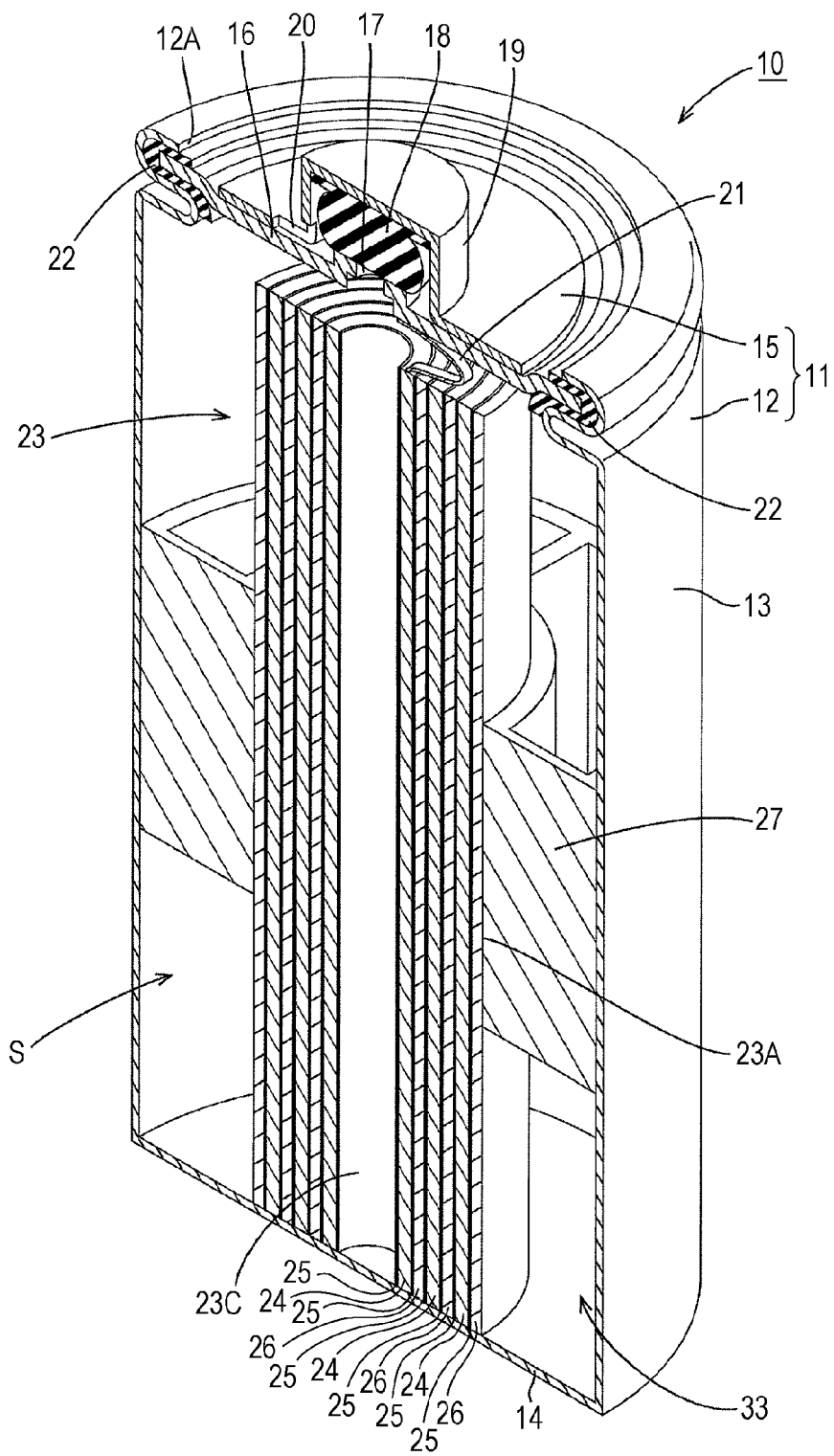
FIG. 33 shows a perspective view of a longitudinal section of a battery according to a first embodiment in a fifth aspect of the present invention.

As shown in FIG. 33, the battery 10 is configured by a metal battery case 11, an electrode body 23 having a cylindrical shape (an example of "a cylindrical electrode body"), and a conductive spacer 27 disposed between the electrode body 23 and the battery case 11. The battery case 11 is defined in the size according to the specification. The battery case 11 has a shape elongated in the vertical direction, has an accommodation space S in the inside, and has a nickel-plated surface. The battery case 11 includes a cylindrical battery case main body 12 with a bottom having an opening 12A opened at one end side and the other end closed, and a cover 15 that closes the opening 12A of the battery case main body 12.

The battery case main body 12 becomes a negative electrode terminal of the battery 10 by contacting the negative plate 26, described later, and includes a tubular portion 13 and a closing portion 14 that closes the lower end of the tubular portion 13.

Figure 34:
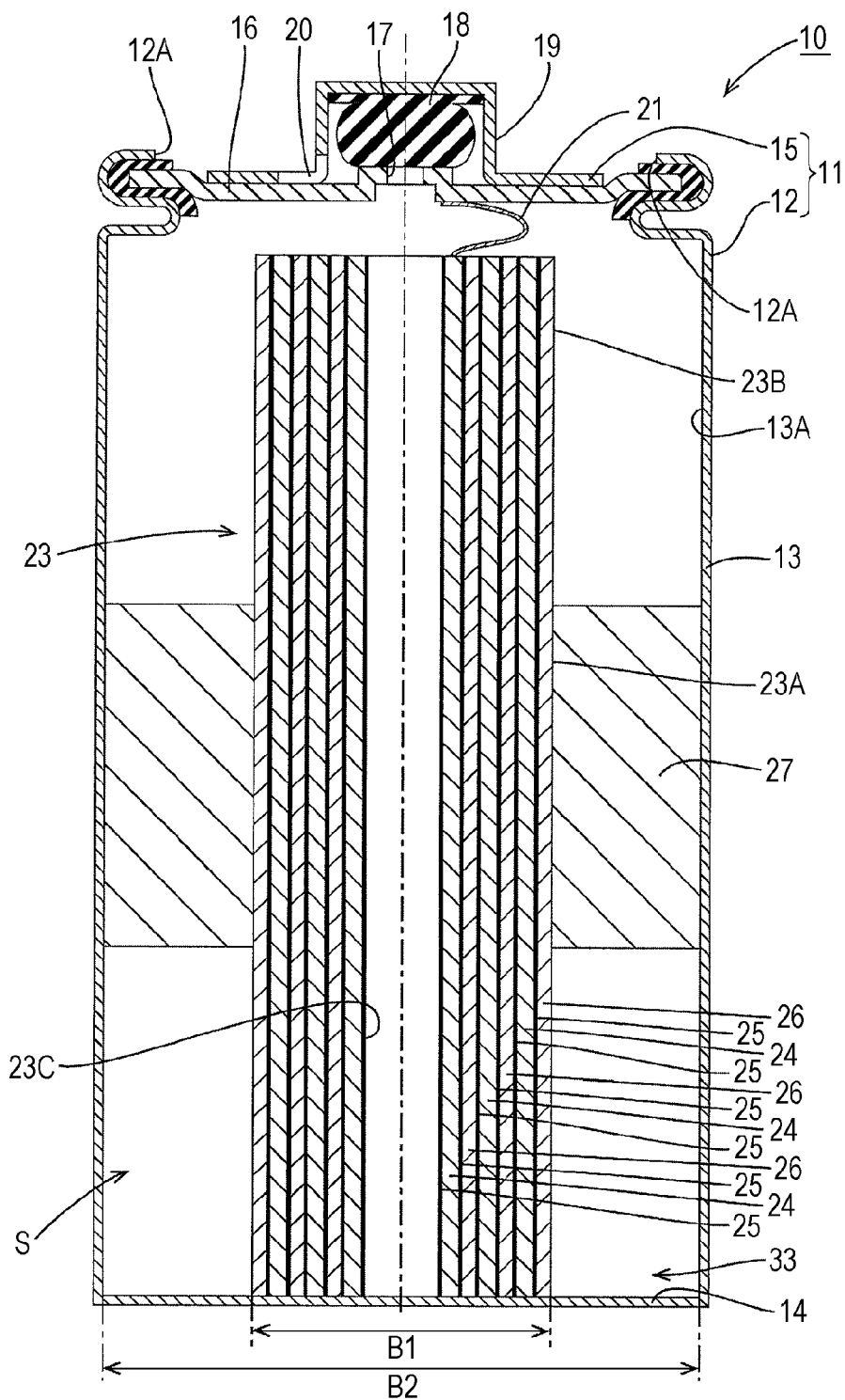
FIG. 34 shows a vertical cross sectional view of the battery.
Figure 35:
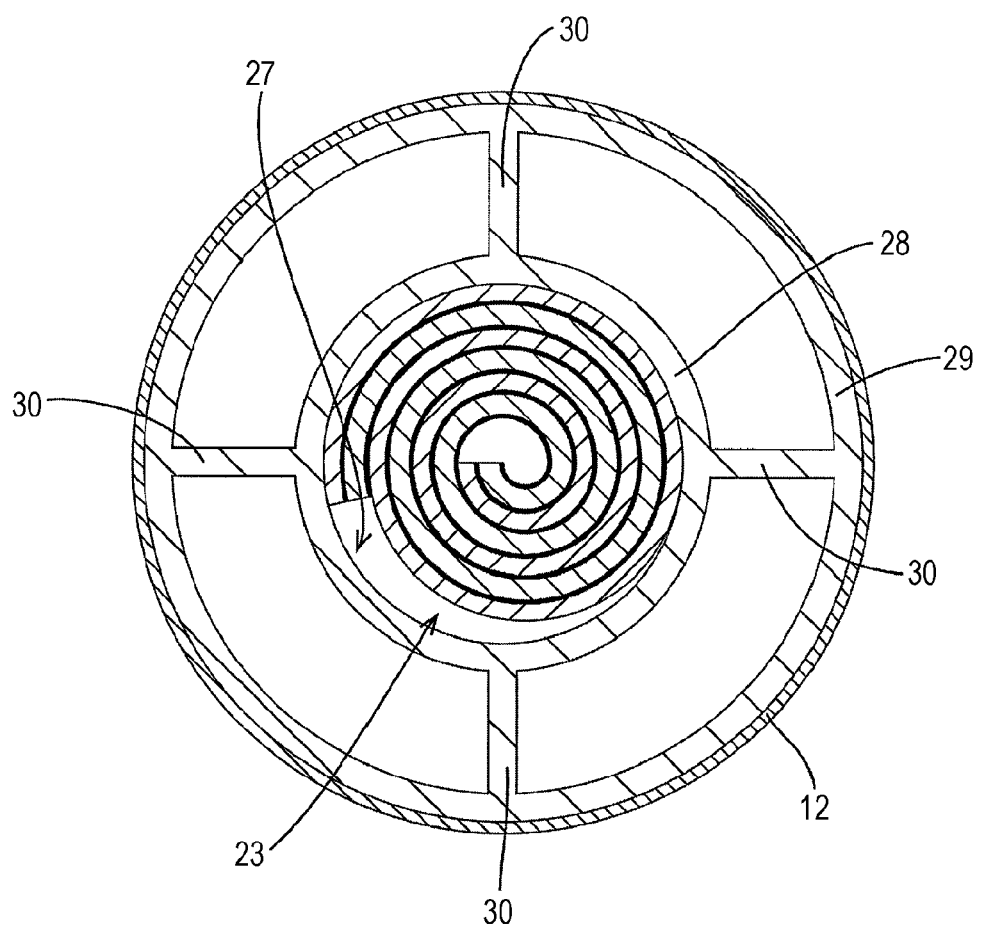
FIG. 35 shows a cross sectional view of the battery.

The tubular portion 13 has a cylindrical shape, and the inner circumferential face thereof has a perfect circle in which the diameter from a center axis A of the tubular portion 13 is constant in FIG. 34. The inside of the tubular portion 13 is the accommodation space S in which an electrode body 23, described later, can be accommodated, and the tubular portion 13 has an inner diameter B2 (the inner diameter in the lateral direction in FIG. 34) larger than an outer diameter B1 of the electrode body 23 (the outer diameter in the lateral direction in FIG. 34).

The closing portion 14 is formed of a circular plate member, and integrally formed with the tubular portion 13.

The cover 15 is connected to a positive plate 24, described later, through an elastic connecting terminal 21, and becomes a positive electrode terminal of the battery 10. The cover 15 includes a flat cover main body 16, an elastic body 18 placed on the cover main body 16, and a terminal plate 19 laid on the cover main body 16.

The cover main body 16 is made of a conductive martial, for example, and connected to the positive plate 24 through the connecting terminal 21. A through hole 17 is formed in the center part of the cover main body 16.

The elastic body 18 is in closely contact with the top face of the cover main body 16 so as to block the through hole 17. The elastic body 18 is made of a material such as rubber, for example, and elastically deformed by an external force.

The terminal plate 19 is a conductive plate covering the elastic body 18.

More specifically, the terminal plate 19 presses the elastic body 18 downward, and is connected to the cover main body 16. The terminal plate 19 is provided with a discharge hole 20 to emit a gas in the battery case 11. The discharge hole 20 emits a gas in the battery case 11 in the case where a pressure in the battery case 11 reaches a predetermined value or more. The elastic body 18 is elastically deformed when applied with a certain internal pressure or more through the through hole 17, and discharges a gas from the discharge hole 20 to the outside of the battery 10.

An elastically deformable insulator 22 is sandwiched between the opening 12A of the battery case main body 12 and the cover 15 for sealing. The insulator 22 insulates the battery case main body 12 from the cover 15.

The electrode body 23 is accommodated in the accommodation space S in the battery case 11, and disposed in the battery case main body 12 as a gap is provided between the electrode body 23 and the cover 15, in which the positive plate 24, the negative plate 26, and a separator 25 disposed between them and having an electrolyte are laid on each other, and they are wound clockwise in a coiled shape, for example, along the inner face of the tubular portion 13.

The positive plate 24 is a plate in which a mixture of a nickel hydroxide active material and a conductive cobalt compound is filled in hollow spaces of the positive electrode substrate made of nickel foam. It is noted that the nickel hydroxide active material is nickel hydroxide, for example, in the case of a nickel-cadmium rechargeable cell, whereas the nickel hydroxide active material is nickel hydroxide added with calcium hydroxide, for example, in the case of a nickel-metal hydride rechargeable cell.

The negative plate 26 includes a negative current collector formed of a flat, nickel-plated bored steel sheet, for example, and a negative active material coated on the negative current collector. It is noted that the negative active material is a mixture of cadmium oxide powder and metal cadmium powder, for example, in the case of a nickel-cadmium rechargeable cell, whereas the negative active material is hydrogen storage alloy powder mainly of AB5 type (rare earth-Ni), AB3.0-3.8 type (rare earth-Mg—Ni), or AB2 type (Laves phase), for example, in the case of a nickel-metal hydride rechargeable cell.

The separator 25 is made of polyolefin nonwoven fabric, for example, and the separator 25 is impregnated with an electrolyte containing primarily potassium hydroxide or sodium hydrate.

The separator 25 is not disposed on the outer circumferential portion of the electrode body 23, and the negative plate 26 is disposed on the outer circumferential portion of the electrode body 23 (the face opposite to the inner face of the tubular portion 13).

The electrode body 23 is formed in such a way that the positive plate 24, the negative plate 26, and the separator 25 are laid on each other and wound in a roll shape. As shown in FIG. 34, the outer circumferential portion of the electrode body 23 is a diameter reducing portion 23A in which the outer diameter B1 of a line segment passing through the center axis of the electrode body 23 (the same as the center axis A of the tubular portion 13) is smaller than the inner diameter B2 of the tubular portion 13. In this embodiment, since the outer diameter B1 of the electrode body 23 is smaller than the inner diameter B2 of the tubular portion 13 across the vertical direction, the outer circumferential portion of the electrode body 23 is entirely the diameter reducing portion 23A.

It is noted that the center part of the electrode body 23 has a hole 23C into which a shaft (not shown) is inserted when winding the positive plate 24, the negative plate 26, and the separator 25. However, the shaft may be left, not pulled out.

Figure 36:
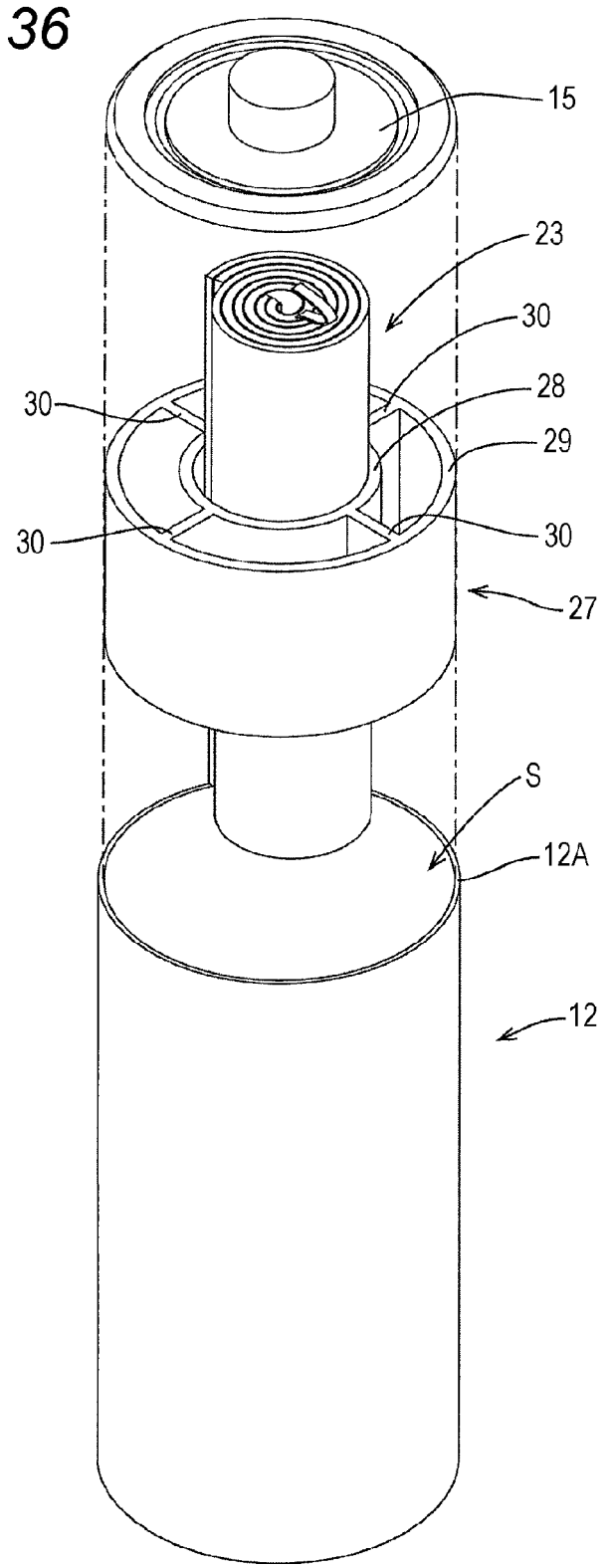
FIG. 36 shows an exploded perspective view of the battery.

The spacer 27 is a conductive member disposed between an outer face 23B of the electrode body 23 and an inner face 13A of the tubular portion 13 to fix the position in the radial direction with respect to the tubular portion 13 of the electrode body 23. As shown in FIG. 36, the spacer 27 has a ring shape.

More specifically, for the shape of the spacer 27, the spacer 27 includes an inner cylinder portion 28 having almost the same inner diameter as the outer diameter B1 of the electrode body 23 and into which the electrode body 23 is inserted with almost no gap, an outer cylinder portion 29 having almost the same outer diameter as the inner diameter B2 of the tubular portion 13 of the battery case 11 and inserted into the tubular portion 13 with almost no gap, and a plate-shaped coupling portion 30 that joins the inner cylinder portion 28 to the outer cylinder portion 29, in which the inner cylinder portion 28, the outer cylinder portion 29, and the coupling portion 30 are integrally formed with each other. The coupling portion 30 is formed at predetermined distance (a predetermined angle) in the circumferential direction of the inner cylinder portion 28.

A space is formed in the portion where the coupling portion 30 is not provided between the inner cylinder portion 28 and the outer cylinder portion 29 in the spacer 27. The shape of the spacer is not limited to the configuration. For example, a spacer having a filled portion between the inner cylinder portion 28 and the outer cylinder portion 29 may be used. In the case where the inside is filled, the portion is filled with a material the same as the material of the spacer 27, or may be filled with a different material.

For the material of the spacer 27, various conductive metals such as stainless steel can be used, for example. However, preferably, a material that does not react with an electrolyte is used. Moreover, a conductive material may be used other than a metal. For example, a conductive resin (such as conductive rubber) may be used.

It is noted that in the accommodation space S in the battery case 11, the space other than the space in which the electrode body 23 and the spacer 27 are disposed is an electrolyte storage space 33 in which an electrolyte leaking out of the separator 25 is stored.

It is noted that for the assembly of the battery 10, the battery 10 can be formed in such a way that the wound electrode body 23 is inserted into the battery case main body 12 in the state in which the wound electrode body 23 is inserted into the inner cylinder portion 28 of the spacer 27 and the cover 15 is then put on (FIG. 36).

According to this embodiment, the following operation and effect are exerted.

The battery 10 includes the conductive battery case 11, the electrode body 23 including the positive plate 24, the negative plate 26, and the separator 25 disposed between the positive plate 24 and the negative plate 26 and including the diameter reducing portion 23A whose outer diameter B1 is smaller than the inner diameter 13A of the battery case 11, and the conductive spacer 27 disposed between the outer circumferential face of the diameter reducing portion 23A and the inner face of the battery case 11 to electrically connect the electrode body 23 to the battery case 11.

With this configuration, the amount of electrodes used can be decreased as compared with the case where the electrode body 23 does not include the diameter reducing portion 23A whose outer diameter B1 is smaller than the inner diameter B2 of the battery case 11. Moreover, the spacer 27 is disposed between the outer circumferential face of the diameter reducing portion 23A and the inner face of the battery case 11, so that the unsteadiness of the electrode body 23 in the battery case 11 can be suppressed.

Accordingly, the amount of electrodes used can be decreased while suppressing the unsteadiness of the electrode body 23 in the battery case 11.

Furthermore, the conductive spacer 27 electrically connects the electrode body 23 to the battery case 11, so that the spacer 27 for preventing the unsteadiness of the electrode body 23 can be used for electrical connection between the electrode body 23 and the battery case 11.

In addition, the battery case 11 includes the tubular portion 13 in which the electrode body 23 and the spacer 27 are accommodated. The electrode body 23 includes the positive plate 24, the negative plate 26, and the separator 25 laid on each other in the radial direction of the tubular portion 13 (in an intersecting direction) with respect to the vertical direction (one direction). The spacer 27 is accommodated between the outer face of the electrode body 23 and the inner face of the tubular portion 13 in the intersecting direction.

The electrode body 23 wound in a cylindrical shape has problems in that it is necessary to change the width at which the electrode is cut and it is necessary to change the manufacturing process steps or devices when the length of the tubular portion 13 in the axial direction in the electrode body 23 is decreased in order to reduce the materials of the electrode body 23. According to this embodiment, it is not necessary to change the length of the tubular portion 13 in the axial direction in the electrode body 23, so that manufacturing costs can be decreased.

The spacer 27 is disposed in the middle portion of the electrode body 23 in the axial direction.

With this configuration, it is possible to prevent the deformation of the middle portion of the electrode body 23 in the axial direction, and the middle portion is relatively prone to be deformed.

The negative plate 26 is disposed at least on the outer face of the electrode body 23, and the negative plate 26 on the outer face of the electrode body 23 contacts the spacer 27.

With this configuration, for example, the configuration can be simplified as compared with a configuration in which the negative plate 26 is electrically connected to the spacer 27 using a lead wire.

The spacer 27 surrounds all the outer circumferential portion of the diameter reducing portion 23A. Thus, it is possible to suppress the deformation of the electrode body 23 caused by locally and externally applying force from the spacer 27 to the electrode body 23, and it is possible to increase the contact area between the electrode body 23 and the spacer 27, so that it is possible to decrease electrical resistance between the negative plate 26 and the battery case 11.

The electrolyte storage space 33 is provided between the outer face 23B of the electrode body 23 and the inner face 13A of the battery case 11.

With this configuration, even though the separator 25 is excessively impregnated with an electrolyte in order to prolong a battery life and the electrolyte leaks out the electrode body 23, the electrolyte can be stored in the electrolyte storage space 33. Moreover, the internal pressure increase in the battery 10 can be relaxed because of the provision of the electrolyte storage space 33, and a battery 10 of high energy density and a long life can be provided.

Furthermore, when the battery 10 is tilted and the electrolyte included in the separator 25 is decreased, the leaked electrolyte stored in the electrolyte storage space 33 is again absorbed in the separator 25 due to a capillary action or the like, so that an internal resistance increase in the battery 10 caused by liquid leakage of the separator 25 can be prevented, and the battery 10 of a longer life can be provided.

Second Embodiment

Next, a second embodiment in the fifth aspect of the present invention will be described with reference to FIG. 37.

Figure 37:
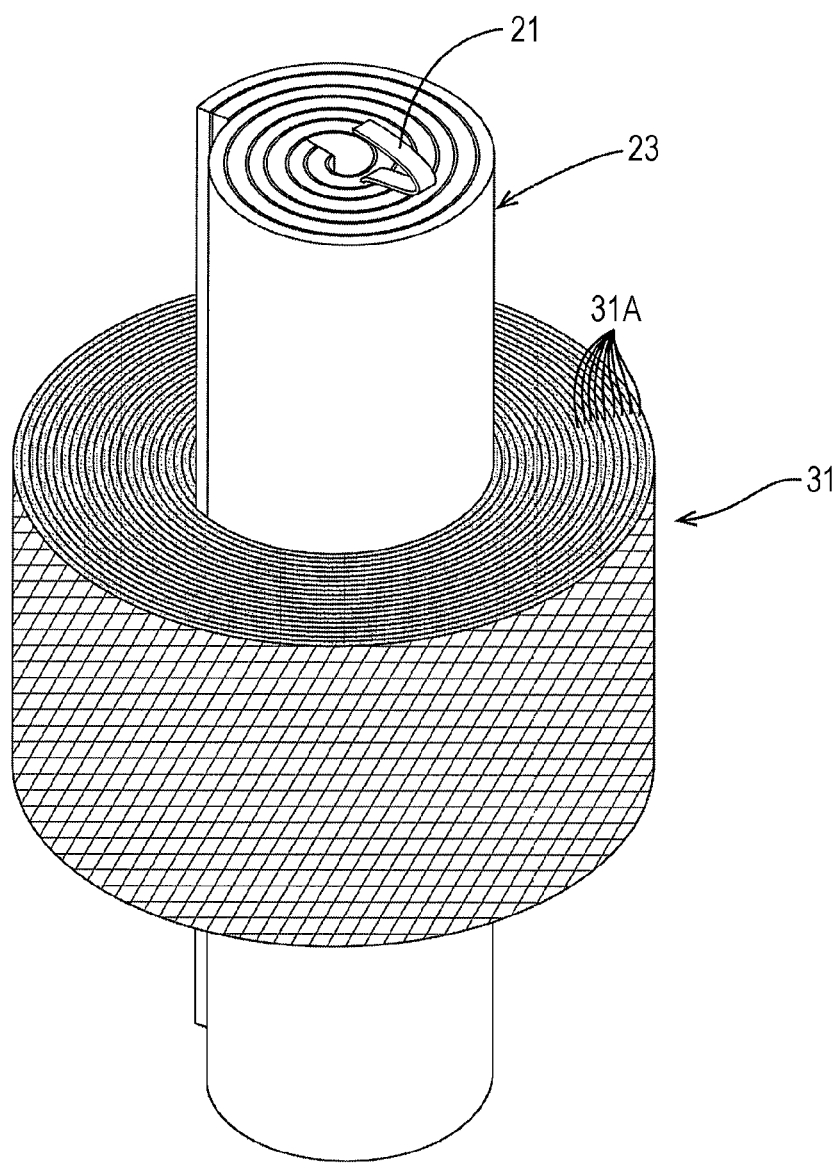
FIG. 37 shows a perspective view in a state in which a spacer in a mesh form is mounted on an electrode body in accordance with a second embodiment in the fifth aspect of the present invention.

In this embodiment, as shown in FIG. 37, a spacer 31 in a mesh form is used. The other configurations are the same as the first embodiment, the same configurations as those of the first embodiment are designated by the same reference numerals and signs, and the description is omitted.

Braided wires 31A are used for the spacer 31, in which metal small-gage wires are braided in a mesh form, for example, and are formed using a metal such as aluminum and an aluminum alloy. It is noted that other metals and conductive members other than metals may be used for the spacer.

The spacer 31 is formed in a ring shape as a whole by winding the braided wires 31A for a plurality of times. The inner circumferential portion contacts an outer circumferential portion 23B of an electrode body 23, and the outer circumferential portion contacts an inner circumferential portion 13A of a tubular portion 13.

Moreover, the spacer 31 is not limited to the spacer formed of the braided wires 31A entirely. For example, such a configuration may be possible in which the braided wires 31A cover a frame for supporting the shape of the braided wires 31A (a conductive member). For the frame, for example, the frame may be formed of a material of low conductivity (high electrical resistance), or may be formed of a resin that does not react with an electrolyte such as an acrylic resin, a polypropylene resin, and a nylon resin, or a material such as stainless steel.

According to this embodiment as described above, the flexibility of the braided wires 31A braided in a mesh form can deform the shape of the spacer 31, so that accommodation into the battery case 11 can be facilitated. Furthermore, the unsteadiness of the spacer 31 in the battery case 11 can be suppressed because of the flexibility of the braided wires 31A.

Third Embodiment

Figure 38:
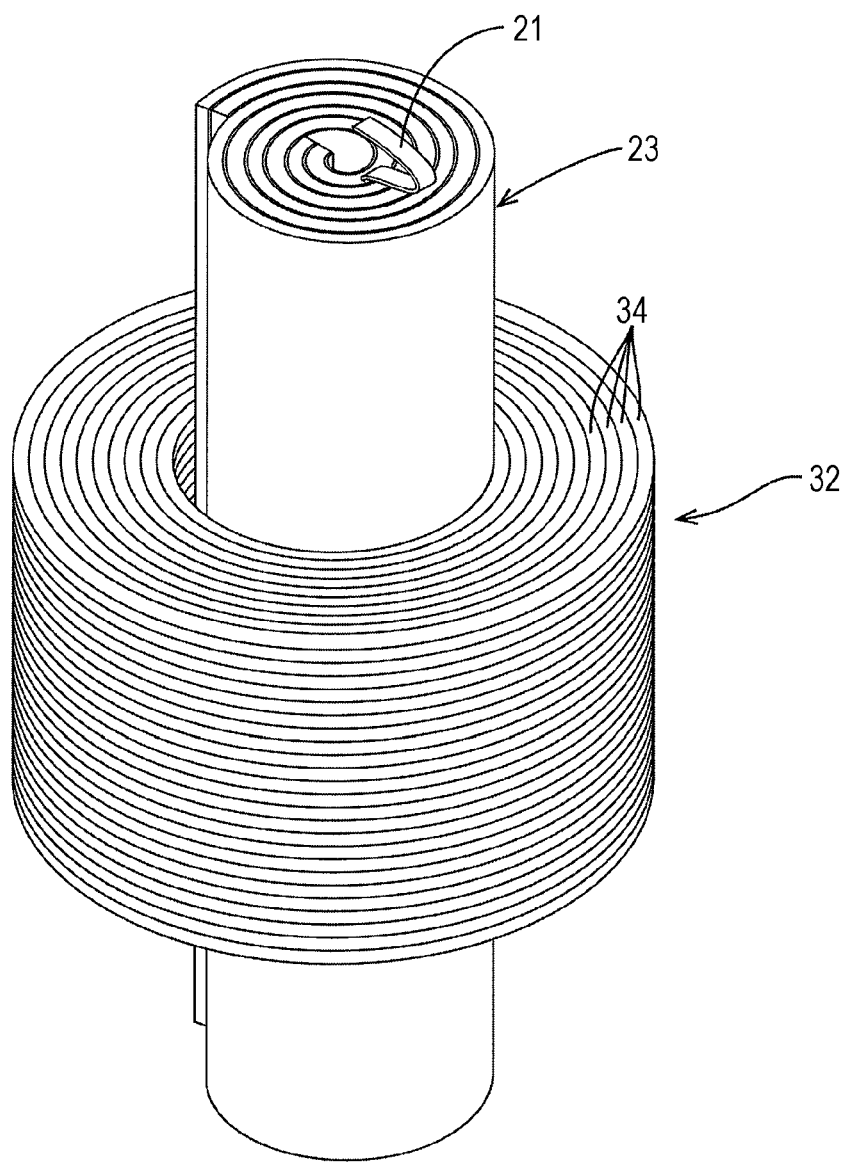
FIG. 38 shows a perspective view in a state in which a spacer in a coil form is mounted on an electrode body in accordance with a third embodiment in the fifth aspect of the present invention.

Next, a third embodiment in the fifth aspect of the present invention will be described with reference to FIG. 38.

This embodiment is different from the spacer 27 according to the first embodiment in that a spacer 32 in a coil form is used. The same configurations as those of the first embodiment are designated by the same reference numerals and signs, and the description is omitted.

The spacer 32 is formed in which a wire material 34 formed of a metal line such as a bare copper wire or a conductive wire other than a metal is wound in a spiral shape or in a coiled shape.

For the thickness and the wire turns of the wire material, such a thickness and wire turns are set that a space between an outer diameter 23B of an electrode body 23 and an inner face 13A of a battery case 11 can be filled.

According to this embodiment, the spacer 32 can be formed by winding the wire material 34, so that manufacturing costs can be decreased as compared with the case where a mold or the like is used to shape the shape of the spacer.

Other Embodiments

The present invention is not limited to the embodiments described with reference to the drawing. For example, the following embodiments will be included in the technical scope of the present invention.

(1) In the embodiment above, since the outer diameter of the electrode body 23 is constant, the diameter reducing portion 23A is formed across the length of the electrode body 23. However, such a configuration may be possible in which the outer diameter of the electrode body 23 is changed in accordance with the position in the axial direction to form the diameter reducing portion on a part of the electrode body 23. For example, such a configuration may be possible in which the electrode body is provided with a diameter increasing portion having almost the same outer diameter as the inner diameter of the tubular portion 13 and a diameter reducing portion whose outer diameter is smaller than the diameter increasing portion.

(2) In the embodiment above, the spacers 27, 31, and 32 are mounted on the middle portion between the tubular portion 13 and the electrode body 23 in the vertical direction. However, such a configuration may be possible in which the spacer is mounted at a portion other than the middle portion between the tubular portion 13 and the electrode body 23 in the vertical direction.

Figure 39:
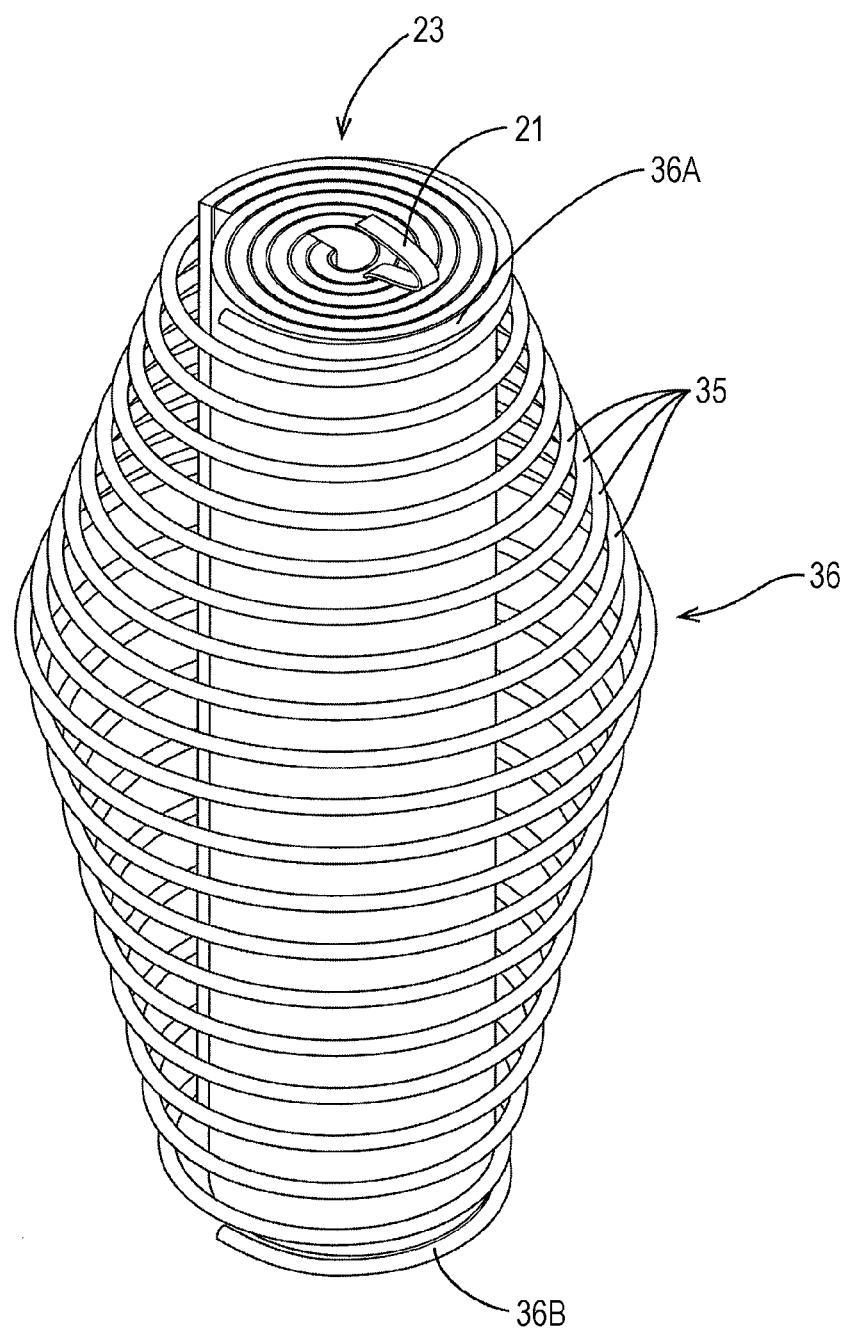
FIG. 39 shows a perspective view in a state in which a spacer in a coil spring form is mounted on an electrode body in accordance with a different embodiment in the fifth aspect of the present invention.
Figure 40:
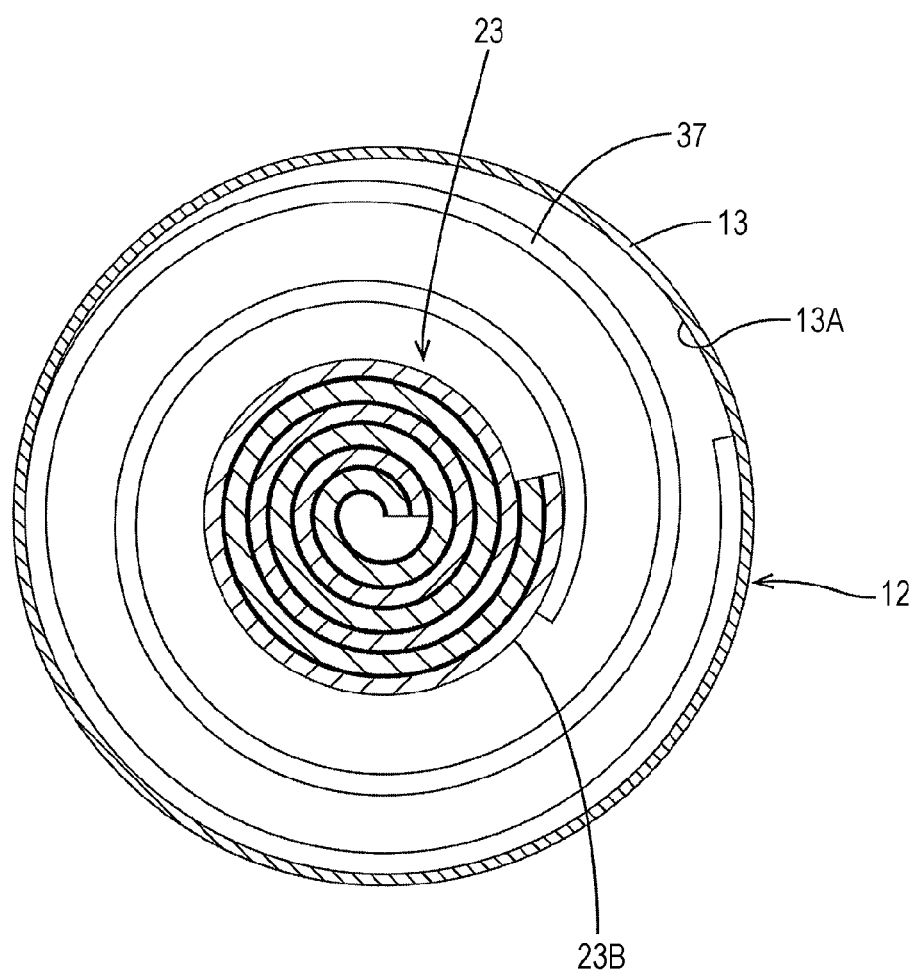
FIG. 40 shows a perspective view in a state in which a spacer in a leaf spring form is mounted on an electrode body in accordance with a different embodiment in the fifth aspect of the present invention.

(3) The shape and the material of the spacer are not limited to the shape and the material in the embodiments. For example, an annular elastic material formed of an elastically deformable plate member or a wire material in a coiled shape or in a spiral shape may be used for the spacer. For example, as shown in FIG. 39, such a configuration may be possible in which a wire material 35 made of an elastically deformable metal in a spiral shape is used for a spacer 36 in a coil spring form provided across the vertical direction of the electrode body 23. The spacer 36 has a smaller diameter from the center axis at an upper end portion 36A and a lower end portion 36B, and the diameter from the center axis is increased as closer to the middle portion in the vertical direction. The middle portion of the largest diameter elastically contacts the inner face 13A of the tubular portion 13, and the upper end portion 36A and the lower end portion 36B of the smallest diameter elastically contact an outer face 23B of the electrode body 23. Moreover, the spacer is not limited to a coil spring. The spacer may be formed of a wound metal plate spring. More specifically, as shown in FIG. 40, for example, such a configuration may be possible in which a spacer 37 formed of a wound metal plate spring is mounted between the electrode body 23 and the tubular portion 13 in the elastic deformation state, and the spacer 37 spring-biases the inner face 13A of the tubular portion 13 and the outer face 23B of the electrode body 23 using elastic repulsion force to electrically connect the electrode body 23 to the tubular portion 13.

(4) The inner face 13A of the tubular portion 13 may not contact all around the spacer. For example, such a configuration may be possible in which a portion surrounding the electrode body 23 is provided on the electrode body 23 side of the spacer and a portion partially contacting the inner face of the electrode body 23 is provided on the inner face side of the tubular portion 13, not surrounding the electrode body 23.

(5) The negative plate 26 is entirely disposed on the outer circumferential portion of the electrode body 23. However, the negative plate 26 may be disposed on a part of the outer circumferential portion of the electrode body 23. Moreover, the negative plate 26 may not be disposed on the outer circumferential portion of the electrode body 23. In this case, the negative plate 26 may be electrically connected to the spacer using a lead wire or the like.

Sixth Aspect

First Embodiment

A first embodiment in a sixth aspect of the present invention will be described with reference to FIGS. 41 to 44.

A battery 10 according to this embodiment is an alkaline secondary battery such as a nickel-metal hydride rechargeable cell. For example, the battery 10 is a low capacity type such as an AA battery ("R6" in the IEC (International Electrotechnical Commission), and "AA" in the United States) having a capacity of 1800 mAh or less and an AAA battery ("R03" in the IEC, and "AAA" in the United States) having a capacity of 650 mAh or less.

Figure 42:
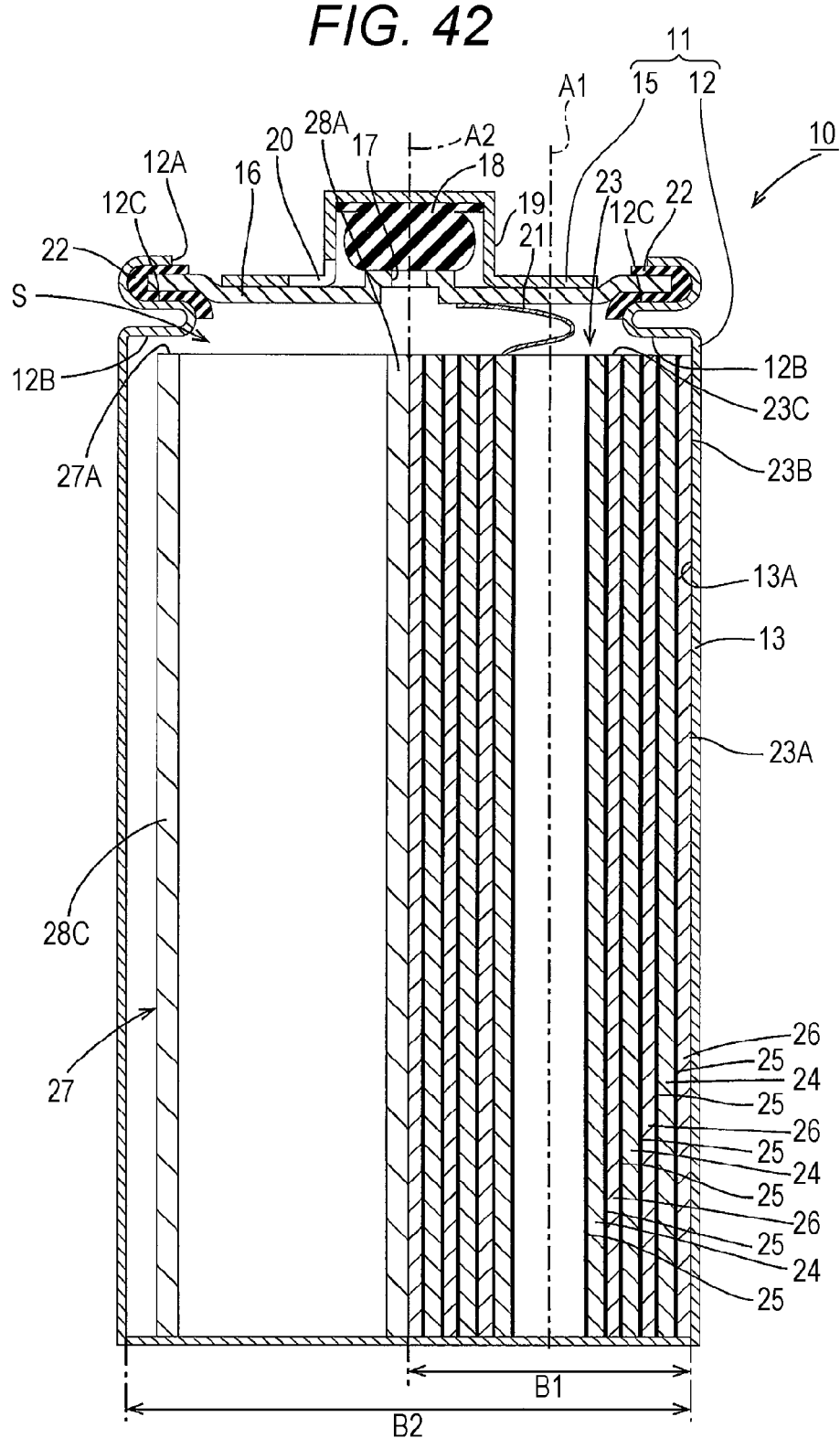
FIG. 42 shows a vertical cross sectional view of the battery.

In the following, a description will be given for the vertical direction and in the lateral direction with reference to the directions shown in FIG. 42.

Figure 41:
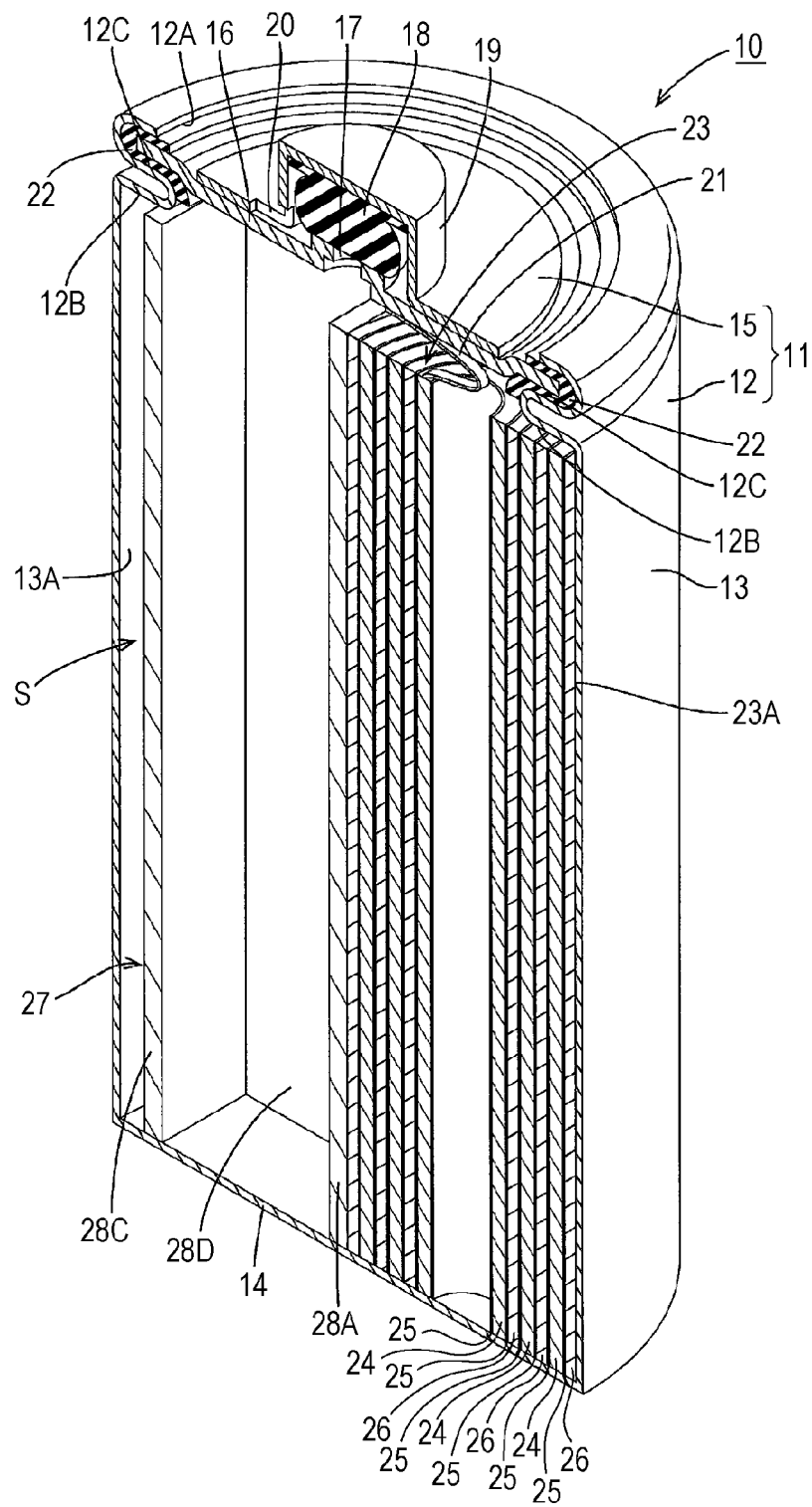
FIG. 41 shows a perspective view of a longitudinal section of a battery according to a first embodiment in a sixth aspect of the present invention.

As shown in FIG. 41, the battery 10 includes a metal battery case 11, an electrode body 23 having a cylindrical shape accommodated in the battery case 11 (an example of "a cylindrical electrode body"), and a spacer 27 contiguous to the electrode body 23 in the battery case 11. The battery case 11 is defined in the size according to the specification. The battery case 11 has a shape elongated in the vertical direction, has an accommodation space S in the inside, and has a nickel-plated surface. The battery case 11 includes a cylindrical battery case main body 12 with a bottom having an opening 12A opened at one end side and the other end closed, and a cover 15 that closes the opening 12A of the battery case main body 12.

The battery case main body 12 becomes a negative electrode terminal of the battery 10 by contacting the negative plate 26, described later, and includes a tubular portion 13 and a closing portion 14 that closes the lower end of the tubular portion 13.

The tubular portion 13 has a cylindrical shape. As shown in FIG. 42, the inner circumferential portion and the outer circumferential portion of the tubular portion 13 have a perfect circle in which the diameter from an axis A2 passing through the center of the circle of the tubular portion 13 is constant. The inside of the tubular portion 13 is the accommodation space S in which an electrode body 23, described later, can be accommodated, and the tubular portion 13 has an inner diameter B2 (the diameter of the tubular portion 13 in the lateral direction) larger than an outer diameter B1 of the electrode body 23 (the diameter of the electrode body 23 in the lateral direction).

To the upper end portion of the tubular portion 13, a diameter reducing portion 12B is connected. The diameter reducing portion 12B projects on the inner side of the tubular portion 13 to reduce the inner diameter. The diameter reducing portion 12B partitions the top end of the accommodation space S. On the diameter reducing portion 12B, a fitting portion 12C is formed into which the peripheral portion of the cover 15 is fit.

The closing portion 14 is formed of a circular plate member, and integrally formed with the tubular portion 13.

The cover 15 is connected to a positive plate 24, described later, through an elastic connecting terminal 21, and becomes a positive electrode terminal of the battery 10. The cover 15 includes a flat cover main body 16, an elastic body 18 placed on the cover main body 16, and a terminal plate 19 laid over the cover main body 16.

The cover main body 16 is made of a conductive material, and connected to the positive plate 24 through the connecting terminal 21. A through hole 17 is formed in the center part of the cover main body 16.

The elastic body 18 is in closely contact with the top face of the cover main body 16 so as to block the through hole 17. The elastic body 18 is made of a material such as rubber, for example, and elastically deformed by an external force.

The terminal plate 19 is a conductive plate covering the elastic body 18.

More specifically, the terminal plate 19 presses the elastic body 18 downward, and is connected to the cover main body 16. The terminal plate 19 is provided with a discharge hole 20 to emit a gas in the battery case 11. The discharge hole 20 emits a gas in the battery case 11 in the case where a pressure in the battery case 11 reaches a predetermined value or more. The elastic body 18 is elastically deformed when applied with a certain internal pressure or more through the through hole 17, and discharges a gas from the discharge hole 20 to the outside of the battery 10.

An elastically deformable insulator 22 is sandwiched between the opening 12A of the battery case main body 12 and the cover 15 for sealing. The insulator 22 insulates the battery case main body 12 from the cover 15.

The electrode body 23 is accommodated in the accommodation space S in the battery case 11, and disposed in the battery case main body 12 as a gap is provided between the electrode body 23 and the cover 15.

The electrode body 23 is formed in such a way that the positive plate 24, the negative plate 26, and a separator 25 that is disposed between them and has an electrolyte are laid on each other, and are wound clockwise in a coiled shape, for example, along the inner face 13A of the tubular portion 13. The length of the electrode body 23 in the vertical direction is the length across almost the overall length of the accommodation space S in the vertical direction. It is noted that a gap is formed between a top end 23C of the electrode body 23 and the diameter reducing portion 12B of the battery case 11, and the lower end of the electrode body 23 contacts the closing portion 14.

The positive plate 24 is a plate in which a mixture of a nickel hydroxide active material and a conductive cobalt compound is filled in hollow spaces of the positive electrode substrate made of nickel foam. It is noted that the nickel hydroxide active material is nickel hydroxide, for example, in the case of a nickel-cadmium rechargeable cell, whereas the nickel hydroxide active material is nickel hydroxide added with calcium hydroxide, for example, in the case of a nickel-metal hydride rechargeable cell.

The negative plate 26 includes a negative current collector formed of a flat, nickel-plated bored steel sheet, for example, and a negative active material coated on the negative current collector. It is noted that the negative active material is a mixture of cadmium oxide powder and metal cadmium powder, for example, in the case of a nickel-cadmium rechargeable cell, whereas the negative active material is hydrogen storage alloy powder mainly of AB5 type (rare earth-Ni), AB3.0-3.8 type (rare earth-Mg—Ni), or AB2 type (Laves phase), for example, in the case of a nickel-metal hydride rechargeable cell.

The separator 25 is made of polyolefin nonwoven fabric, for example, and the separator 25 is impregnated with an electrolyte containing primarily potassium hydroxide or sodium hydrate.

The separator 25 is not disposed on the outer circumferential face 23B of the electrode body 23, and the negative plate 26 is disposed on the outer circumferential face 23B of the electrode body 23.

The electrode body 23 is formed in such a way that the positive plate 24, the negative plate 26, and the separator 25 are laid on each other and wound in a roll shape. As shown in FIG. 42, the electrode body 23 has a diameter reducing portion 23A that the outer diameter B1 of the electrode body 23 is smaller than the inner diameter B2 of the tubular portion 13. In this embodiment, since the outer diameter B1 of the electrode body 23 is smaller than the inner diameter B2 of the tubular portion 13 across the vertical direction, the overall length of the outer circumferential face 23B of the electrode body 23 in the vertical direction is the diameter reducing portion 23A.

Figure 44:
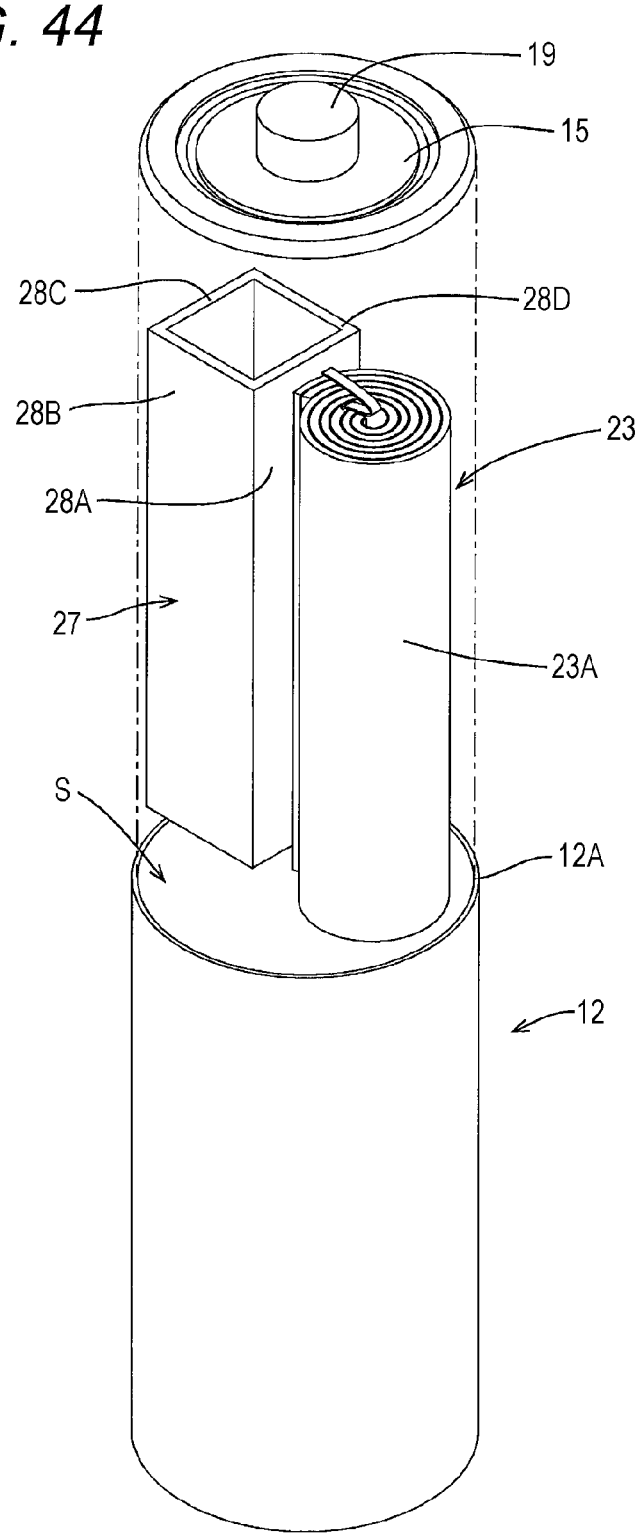
FIG. 44 shows an exploded perspective view of the battery.

The spacer 27 is a member disposed between the outer circumferential face 23B of the electrode body 23 and the inner face 13A of the tubular portion 13 of the battery case 11 to fix the position in the intersecting direction with respect to an axis A1 of the electrode body 23 in the tubular portion 13. As shown in FIG. 44, the spacer 27 is in a square tube.

More specifically, the spacer 27 is formed in which walls 28A to 28D made of four flat plates are formed in a ring shape in the vertical direction. As shown in FIG. 42, the length of the spacer 27 in the vertical direction is the length across almost the overall length of the accommodation space S in the vertical direction. Thus, the length of the spacer 27 in the vertical direction is almost the same length as the length of the electrode body 23 in the vertical direction. It is noted that a gap is formed between the top end 27A of the spacer 27 and the diameter reducing portion 12B of the battery case 11.

The lower end of the spacer 27 contacts the closing portion 14.

Figure 43:
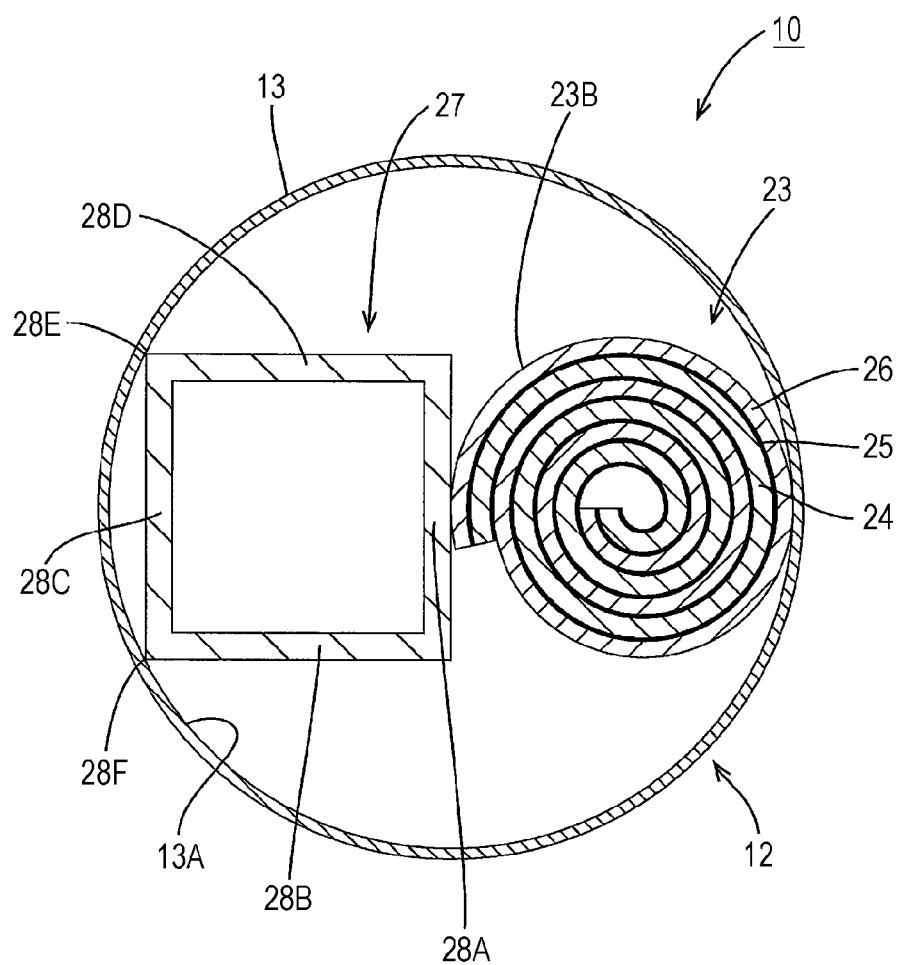
FIG. 43 shows a cross sectional view of the battery.

As shown in FIG. 43, in the spacer 27, one wall 28A opposite to the electrode body 23 contacts the outer face 23B of the electrode body 23. Corners 28E and 28F of the wall 28C on the opposite side of the wall 28A contact the inner face 13A of the tubular portion 13.

The spacer 27 is made of a resin that does not react with the electrolyte such as an acrylic resin, a polypropylene resin, and a nylon resin or a material such as stainless steel, for example.

It is noted that in the accommodation space S in the battery case 11, an electrolyte leaking out of the separator 25 can be stored in the space other than in a portion on which the electrode body 23 and the walls 28A to 28D are disposed.

According to this embodiment, the following operation and effect are exerted.

The battery 10 according to this embodiment includes the battery case 11 including the tubular portion 13 having the accommodation space S in the inside, and the electrode body 23 accommodated in the accommodation space S, including the positive plate 24, the negative plate 26, and the separator 25 disposed between them that are laid on each other in the intersecting direction of the axis A2 of the tubular portion 13, and having the diameter reducing portion 23A whose outer diameter B1 is smaller than the inner diameter B2 of the tubular portion 13, and the spacer 27 disposed between the tubular portion 13 and the electrode body 23 and contacting the inner face 13A of the tubular portion 13 and the outer face 23B of the electrode body 23. The electrode body 23 in the tubular portion 13 is disposed at a position at which the axis A1 of the electrode body 23 is different from the axis A2 of the tubular portion 13.

According to this embodiment, the outer diameter B1 of the electrode body 23 is smaller than the inner diameter B2 of the battery case 11, so that the amount of electrodes used can be decreased as compared with the case of using an electrode body having the outer diameter the same as the inner diameter B2 of the battery case 11, for example. Moreover, the spacer 27 contacts the outer face 23B of the electrode body 23 and the inner face 13A of the battery case 11, so that the unsteadiness of the electrode body 23 in the battery case 11 can be suppressed.

Accordingly, the amount of electrodes used can be decreased while suppressing the unsteadiness of the electrode body 23 in the battery case 11.

Furthermore, the electrode body 23 in the tubular portion 13 is disposed at a position at which the axis A1 of the electrode body 23 is different from the axis A2 of the tubular portion 13, so that the spacer 27 can be disposed close to the axis A2 of the tubular portion 13 in the battery case 11, and the degree of freedom of the disposition of the spacer 27 can be improved. In addition, the electrode body 23 wound in a cylindrical shape has problems in that it is necessary to change the width at which the electrode is cut and it is necessary to change the manufacturing process steps or devices when the length of the electrode body 23 in the direction of the axis A1 is decreased in order to decrease the materials of the electrode body 23. According to this embodiment, it is not necessary to change the length in the direction of the axis A1 of the tubular portion 13 of the electrode body 23, so that manufacturing costs can be decreased.

Moreover, the outer face 23B (the opposing face) of the electrode body 23 opposite to the inner face 13A of the tubular portion 13 contacts the inner face 13A of the tubular portion 13.

With this configuration, at least one side of the electrode body 23 can be supported by the tubular portion 13, so that the unsteadiness of the electrode body 23 in the battery case 11 can be suppressed.

Furthermore, the battery case 11 is of conductivity, the negative plate 26 is disposed at least on a part of the outer face 23B of the electrode body 23, and the negative plate 26 of the outer face contacts the inner face 13A of the tubular portion 13.

With this configuration, the negative plate 26 of the electrode body 23 can be electrically connected to the battery case 11 used as the negative electrode terminal.

In addition, the length of the electrode body 23 in the direction of the axis A1 is the overall length of the accommodation space S in the direction along the direction of the axis A1, and the spacer 27 has the length across the overall length in the direction of the axis A1 of the electrode body 23.

With this configuration, the unsteadiness of the electrode body 23 in the battery case 11 can be more reliably prevented.

Second Embodiment

Figure 45:
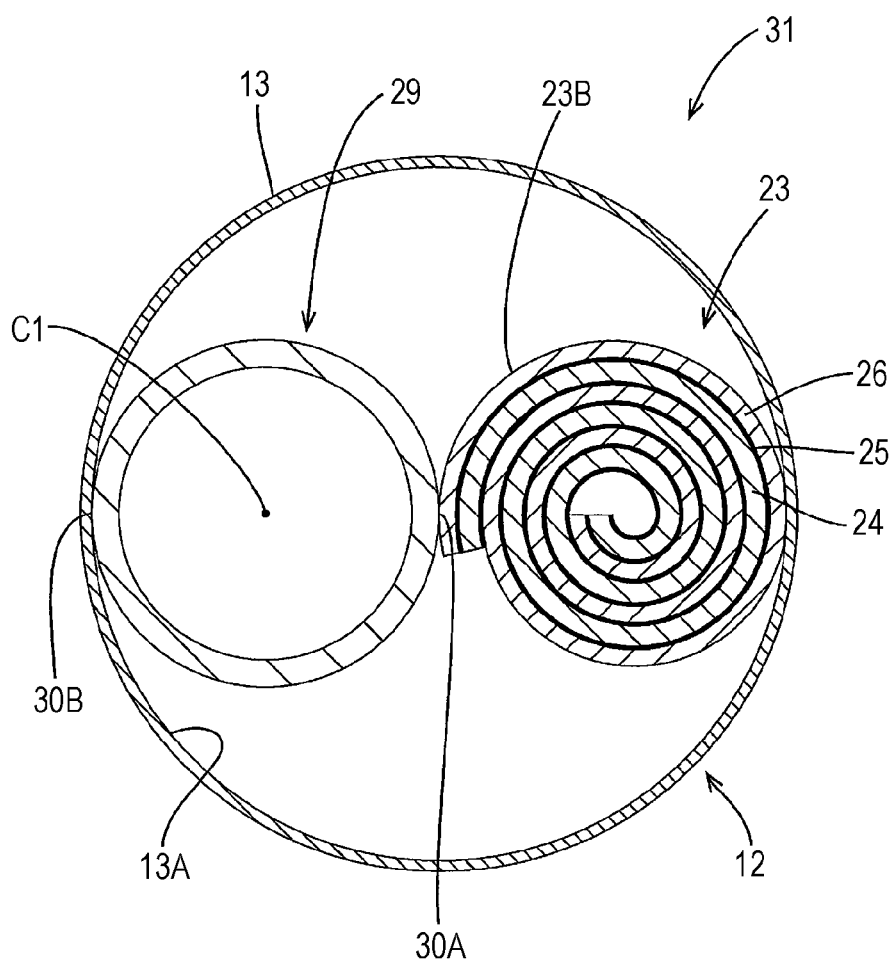
FIG. 45 shows a cross sectional view of a battery according to a second embodiment in the sixth aspect of the present invention.

Next, a second embodiment in the sixth aspect of the present invention will be described with reference to FIG. 45.

In the battery 10 according to the first embodiment, the spacer 27 is in a rectangular tube. However, as shown in FIG. 45, in a battery 31 according to this embodiment, a spacer 29 has a cylindrical shape. The other configurations are the same as the first embodiment, the same configurations as those of the first embodiment are designated by the same reference numerals and signs, and the description is omitted.

The spacer 29 has a cylindrical shape in which the inner circumferential portion and the outer circumferential portion have a perfect circular shape. The spacer 29 is disposed between an outer face 23B of an electrode body 23 and an inner face 13A of a tubular portion 13 to fix the position of the electrode body 23 in the intersecting direction of an axis A1 of the electrode body 23 in the tubular portion 13.

As similar to the first embodiment, the length of the spacer 29 in the vertical direction is the length across almost the overall length of the accommodation space S in the vertical direction. A gap is formed between the top end of the spacer 29 and a diameter reducing portion 12 of a battery case 11. The lower end of the spacer 29 contacts the closing portion 14.

The outer circumferential face of the spacer 29 includes a first contacting portion 30A that contacts the outer circumferential face 23B of the electrode body 23 in a line, and a second contacting portion 30B that contacts the inner face 13A of the tubular portion 13 at a symmetrical position to the first contacting portion 30A with respect to a center axis C1 of the spacer 29. The material of the spacer 29 is similar to the maternal in the first embodiment.

Other Embodiments

The present invention is not limited to the embodiments described with reference to the drawing. For example, the following embodiments will be included in the technical scope of the present invention.

(1) The materials of the spacer are not limited to the materials in the embodiments, and various materials can be used. For example, a metal such as stainless steel or a conductive resin can also be used.

(2) In the embodiments above, the outer face 23B of the electrode body 23 contacts the inner face 13A of the tubular portion 13. However, the outer face 23B of the electrode body 13 may not contact the inner face 13A of the tubular portion 13. At least the axis A1 of the electrode body 23 may be disposed at a position different from the axis A2 of the tubular portion 13. In this case, it is also possible to increase the number of the spacers for positioning the electrode body 23 in the tubular portion 13. For example, such a configuration may be possible in which a plurality of spacers is provided between the outer face 23B of the electrode body 23 and the inner face 13A of the tubular portion 13 and the electrode body 23 is positioned in the tubular portion 13 in the intersecting direction of the axis A2 using the spacers from a plurality of directions.

Moreover, in this case, for example, when the spacer is of conductivity, the electrode body 23 can be electrically connected to the tubular portion 13 through the spacers even though the electrode body 23 does not contact the tubular portion 13.

(3) In the embodiments above, since the outer diameter of the electrode body 23 is constant, the diameter reducing portion 23A whose the outer diameter is smaller than the inner diameter B2 of the tubular portion 13 is formed across the length of the electrode body 23. However, such a configuration may be possible in which the outer diameter of the electrode body 23 is changed in accordance with the position in the axial direction to form the diameter reducing portion on a part of the axial direction of the electrode body 23. For example, such a configuration may be possible in which the electrode body is provided with a diameter increasing portion having almost the same outer diameter as the inner diameter of the tubular portion 13 and a diameter reducing portion whose outer diameter is smaller than the diameter increasing portion at locations different in the axial directions.

(4) The shapes of the spacer 27 and 29 are not limited to a square tube and a cylindrical shape in the embodiments, and may have other shapes. For example, the shapes may be in a rectangular tube, an elliptical tube, or an oblong tube. Moreover, the shapes are not limited to tubes. The shapes may be a shape having a filled inner space. In the case of a shape having a filled inner space, a member to be filled may be a martial the same as the materials of the spacer 27 and 29 or a different material. It is noted that a spacer including a space is preferable because the material of the spacer can be reduced.

(5) In the embodiment above, the negative plate 26 is disposed on throughout the outer face of the electrode body 23. However, the present invention is not limited thereto. For example, such a configuration may be possible in which the negative plate is disposed on a part of the outer face of the electrode body 23 and the negative plate of the outer face contacts the inner face 13A of the tubular portion 13.

Seventh Aspect

A battery 10 according to one embodiment in a seventh aspect of the present invention will be described with reference to FIGS. 46 to 50. The battery 10 is an alkaline secondary battery such as a nickel-metal hydride rechargeable cell. For example, the battery 10 is a low capacity type such as an AA battery ("R6" in the IEC (International Electrotechnical Commission), and "AA" in the United States) having a capacity of 1800 mAh or less, or an AAA battery ("R03" in the IEC, and "AAA" in the United States) having a capacity of 650 mAh or less. In the description below, the near side in FIG. 46 is the front side of the battery 10, the right side is the right side of the battery 10, and the upper side is the upper side of the battery 10.

Figure 46:
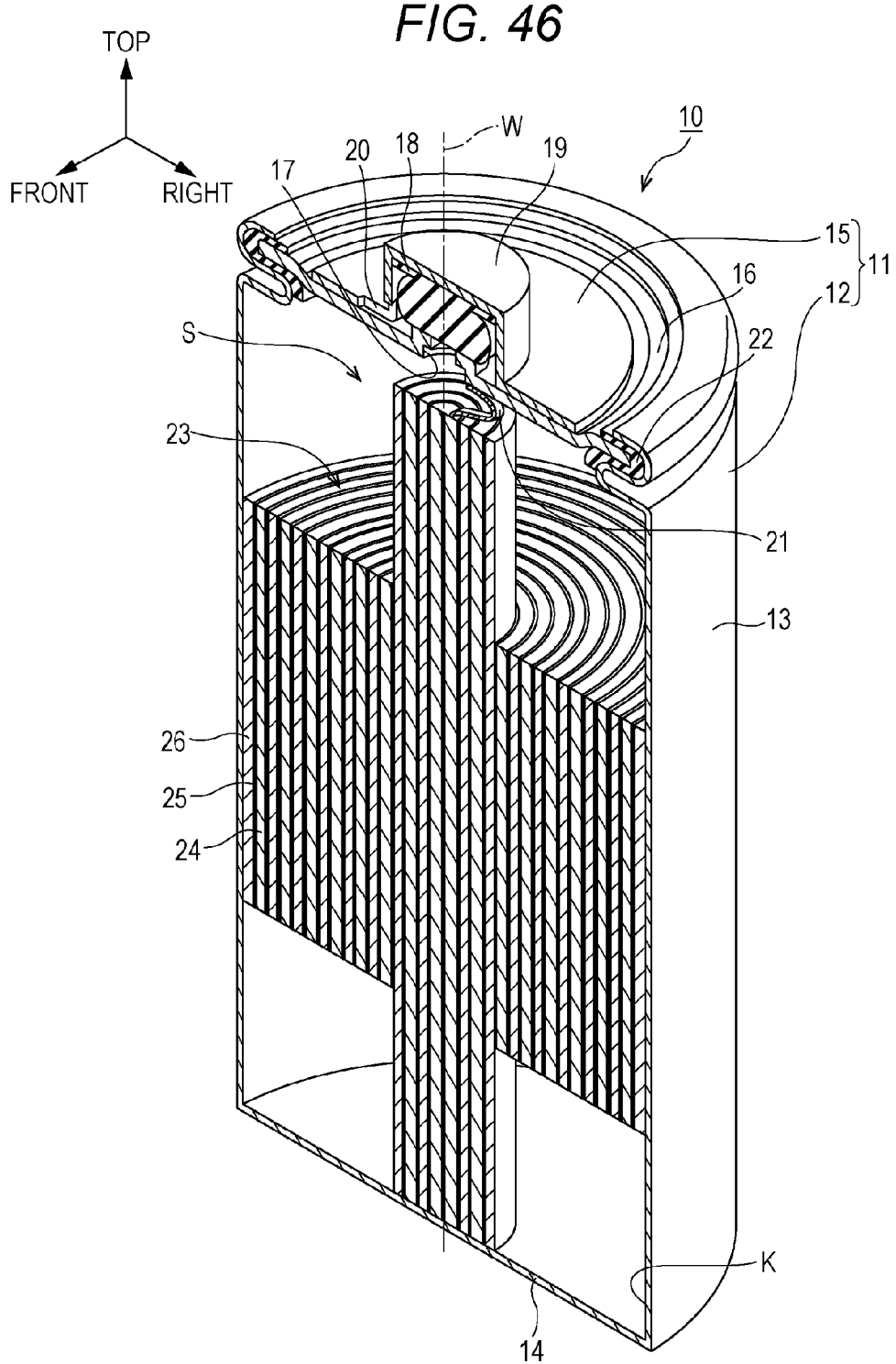
FIG. 46 shows a perspective view of a longitudinal section of a battery according to one embodiment in a seventh aspect of the present invention.

As shown in FIG. 46, the battery 10 is configured by a battery case 11 and an electrode body 23. The battery case 11 is made of a metal and has a shape elongated in one direction. The battery case 11 is an example of the case, and configured by a battery case main body 12 and a cover 15, and includes an accommodation space S in the inside. It is noted that one direction is a vertical direction in FIG. 46, the longitudinal direction of the battery case 11, and a direction opposite to the cover 15 and a closing portion 14, described later.

The battery case main body 12 has a nickel-plated surface, and becomes a negative electrode terminal of the battery 10 by electrically connecting a negative plate 26, described later. The battery case main body 12 has a shape in which one end is opened and the other end is closed in the vertical direction. More specifically, the battery case main body 12 includes a tubular portion 13 and the closing portion 14.

The tubular portion 13 has a cylindrical shape elongated in the vertical direction, and the shape of the inner circumferential face seen from the vertical direction is in a perfect circle in which an inner diameter R passing through a center axis W along the vertical direction is constant. The inside of the tubular portion 13 is the accommodation space S in which an electrode body 23, described later, can be accommodated.

At one end of the tubular portion 13 in one direction, that is, at the top end in FIG. 46, an opening 12A is formed to communicate with the inside of the tubular portion 13. The other end of the tubular portion 13 in one direction, that is, at the top end in FIG. 46 is closed with the closing portion 14. The closing portion 14 is a circular plate member, and integrally formed with the tubular portion 13.

The cover 15 is electrically connected to a positive plate 24, described later, through an elastic connecting terminal 21, and becomes a positive electrode terminal of the battery 10. The cover 15 includes a cover main body 16, an elastic body 18, and a terminal plate 19. The cover main body 16 is a circular flat plate, made of a conductive material such as a nickel-plated iron material, for example, and electrically connected to the positive plate 24 through the connecting terminal 21. A through hole 17 is formed in the center part of the cover main body 16.

The elastic body 18 is disposed on the top face of the cover main body 16, that is, on the other side of the face opposite to the closing portion 14 in such a way that the elastic body 18 blocks the through hole 17. The elastic body 18 is made of a material such as rubber, for example, and elastically deformed by an external force. The terminal plate 19 is a conductive plate covering the elastic body 18.

More specifically, the terminal plate 19 is electrically connected to the cover main body 16 in the state in which the terminal plate 19 presses the elastic body 18 downward, that is, presses the elastic body 18 against the cover main body 16. The terminal plate 19 is provided with a discharge hole 20 to emit a gas in the battery case 11. For example, when the internal pressure of the battery case 11 is increased and a pressure of a predetermined value or more is applied to the elastic body 18 through the through hole 17, the elastic body 18 is elastically deformed to communicate the inside of the battery case 11 with the discharge hole 20, and a gas in the battery case 11 is discharged to the outside of the battery 10 through the discharge hole 20.

An elastically deformable insulator 22 is sandwiched between the opening 12A of the battery case main body 12 and the cover 15 for sealing. The insulator 22 insulates the battery case main body 12 from the cover 15.

The electrode body 23 is accommodated in the accommodation space S in the battery case 11. The electrode body 23 includes the positive plate 24, the negative plate 26, and a separator 25 disposed between them and having an electrolyte, which are wound in a coiled shape as a winding axis along the vertical direction is in the center. It is noted that the winding axis may be matched with the center axis W or not. However, in the following, for convenience of explanation, the winding axis is matched with the center axis W.

The positive plate 24 (an example of one electrode plate) is formed of a positive metal plate 24A (an example of the substrate) coated with a positive active material 24B (an example of the active material). The positive metal plate 24A is made of nickel foam, for example. The positive active material 24B is a mixture of a positive nickel hydroxide active material and a conductive cobalt compound. The positive plate 24 is formed in which the positive active material 24B is coated in hollow spaces in the positive metal plate 24A.

It is noted that in the case where the battery 10 is a nickel-cadmium rechargeable cell, the positive active material 24B is made of nickel hydroxide, for example, and in the case where the battery 10 is a nickel-metal hydride rechargeable cell, the nickel hydroxide active material is nickel hydroxide added with calcium hydroxide, for example.

The negative plate 26 (one of the other electrode plate) includes the negative metal plate 26A (an example of the substrate) coated with the negative active material 26B (an example of an active material of the other polarity). The negative metal plate 26A is a flat, nickel-plated bored steel sheet, for example. The negative active material 26B is powder such as cadmium powder and hydrogen storage alloy powder (an example of an active material of one polarity), for example. The negative plate 26 is formed of the negative metal plate 26A coated with the negative active material 26B.

It is noted that the negative active material 26B is a mixture of cadmium oxide powder and metal cadmium powder, for example, in the case of a nickel-cadmium rechargeable cell, whereas the negative active material is hydrogen storage alloy powder mainly of AB5 type (rare earth-Ni), AB3.0-3.8 type (rare earth-Mg—Ni), or AB2 type (Laves phase), for example, in the case of a nickel-metal hydride rechargeable cell.

Figure 48:
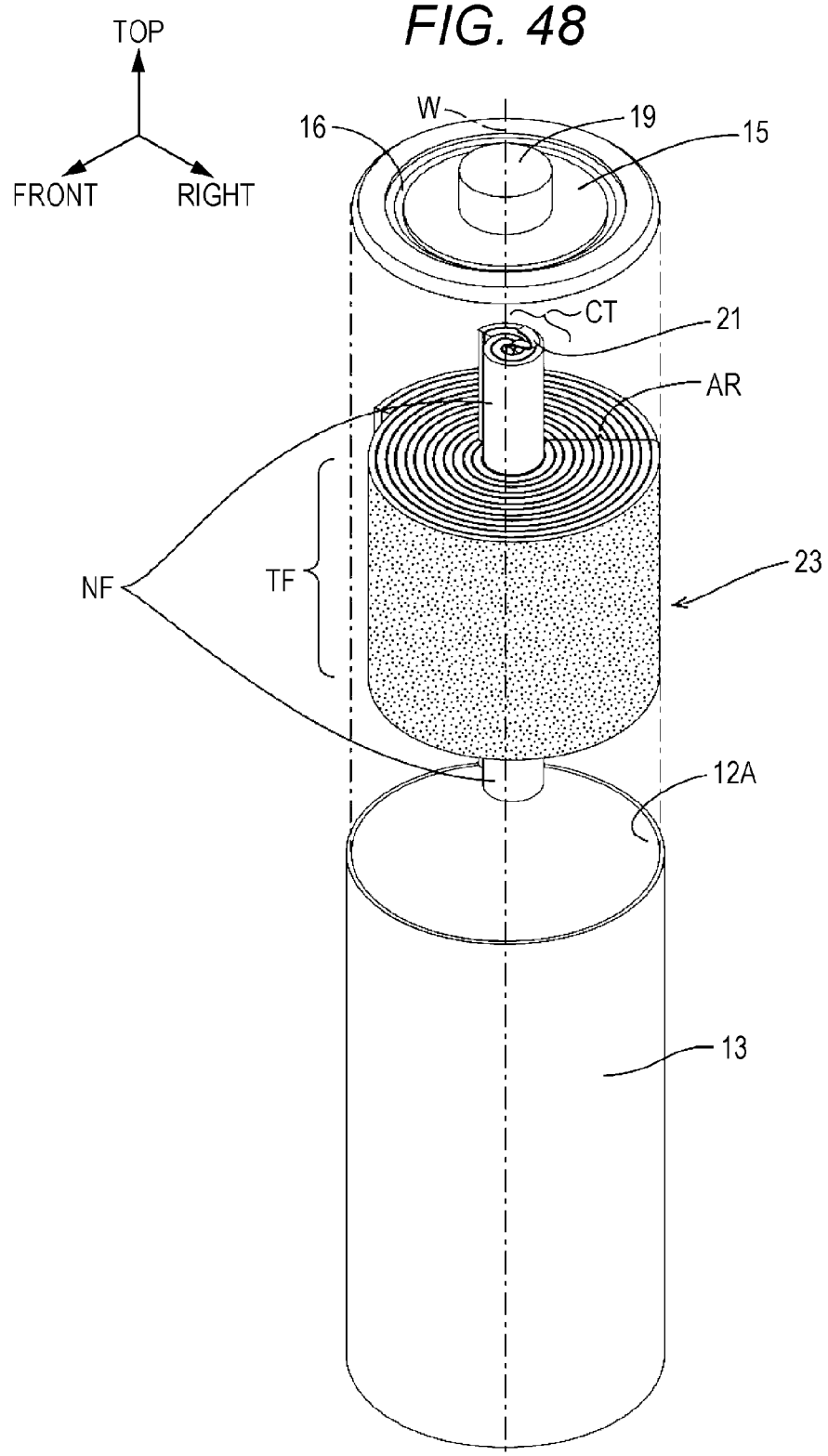
FIG. 48 shows an exploded perspective view of the battery.

Moreover, as shown in FIG. 48, in the electrode body 23, in a center portion CT wound at a position close to a center axis W in the longitudinal direction and the lateral direction, the length of the electrode body 23 in the vertical direction is longer than a peripheral portion AR wound around the center portion CT. Either the positive active material 24B or the negative active material 26B is not coated on the center portion CT.

On the other hand, the positive active material 24B or the negative active material 26B is coated on the peripheral portion AR. It is noted that a region in which the negative active material 26B is coated is referred to as a region TF. As described later in detail in FIG. 50, a region TS in which the positive active material 24B is coated exists as opposite to the region TF.

Figure 47:
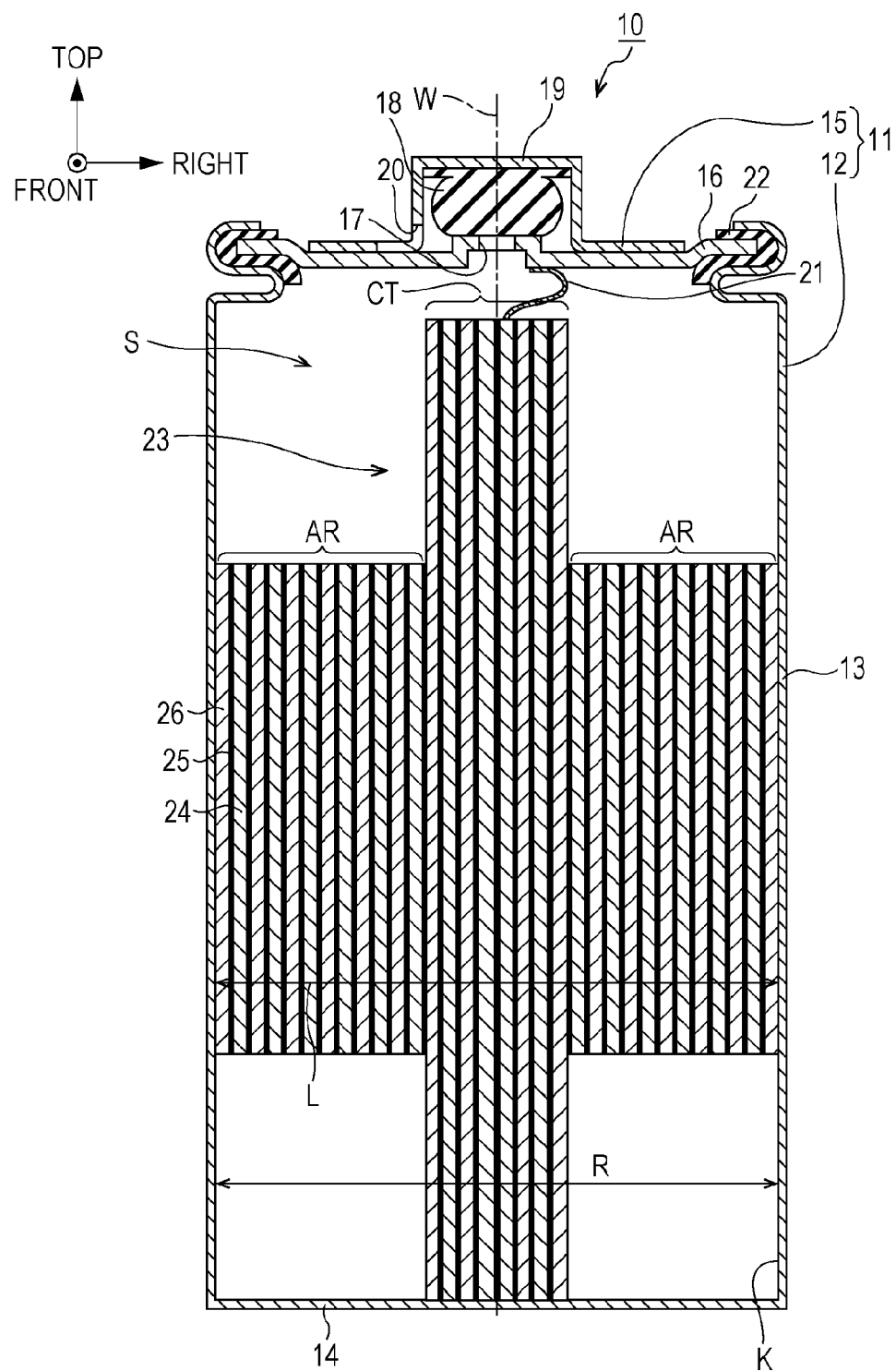
FIG. 47 shows a vertical cross sectional view of the battery.

It is noted that the inner diameter R of the tubular portion 13 is substantially equal to an outer diameter L of the electrode body 23 (the outer diameter dimension of combining the center portion CT with the peripheral portion AR in the lateral direction in FIG. 47). Thus, the electrode body 23 contacts an inner side face K (an example of an inner wall) of the tubular portion 13. The inner side face K of the tubular portion 13 is a face along the vertical direction in the inner face of the battery case 11. Moreover, in the electrode body 23, the lower part of the center portion CT in the vertical direction contacts the inner face of the closing portion 14 (an example of an inner wall).

Figure 49:
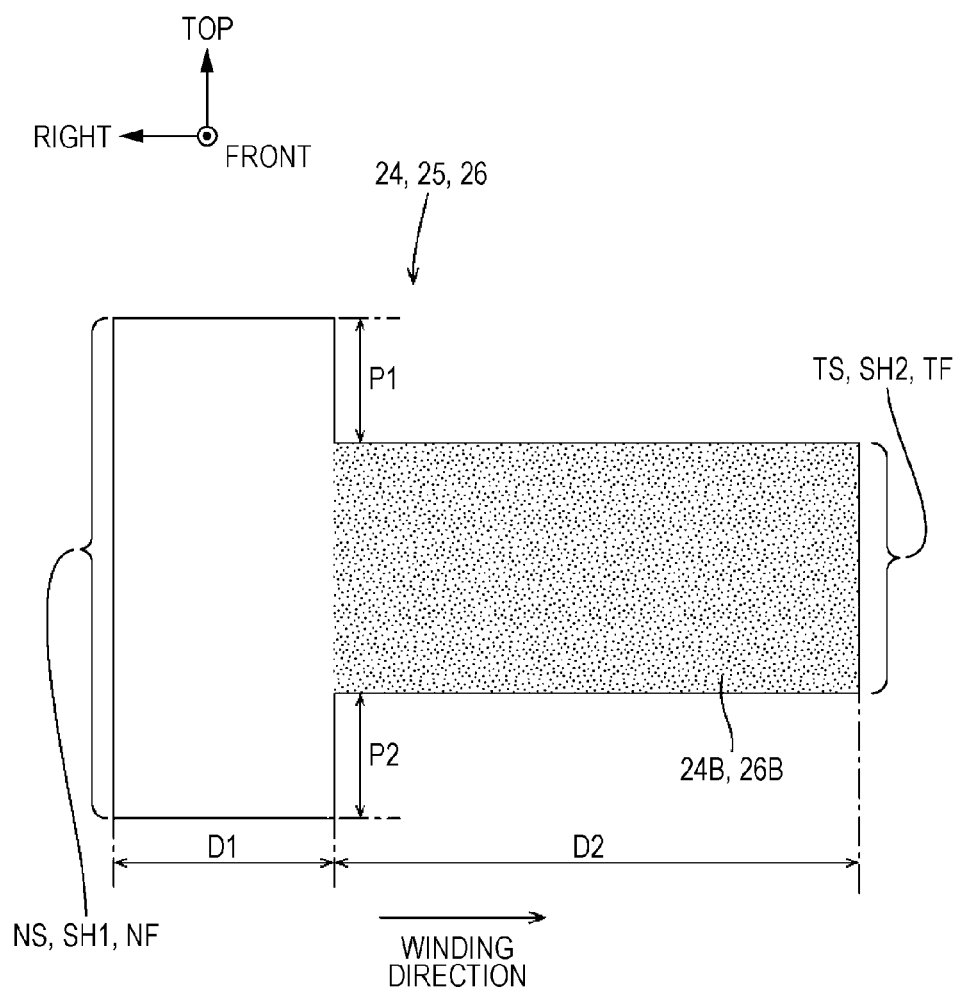
FIG. 49 shows a plan view of a metal plate on which an active material is coated.

FIG. 49 is a development view of the electrode body 23 unfolded. It is noted that the vertical direction in FIG. 49 is the same as the vertical direction in FIG. 48, and the lateral direction in FIG. 49 is the same as the lateral direction in FIG. 48. In other words, FIG. 49 is a view that the electrode body 23 is unfolded and developed in the lateral direction in FIG. 48. It is noted that in FIG. 49, the lateral direction of the electrode body 23, that is, the winding direction of the electrode body 23 is an example of the longitudinal direction of the electrode body 23. The vertical direction of the electrode body 23, that is, the direction perpendicular to the winding direction of the electrode body 23 is an example of the width.

As shown in FIG. 49, on the left side of the lateral direction of the positive metal plate 24A, that is, on the left side of the winding direction of the positive metal plate 24A, there is a region NS (an example of a wide width portion) in which the width in the vertical direction is wider than the width on the right side. The positive active material 24B is not coated on the region NS, and the region NS exists across a length D1 in the lateral direction of the positive metal plate 24A.

On the right side in the lateral direction of the positive metal plate 24A, a region TS (an example of a narrow width portion) exists in which the width in the vertical direction is narrower than the width in the region NS on the left side. In the region TS, the positive active material 24B is coated to form an active material layer, existing across a length D2 in the lateral direction of the positive metal plate 24A. It is noted that the length D2 is longer than the length D1. Moreover, the region TS is shorter by a length P1 from the top end of the positive metal plate 24A in the vertical direction than in the region NS, and is shorter by a length P2 from the lower end of the positive metal plate 24A in the vertical direction. The length P1 and the length P2 are the same lengths.

As shown in FIG. 49, on the left side in the lateral direction of the negative metal plate 26A, that is, on the left side in the winding direction of the negative metal plate 26A, a region NF (an example of a wide width portion) exists in which the width in the vertical direction is wider than the width on the right side. The negative active material 26B is not coated on the region NF, and the region NF exists across a length F1 in the lateral direction of the negative metal plate 26A.

On the right side in the lateral direction of the negative metal plate 26A, the region TF (an example of a narrow width portion) exists in which the width in the vertical direction is narrower than the width in the region NF on the left side. In the region TF, the negative active material 26B is coated to form an active material layer, and the region TF exists across a length F2 in the lateral direction of the negative metal plate 26A. It is noted that the length F2 is longer than the length F1. Moreover, the region TF is shorter by a length R1 from the top end of the negative metal plate 26A in the vertical direction than in the region NF, and shorter by a length R2 from the lower end of the negative metal plate 26A in the vertical direction. The length R1 and the length R2 are the same lengths.

Figure 50:
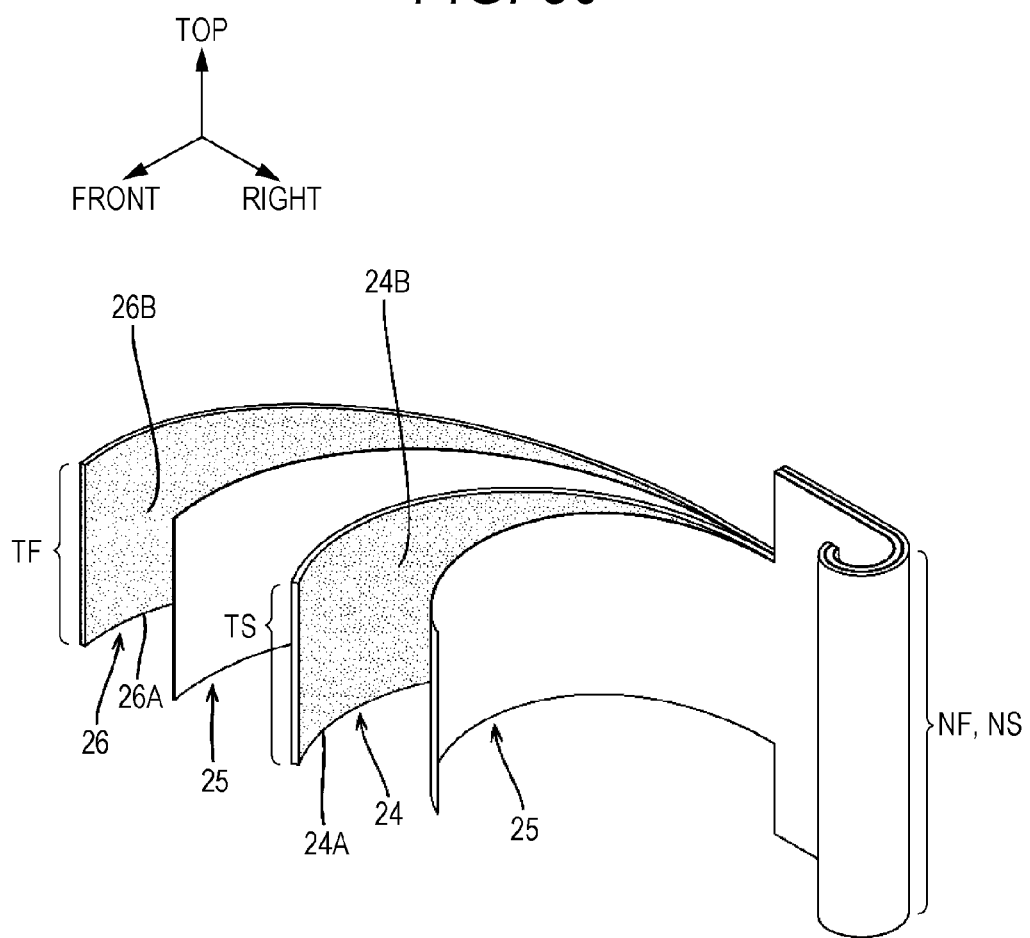
FIG. 50 shows a perspective view of a metal plate on which an active material is coated.

As shown in FIG. 50, in the case where the electrode body 23 is manufactured, the positive metal plate 24A and the negative metal plate 26A are wound in such a way that the region TS in which the positive active material 24B is coated on the positive metal plate 24A is disposed opposite to the region TF in which the negative active material 26B is coated on the negative metal plate 26A. In other words, in the positive metal plate 24A and the negative metal plate 26A, the length D1 and the length F1 are equal, the length D2 and the length F2 are equal, the length P1 and the length R1 are equal, and the length P2 and the length R2 are equal.

Since the region TS in which the positive active material 24B is coated is disposed opposite to the region TF in which the negative active material 26B is coated, a current is produced across the region TS and the region TF due to an electrochemical reaction.

Since the region NS in which the positive active material 24B is not coated is the conductive positive metal plate 24A, the current produced in the region TS is passed through the positive metal plate 24A. Similarly, since the region NF in which the negative active material 26B is not coated is the conductive negative metal plate 26A, the current produced in the region TF is passed through the negative metal plate 26A.

Therefore, the amount of electrodes used can be suppressed as compared with a configuration in which the active material is coated throughout the metal plate.

The separator 25 is made of polyolefin nonwoven fabric, for example. The separator 25 is impregnated with an electrolyte containing primarily potassium hydroxide or sodium hydrate. The separator 25 is not disposed on a face opposite to the inner side face K of the tubular portion 13 in the electrode body 23, and the negative plate 26 is disposed on a face opposite to the inner side face K of the tubular portion 13.

It is noted that as shown in FIG. 49, a region SH1 (an example of a wide width portion) in which the width in the vertical direction is wider than the width on the right side exists on the left side of the separator 25 in the lateral direction. The region SH1 exists across a length E1 of the separator 25 in the lateral direction.

A region SH2 (an example of a narrow width portion) in which the width in the vertical direction is narrower than the width in the region SH1 on the left side exists on the right side of the separator 25 in the lateral direction. The region SH2 exists across a length E2 of the separator 25 in the lateral direction. It is noted that the length E2 is longer than the length E1. Moreover, the region SH2 is shorter by a length Q1 from the top end of the separator 25 in the vertical direction than in the region SH1, and shorter by a length Q2 from the lower end of the separator 25 in the vertical direction. The length Q1 and the length Q2 are the same lengths.

The separator 25 is wound together with the positive plate 24 and the negative plate 26 in the state in which the region SH1 is opposite to the region NS and the region NF. Furthermore, the separator 25 is wound together with the positive plate 24 and the negative plate 26 in the state in which the region SH2 is opposite to the region TS and the region TF. Therefore, in the positive metal plate 24A, the negative metal plate 26A, and the separator 25, the length D1, the length F1, and the length E1 are equal, the length D2, the length F2, and the length E2 are equal, the length P1, the length R1, and the length Q1 are equal, and the length P2, the length R2, and the length Q2 are equal.

Effects of the Embodiment

According to this embodiment, the positive metal plate 24A includes the region NS in which the positive active material 24B is not coated and the region TS in which the positive active material 24B is coated and the length in the vertical direction is shorter than the region NS. The region TS in which the positive active material 24B is coated on the positive metal plate 24A is the positive plate 24.

Moreover, the negative metal plate 26A includes the region NF in which the negative active material 26B is not coated and the region TF in which the negative active material 26B is coated and the length in the vertical direction is shorter than the region NF. The region TF in which the negative active material 26B is coated on the negative metal plate 26A is the negative plate 26.

In the electrode body 23, the positive metal plate 24A and the negative metal plate 26A are wound in such a way that the region TS in which the positive active material 24B is coated on the positive metal plate 24A is disposed opposite to the region TF in which the negative active material 26B is coated on the negative metal plate 26A. Therefore, the amount of electrodes used can be suppressed, and the amounts of materials to form the electrode body can be suppressed as compared with a configuration in which the region TS and the region TF are not provided. The amounts of materials to form the electrode body can be decreased, so that the weight of the battery can be reduced.

Furthermore, the positive metal plate 24A includes the region NS in which the length in the vertical direction is longer than in the region TS, and the negative metal plate 26A includes the region NF in which the length in the vertical direction is longer than in the region TF. The configuration is made such that the region NS and the region NF are wound opposite to each other. Therefore, the unsteadiness of the electrode body 23 in the battery case 11 can be suppressed as compared with a configuration in which the length in the vertical direction is made shorter across the longitudinal direction and the lateral direction of the positive metal plate 24A and the negative metal plate 26A.

In addition, the positive metal plate 24A includes the region NS and the region TS, and the negative metal plate 26A includes the region NF and the region TF. In the electrode body 23, the region NS and the region NF are wound opposite to each other, and the region TS and the region TF are wound opposite to each other. In other words, the center portion CT and the peripheral portion AR are formed using the same single metal plate. Thus, it can be suppressed that the center portion CT and the peripheral portion AR are relatively unstable as compared with a configuration in which the center portion CT and the peripheral portion AR are separate products.

Other Embodiments

The techniques disclosed herein are not limited to the embodiment described with reference to the drawings, and various forms below are also included, for example.

In the embodiment above, an example is taken in which the electrode body 23 has a cylindrical shape in which the positive plate 24, the negative plate 26, and the separator 25 are wound counterclockwise as the center axis W is in the center. However, the embodiment is not limited thereto. Such a configuration may be possible in which the electrode body 23 is formed in a square shape in which a flat positive plate 24, a flat negative plate 26, and a flat separator 25 are laid on each other to form a square shape as a whole, for example.

Figure 51:
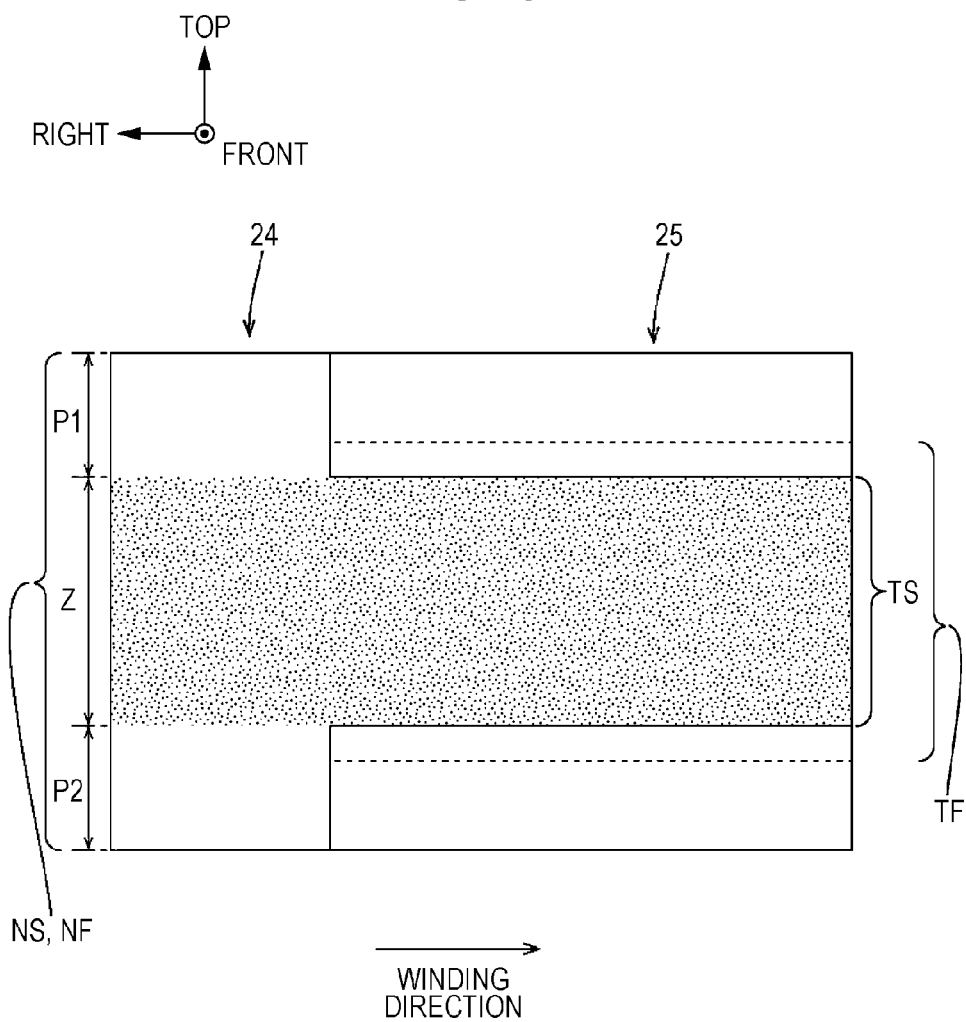
FIG. 51 shows a plan view of a metal plate on which an active material is coated in accordance with another embodiment in the seventh aspect of the present invention.

As shown in FIG. 51, the electrode body 23 may be configured such that the separator 25 does not include the region SH2. Moreover, such a configuration may be possible in which the region TF of the negative metal plate 26A is wider than in the region TS of the positive metal plate 24A in the upper and lower parts in the vertical direction. Furthermore, such a configuration may be possible in which the region TS of the positive metal plate 24A is wider than in the region TF of the negative metal plate 26A in the upper and lower parts in the vertical direction.

In addition, as shown in FIG. 51, the electrode body 23 may be configured such that the positive active material 24B coated only on the region TS of the positive metal plate 24A is also coated on the region NS. More specifically, such a configuration may be possible in which the positive active material 24B is not coated on the region of the length P1 from the top end of the region NS in the vertical direction and the region of the length P2 from the lower end of the region NS in the vertical direction, and the positive active material 24B is coated on the region NS by a length Z the same length as the region TS in the vertical direction of the region NS.

Moreover, the electrode body 23 may be configured such that the negative active material 26B coated only on the region TF of the negative metal plate 26A is also coated on the region NF. More specifically, such a configuration may be possible in which the negative active material 26B is not coated on the region of the length P1 from the top end of the region NF in the vertical direction and the region of the length P2 from the lower end of the region NF in the vertical direction, and the negative active material 26B is coated on the region NF by the length Z the same length as the region TF in the vertical direction of the region NF.

In the embodiment above, an example is taken in which the tubular portion 13 has a cylindrical shape. However, the embodiment is not limited thereto. The tubular portion 13 may have a square shape.

In the embodiment above, the configuration is taken as an example in which the length P1 from the top end of the positive metal plate 24A in the vertical direction and the length P2 from the lower end of the positive metal plate 24A in the vertical direction have the same lengths in the vertical direction. However, the embodiment is not limited thereto.

The length P1 and the length P2 may be different in the length in the vertical direction. It is noted that the length Q1 from the top end of the separator 25 in the vertical direction, the length Q2 from the lower end of the separator 25 in the vertical direction, the length R1 from the top end of the negative metal plate 26A in the vertical direction, and the length R2 from the lower end of the negative metal plate 26A in the vertical direction are also different in the vertical direction.

In the embodiment above, the configuration is taken as an example in which the length D2 of the positive metal plate 24A in the lateral direction where the region NS exists is longer than the length D1 of the positive metal plate 24A in the lateral direction where the region TS exists. However, the embodiment is not limited thereto. The length D1 and the length D2 may be the same in the lateral direction. It is noted that the length E1 of the separator 25 in the lateral direction where the region SH1 exists, the length E2 of the separator 25 in the lateral direction where the region SH2 exists, the length F1 of the negative metal plate 26A in the lateral direction where the region NF exists, and the length F2 of the negative metal plate 26A in the lateral direction where the region TS exists may also be the same in the lateral direction.

In the embodiment above, an example is taken in which in the electrode body 23, in the center portion CT wound at a position close to the center axis W in the longitudinal direction and the lateral direction, the length of the electrode body 23 in the vertical direction is longer than the peripheral portion AR wound around the center portion CT. However, the embodiment is not limited thereto. The center portion CT may be configured such that the length of the electrode body 23 in the vertical direction is shorter than the peripheral portion AR. However, since the peripheral portion AR has a longer diameter when the electrode body 23 is wound, that is, the peripheral portion AR has a longer length from the center axis W of the electrode body 23 in the longitudinal direction and the lateral direction than in the center portion CT, the length in the circumferential direction is increased as the center axis W is in the center. Therefore, the used amounts of the positive metal plate 24A and the negative metal plate 26A are increased more than in the configurations of the embodiment. Therefore, the configuration of the embodiment is more effective.

In the embodiment above, an example is taken in which the center portion CT is configured by the positive plate 24, the separator 25, the negative plate 26. However, the embodiment is not limited thereto. The center portion CT may be configured only by the separator 25. With this configuration, the martial amounts of the metal plate and the active material are further decreased, so that the amount of electrodes used can be further decreased more than in the configuration of the embodiment. In this case, the separator 25 in the center portion CT is thermally welded to the separator 25 in the peripheral portion AR for forming an integral form.

In the embodiment above, the configuration is taken as an example in which the lengths of the region TS, the region TF, and the region SH2 in the vertical direction are the same length Z across the lateral direction. However, the embodiment is not limited thereto. Such a configuration may be possible in which the lengths of the region TS, the region TF, and the region SH2 in the vertical direction are different lengths across the lateral direction. Moreover, the lengths may be partially the same lengths.

What is claimed is:

1. A battery comprising:
a case having an accommodation space in a tubular interior; and
an electrode body disposed in the accommodation space in the case, and including a positive plate, a negative plate, and a separator disposed between the positive plate and the negative plate, wherein
a spacer formed of a dense body and an electrolyte storage space in which an electrolyte is stored are provided between the electrode body and the case on one end or both ends of the case in an axial direction of the electrode body;
the spacer comprises three or four plates having flat surfaces, the flat surfaces being in parallel to the axial direction of the electrode body;
when the spacer comprises the three plates, the three plates are disposed at an angle of about 120 degrees from each other around the axial direction of the electrode body; and
when the spacer comprises the four plates, the four plates are disposed at an angle of about 90 degrees from each other around the axial direction of the electrode body.

2. The battery according to claim 1, wherein
the electrode body is disposed close to a positive electrode terminal formed on one end face of the case, and
the electrolyte storage space is formed on an opposite side of the positive electrode terminal side of the electrode body.

3. The battery according to claim 1, wherein
the spacer is disposed in the electrolyte storage space with a gap,
one end of the spacer contacts a part of one end face of the electrode body in an axial direction, and
other end of the spacer contacts one end face of the case to fix the electrode body so that the electrode body is not moved in the axial direction.

4. The battery according to claim 1, wherein
the spacer has elasticity in the axial direction of the case, and dimensions in the axial direction are deformable.

5. The battery according to claim 1, wherein
one electrode plate of the plurality of electrode plates has nickel hydroxide as the active material, and
the other electrode plate of the plurality of electrode plates has a hydrogen storage alloy as the active material.

6. The battery according to claim 1, wherein
ends of the three or four plates are joined at an axis of the tubular portion of the case.

7. A battery comprising:
a case having an accommodation space in a tubular interior; and
an electrode body disposed in the accommodation space in the case, and including a positive plate, a negative plate, and a separator disposed between the positive plate and the negative plate, wherein
a spacer formed of a dense body and an electrolyte storage space in which an electrolyte is stored are provided between the electrode body and the case on one end or both ends of the case in an axial direction of the electrode body,
the spacer is disposed in the electrolyte storage space with a gap,
one end of the spacer contacts a part of one end face of the electrode body in an axial direction,
other end of the spacer contacts one end face of the case to fix the electrode body so that the electrode body is not moved in the axial direction, and
the spacer comprises the three or four plates having flat surfaces, the flat surfaces being in parallel to the axial direction of the case.

8. The battery according to claim 7, wherein
ends of the three or four plates are joined at an axis of the tubular portion of the case.

* * * * *